(12) United States Patent
Iizuka et al.

(10) Patent No.: US 9,238,494 B2
(45) Date of Patent: Jan. 19, 2016

(54) VEHICLE

(71) Applicant: Yamaha Hatsudoki Kabushiki Kaisha, Iwata-shi, Shizuoka (JP)

(72) Inventors: Toshio Iizuka, Shizuoka (JP); Yutaka Kubo, Shizuoka (JP); Takahiro Watanabe, Shizuoka (JP); Noboru Miyamoto, Shizuoka (JP); Kaoru Sasaki, Shizuoka (JP); Hirokatsu Ogawa, Shizuoka (JP); Kazuhisa Takano, Shizuoka (JP); Shigeto Yamasaki, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/430,357

(22) PCT Filed: Sep. 24, 2013

(86) PCT No.: PCT/JP2013/075679
§ 371 (c)(1),
(2) Date: Mar. 23, 2015

(87) PCT Pub. No.: WO2014/046280
PCT Pub. Date: Mar. 27, 2014

(65) Prior Publication Data
US 2015/0239522 A1    Aug. 27, 2015

(30) Foreign Application Priority Data

Sep. 24, 2012  (JP) ................................ 2012-209873
Sep. 24, 2012  (JP) ................................ 2012-209874
Oct. 25, 2012   (JP) ................................ 2012-235605

(51) Int. Cl.
*B62K 5/08* (2006.01)
*B62K 5/05* (2013.01)
(Continued)

(52) U.S. Cl.
CPC ... *B62K 5/08* (2013.01); *B60G 3/01* (2013.01); *B62K 5/027* (2013.01); *B62K 5/05* (2013.01);
(Continued)

(58) Field of Classification Search
CPC ............ B62K 5/10; B62K 5/027; B62K 5/08; B62K 5/05; B62K 5/24; B62K 2005/001; B60G 2300/122; B60G 2300/45; B60G 2204/422; B60G 2204/8302; B60G 2200/44
See application file for complete search history.

(56) References Cited

U.S. PATENT DOCUMENTS 4,351,410 A   9/1982  Townsend
D547,242 S    7/2007  Lambri
(Continued)

FOREIGN PATENT DOCUMENTS

CN   202295150 U   7/2012
CN   202414056 U   9/2012
(Continued)

OTHER PUBLICATIONS

Official Communication issued in International Patent Application No. PCT/JP2013/075679, mailed on Dec. 17, 2013.
(Continued)

*Primary Examiner* — Paul N Dickson
*Assistant Examiner* — Darlene P Condra
(74) *Attorney, Agent, or Firm* — Keating and Bennett, LLP

(57) ABSTRACT

A transformation restricting mechanism is configured to change a resisting force between a first connecting member, a second connecting member, and a caliper that are configured to be displaced relative to each other. The first connecting member includes a turn supporting portion supported by a first shock absorbing device. The second connecting member includes a turn supporting portion supported by a second shock absorbing device. The turn supporting portion is supported by the first shock absorbing device closer to a first center axis than an intermediate axis which is coincident with a turning axis of a steering shaft when the vehicle body frame is in an upright state. The turn supporting portion is supported by the second shock absorbing device closer to a second center axis than the intermediate axis when the vehicle body frame is in an upright state.

6 Claims, 22 Drawing Sheets

(51) Int. Cl.
  *B60G 3/01*   (2006.01)
  *B62K 5/027*  (2013.01)
  *B62K 5/10*   (2013.01)
  *B62K 5/00*   (2013.01)

(52) U.S. Cl.
  CPC ............... *B62K 5/10* (2013.01); *B60G 2200/44* (2013.01); *B60G 2204/422* (2013.01); *B60G 2204/8302* (2013.01); *B60G 2300/122* (2013.01); *B60G 2300/45* (2013.01); *B62K 2005/001* (2013.01)

(56) References Cited

U.S. PATENT DOCUMENTS

| | | | | |
|---|---|---|---|---|
| 7,322,591 | B2 * | 1/2008 | Seki | B60G 3/20 |
| | | | | 280/124.106 |
| 7,461,851 | B2 * | 12/2008 | Yamamura | B60G 3/20 |
| | | | | 180/311 |
| 7,543,829 | B1 * | 6/2009 | Barnes | B62K 5/02 |
| | | | | 180/210 |
| 7,562,885 | B2 * | 7/2009 | Marcacci | B62D 9/02 |
| | | | | 280/124.103 |
| 7,770,907 | B2 * | 8/2010 | Shimizu | B60G 3/20 |
| | | | | 280/124.134 |
| 8,235,398 | B2 | 8/2012 | Mercier | |
| 2005/0167174 | A1 | 8/2005 | Marcacci | |
| 2007/0262656 | A1 * | 11/2007 | Fulks | B60G 21/007 |
| | | | | 307/143 |
| 2009/0299565 | A1 | 12/2009 | Hara et al. | |
| 2010/0194068 | A1 | 8/2010 | Henderson | |
| 2011/0025012 | A1 * | 2/2011 | Nakamura | B60G 3/20 |
| | | | | 280/124.135 |
| 2014/0346753 | A1 * | 11/2014 | Huang | B62D 9/04 |
| | | | | 280/269 |
| 2014/0375015 | A1 | 12/2014 | Yu | |

FOREIGN PATENT DOCUMENTS

| | | |
|---|---|---|
| DE | 10 2010 052 716 A1 | 6/2011 |
| EP | 1 090 832 A1 | 4/2001 |
| EP | 1 391 374 A1 | 2/2004 |
| EP | 1 180 476 B1 | 7/2004 |
| JP | 2005-313876 A | 11/2005 |
| JP | 2006-192960 A | 7/2006 |
| JP | 2009-286266 A | 12/2009 |
| JP | 2010-184508 A | 8/2010 |
| JP | 2011-195100 A | 10/2011 |
| TW | 201125770 A1 | 8/2011 |

OTHER PUBLICATIONS

Piaggio, "Catalogo Parti Di Ricambio", NTRC000U01, MP3 300 ie LT Mod. ZAPM64102, 116 pages.

Takano et al.; "Vehicle"; U.S. Appl. No. 14/437,893, filed Apr. 23, 2015.

Takano et al.; "Vehicle"; U.S. Appl. No. 14/437,899, filed Apr. 23, 2015.

Official Communication issued in corresponding European Patent Application No. 13839190.9, mailed on Sep. 18, 2015.

Official Communication issued in corresponding European Patent Application No. 13839190.9, mailed on Oct. 8, 2015.

\* cited by examiner

VEHICLE

BACKGROUND OF THE INVENTION

1. Field of the Invention

The present invention relates to a vehicle equipped with a leanable body frame and two front wheels.

2. Description of the Related Art

A known vehicle includes a vehicle body frame that is leanable leftward or rightward when the vehicle is cornering, and two front wheels that are arranged side by side in a left-right direction of the vehicle body frame (for example, see Japanese Patent Publication No. 2005-313876, German Patent Publication No. 10 2010 052716, U.S. Pat. No. D547, 2425, and Catalogo partidi ricambio, MP3 300 ie LT Mod. ZAPM64102, Piaggio).

The vehicle equipped with the leanable body frame and the two front wheels includes a link mechanism. The link mechanism includes an upper cross member and a lower cross member. In addition, the link mechanism includes a right side rod which supports right end portions of the upper cross member and the lower cross member, and a left side rod which supports left end portions of the upper cross member and the lower cross member. Intermediate portions of the upper cross member and the lower cross member are supported by the vehicle body frame in a location directly in front of a steering shaft. The upper cross member and the lower cross member are supported by the body frame so as to turn about axes that extend substantially in a front-and-rear direction of the body frame. The upper cross member and the lower cross member turn relative to the body frame as the body frame leans such that the relative positions of the two front wheels in the up-and-down direction change. The upper cross member and the lower cross member are provided directly above the two front wheels in the up-down direction of the body frame when the body frame is in an upright state.

The vehicle including the leanable vehicle body frame and the two front wheels further includes a right shock absorbing device which supports the right front wheel so as to be movable in the up-and-down direction of the vehicle body frame, and a left shock absorbing device which supports the left front wheel so as to be movable in the up-and-down direction of the vehicle body frame. The right shock absorbing device is supported by the right side rod so as to be turnable about the axis of the right side rod. The left shock absorbing device is supported by a left side rod so as to be turnable about the axis of the left side rod. The vehicle described in Japanese Patent Publication No. 2005-313876 and German Patent Publication No. 10 2010 052716 further includes a handlebar, a steering shaft, and a turn transmitting mechanism. The handlebar is secured to the steering shaft. The steering shaft is supported to be turnable with respect to the vehicle body frame. When the handlebar is turned, the steering shaft also turns. The turn transmitting mechanism transmits the turning of the steering shaft rightward shock absorbing device and the left shock absorbing device.

The vehicle including the leanable body frame and the two front wheels includes many on-board components which are provided on the periphery of the steering shaft. The on-board components include lamps such as a headlamp, a radiator, a reservoir tank, electric components such as a horn, a main switch of the vehicle, a storage box, a storage pocket and the like.

The vehicles described in Japanese Patent Publication No. 2005-313876 and German Patent Publication No. 10 2010 052716 include a resisting force changing mechanism. The resisting force changing mechanism restricts the leaning of the vehicle body frame and a change in relative position of the two front wheels in the up-down direction of the vehicle body frame by increasing a resisting force against the operation of the link mechanism.

In the vehicle described in Japanese Patent Publication No. 2005-313876, the resisting force changing mechanism includes a brake disc and a caliper. The brake disc is fixed to the upper cross member which defines the link mechanism. The caliper changes the resisting force that is exerted on the operation of the link mechanism by controlling the frictional force between the caliper and the brake disc. The caliper is attached to a portion of the vehicle body frame which is located above the upper cross member. The link mechanism operates when the resisting force exerted by the resisting force changing mechanism is zero or small. In the case of the resisting force exerted by the resisting force changing mechanism being large, the operation of the link mechanism is restricted or stopped. In the case of the resisting force exerted by the resisting force changing mechanism being zero or small, the brake disc and the upper cross member move together relative to the vehicle body frame.

In the vehicle described in German Patent Publication No. 10 2010 052716, the resisting force changing mechanism includes a rod, a piston that is provided at one end of the rod, and a cylinder in which the piston moves. In the resisting force changing mechanism, the rod extends or contracts relative to the cylinder as a result of the piston moving within the cylinder. The rod stays stationary relative to the cylinder as a result of the piston being stopped within the cylinder. The other end of the rod is supported by the left rod. The cylinder is supported by the vehicle body frame in a position above the upper cross member. The resisting force changing mechanism operates to change the resisting force against the link mechanism by changing the state of the piston moving within the cylinder. The link mechanism operates when the resisting force exerted by the resisting force changing mechanism is zero or small. When the resisting force exerted by the resisting force changing mechanism is large, the operation of the link mechanism is restricted or stopped. The rod and the cylinder also move as the link mechanism operates when the resisting force exerted by the resisting force changing mechanism is zero or small.

The vehicles described in Japanese Patent Publication No. 2005-313876 and German Patent Publication No. 10 2010 052716 include the link mechanism that is provided on the periphery of the steering shaft, and this link mechanism moves as the vehicle body frame leans. In addition, the vehicles include, on the periphery of the steering shaft, the resisting force changing mechanism which operates as the vehicle body frame leans and as the link mechanism operates. Accordingly, in the vehicle including the leanable vehicle body frame and the two front wheels, the resisting force changing mechanism needs to be provided so that a movable range of the resisting force changing mechanism does not interfere with a movable range of the link mechanism. Further, in providing on-board components, it is necessary that the on-board components are provided so as to avoid interfering with both the movable range of the link mechanism and the movable range of the resisting force changing mechanism. This tends to enlarge the size of a peripheral construction of the steering shaft in a vehicle that includes a leanable vehicle body frame and two front wheels.

SUMMARY OF THE INVENTION

In a vehicle that includes a leanable vehicle body frame and two front wheels, preferred embodiments of the present invention provide a technology that significantly reduces or prevents an increase in the size of a peripheral construction of a steering shaft above the two front wheels even though a function to restrict the operation of a link mechanism is included in the vehicle.

According to a preferred embodiment of the present invention, a vehicle includes a vehicle body frame; a right front wheel and a left front wheel arranged side by side in a left-right direction of the vehicle body frame; a right shock absorbing device supporting the right front wheel at a lower portion thereof and configured to buffer displacement of the right front wheel in an up-down direction of the vehicle body frame relative to an upper portion thereof; a left shock absorbing device supporting the left front wheel at a lower portion thereof and configured to buffer displacement of the left front wheel in the up-down direction of the vehicle body frame relative to an upper portion thereof; a link mechanism including a right side rod supporting the upper portion of the right shock absorbing device so that the right shock absorbing device is configured to turn about a right axis extending in the up-down direction of the vehicle body frame, a left side rod supporting the upper portion of the left shock absorbing device so that the left shock absorbing device is configured to turn about a left axis extending parallel or substantially parallel to the right axis, an upper cross member including a right end portion turnably supporting an upper portion of the right side rod, a left end portion turnably supporting an upper portion of the left side rod, and an intermediate portion supported by the vehicle body frame and configured to turn about an upper axis extending in the front-back direction of the vehicle body frame; and a lower cross member including a right end portion turnably supporting a lower portion of the right side rod, a left end portion turnably supporting a lower portion of the left side rod, and an intermediate portion supported by the vehicle body frame and configured to turn about a lower axis extending parallel or substantially parallel to the upper axis; a steering shaft including an upper end portion located above the lower axis in the up-down direction of the vehicle body frame, the steering shaft being supported by the vehicle body frame at a position between the right side rod and the left side rod in the left-right direction of the vehicle body frame, and the steering shaft is configured to turn about an intermediate axis extending in the up-down direction of the vehicle body frame; a handlebar provided on the upper end portion of the steering shaft; a turn transmitting mechanism configured to transmit a turning motion of the steering shaft in accordance with an operation of the handlebar to the right shock absorbing device and the left shock absorbing device; and a resisting force changing mechanism configured to change a resisting force applied against turning actions of the upper cross member and the lower cross member relative to the vehicle body frame; wherein the resisting force changing mechanism includes a first portion and a second portion which are configured to be displaced relative to each other and to change a resisting force against the relative displacement; the first portion includes a first supporting portion supported by at least one of the right and left shock absorbing devices; the first supporting portion is supported by one of the right and left shock absorbing devices at a position which is below the lower cross member in the up-down direction of the vehicle body frame and which is closer to the one of the right and left shock absorbing devices in the left-right direction of the vehicle body frame than the intermediate axis when the vehicle body frame is in an upright state; and the second portion includes a second supporting portion supported by at least one of the upper cross member, the lower cross member, the vehicle body frame, the other one of the right and left shock absorbing devices, and one of the right and left side rods supporting the other one of the right and left shock absorbing devices.

According to such a configuration, as the vehicle body frame leans, the right shock absorbing device moves up and down in the up-down direction of the vehicle body frame together with the right front wheel and the right side rod relative to the vehicle body frame, the upper cross member, the lower cross member, the left side rod, and the left shock absorbing device. Then, as the vehicle body frame leans, the left shock absorbing device moves up and down in the up-down direction of the vehicle body frame together with the left front wheel and the left side rod relative to the vehicle body frame, the upper cross member, the lower cross member, the right side rod, and the right shock absorbing device. Additionally, as the steering shaft turns, the right shock absorbing device turns together with the right front wheel relative to the vehicle body frame, the upper cross member, the lower cross member, the left side rod, and the left shock absorbing device. Then, as the steering shaft turns, the left shock absorbing device turns together with the left front wheel relative to the vehicle body frame, the upper cross member, the lower cross member, the right side rod, and the right shock absorbing device.

According to such a configuration, most of the portions of the right shock absorbing device and the left shock absorbing device are located below the lower cross member when the vehicle body frame is in the upright state. Additionally, spaces are defined between the right shock absorbing device and the left shock absorbing device, and between the link mechanism and the vehicle body frame so as to avoid interference therebetween. When the vehicle body frame is in the upright state, the first supporting portion of the resisting force changing mechanism is supported by one of the right shock absorbing device and the left shock absorbing device at a position located below the lower cross member in the up-down direction of the vehicle body frame such that a movable range of the resisting force changing mechanism is smaller than a movable range of the link mechanism. In addition, the space defined between the right shock absorbing device and the left shock absorbing device and the space defined between the link mechanism and the vehicle body frame is provided as a movable range of the resisting force changing mechanism.

Further, a portion of the vehicle body frame is located above the right shock absorbing device and the left shock absorbing device when viewed from the right shock absorbing device and the left shock absorbing device. The other one of the right and left shock absorbing devices, one of the right and left side rods which supports the other one of the right and left shock absorbing devices, and a portion of the vehicle body frame are located to the right or left of the right and left shock absorbing devices. In other words, a position where the second supporting portion of the resisting force changing mechanism is supported exists over a wide range, thus enhancing the degree of freedom in design. This makes it easy to support the second supporting portion at a position that helps to make the movable range of the resisting force changing mechanism smaller. This provides the movable range of the resisting force changing mechanism.

In the event that the resisting force changing mechanism is supported by the right shock absorbing device and the left shock absorbing device, the movable range of the resisting force changing mechanism would be increased due to the relative turning described above. However, the first supporting portion is supported by one of the right and left shock absorbing devices in a position located closer to the turning axis of the one of the right and left shock absorbing devices than the intermediate axis. Accordingly, it is possible to significantly reduce or prevent the expansion of the movable range of the resisting force changing mechanism that would otherwise be caused in association with the relative turning described above. In addition, the space defined between the right shock absorbing device and the left shock absorbing device and the space defined between the link mechanism and the vehicle body frame preferably define the movable range of the resisting force changing mechanism, thus making it possible to significantly reduce or prevent the expansion of the movable range of the resisting force changing mechanism that would otherwise be caused in association with the relative turning described above.

According to such a configuration described above, the movable range of the resisting force changing mechanism is made smaller than the movable range of the link mechanism. Additionally, even though the right shock absorbing device and the left shock absorbing device turn, it is possible to significantly reduce or prevent the expansion of the movable range of the resisting force changing mechanism. Consequently, the movable range of the resisting force changing mechanism that restricts the operation of the link mechanism is spaced away from the steering shaft. Thus, even though a function to restrict the operation of the link mechanism is provided, it is possible to significantly reduce or prevent an increase in the size of a peripheral construction of the steering shaft that is disposed above the two front wheels.

The vehicle is preferably configured such that the second supporting portion of the resisting force changing mechanism is disposed above the first supporting portion of the resisting force changing mechanism which is supported by one of the right and left shock absorbing devices, in the up-down direction of the vehicle body frame, when the vehicle body frame is in the upright state.

According to this configuration, the first supporting portion and the second supporting portion relatively move in the up-down direction of the vehicle body frame as the vehicle body frame leans. Accordingly, the resisting force changing mechanism preferably includes the first supporting portion at a lower portion thereof and the second supporting portion at an upper portion thereof, and preferably is configured to change the resisting force against the relative movement of the first supporting portion and the second supporting portion in the up-down direction. This enables the resisting force changing mechanism to be made smaller in size and simplified in structure. Additionally, the movable range of the resisting force changing mechanism is made smaller. Consequently, even though a function to restrict the operation of the link mechanism is provided, it is possible to significantly reduce or prevent an increase in the size of the peripheral construction of the steering shaft that is disposed above the two front wheels.

The vehicle is preferably configured such that the second supporting portion of the resisting force changing mechanism is supported at a position closer to the intermediate axis in the left-right direction than the right axis and the left axis when the vehicle body frame is in the upright state.

According to this configuration, the first supporting portion and the second supporting portion relatively move in the up-down direction of the vehicle body frame as the vehicle body frame leans. In addition, the second supporting portion also relatively moves in the left-right direction of the vehicle body frame as the vehicle body frame leans. This allows the resisting force changing mechanism to make use of at least either the movement in the up-down direction or the movement in the left-right direction. Additionally, in conjunction with the fact that the space defined between the link mechanism and the vehicle body frame and the space defined between the right shock absorbing device and the left shock absorbing device preferably are used as the movable range of the resisting force changing mechanism, the resisting force changing mechanism is made smaller in size and simplified in structure. In addition, the movable range of the resisting force changing mechanism is made smaller. Consequently, even though a function to restrict the operation of the link mechanism is provided, it is possible to significantly reduce or prevent an increase in the size of the peripheral construction of the steering shaft that is disposed above the two front wheels.

The vehicle is preferably configured such that at least one of the first portion and the second portion of the resisting force changing mechanism is configured to turn about an axis extending in the up-down direction of the vehicle body frame relative to the one of the right and left shock absorbing devices.

According to this configuration, the turning axis of the one of the right and left shock absorbing devices and the turning axis of at least one of the first and second portions both extend in the up-down direction of the vehicle body frame. This prevents the expansion of the movable range of at least one of the first portion and the second portion in accordance with the turning of the one of the right and left shock absorbing devices. Consequently, even though a function to restrict the operation of the link mechanism is provided, it is possible to significantly reduce or prevent an increase in the size of the peripheral construction of the steering shaft that is disposed above the two front wheels.

The vehicle is preferably configured such that the first supporting portion of the resisting force changing mechanism is supported by the upper portion of the one of the right and left shock absorbing devices.

According to this configuration, a dimension of the resisting force changing mechanism relative to the up-down direction of the vehicle body frame is smaller than in a case where the first supporting portion is supported at the lower portion of the one of the right and left shock absorbing devices. This makes the movable range of the resisting force changing mechanism smaller. Consequently, even though a function to restrict the operation of the link mechanism is provided, it is possible to significantly reduce or prevent an increase in the size of the peripheral construction of the steering shaft that is disposed above the two front wheels.

A vehicle according to a preferred embodiment of the present invention is preferably configured such that the first portion of the resisting force changing mechanism includes a first right supporting portion supported by the lower portion of the right shock absorbing device and a first left supporting portion supported by the lower portion of the left shock absorbing device; the first right supporting portion is supported by the lower portion of the right shock absorbing device at a position which is below the lower cross member in the up-down direction of the vehicle body frame and which is closer to the right axis in the left-right direction of the vehicle body frame than the intermediate axis when the vehicle body frame is in the upright state; and the first left supporting portion is supported by the lower portion of the left shock absorbing device at a position which is below the lower cross member in the up-down direction of the vehicle body frame and which is closer to the left axis in the left-right direction of the vehicle body frame than the intermediate axis when the vehicle body frame is in the upright state.

According to this configuration, the resisting force that is imparted by the resisting force changing mechanism is exerted so as to restrict the displacement of the right shock absorbing device and the left shock absorbing device.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
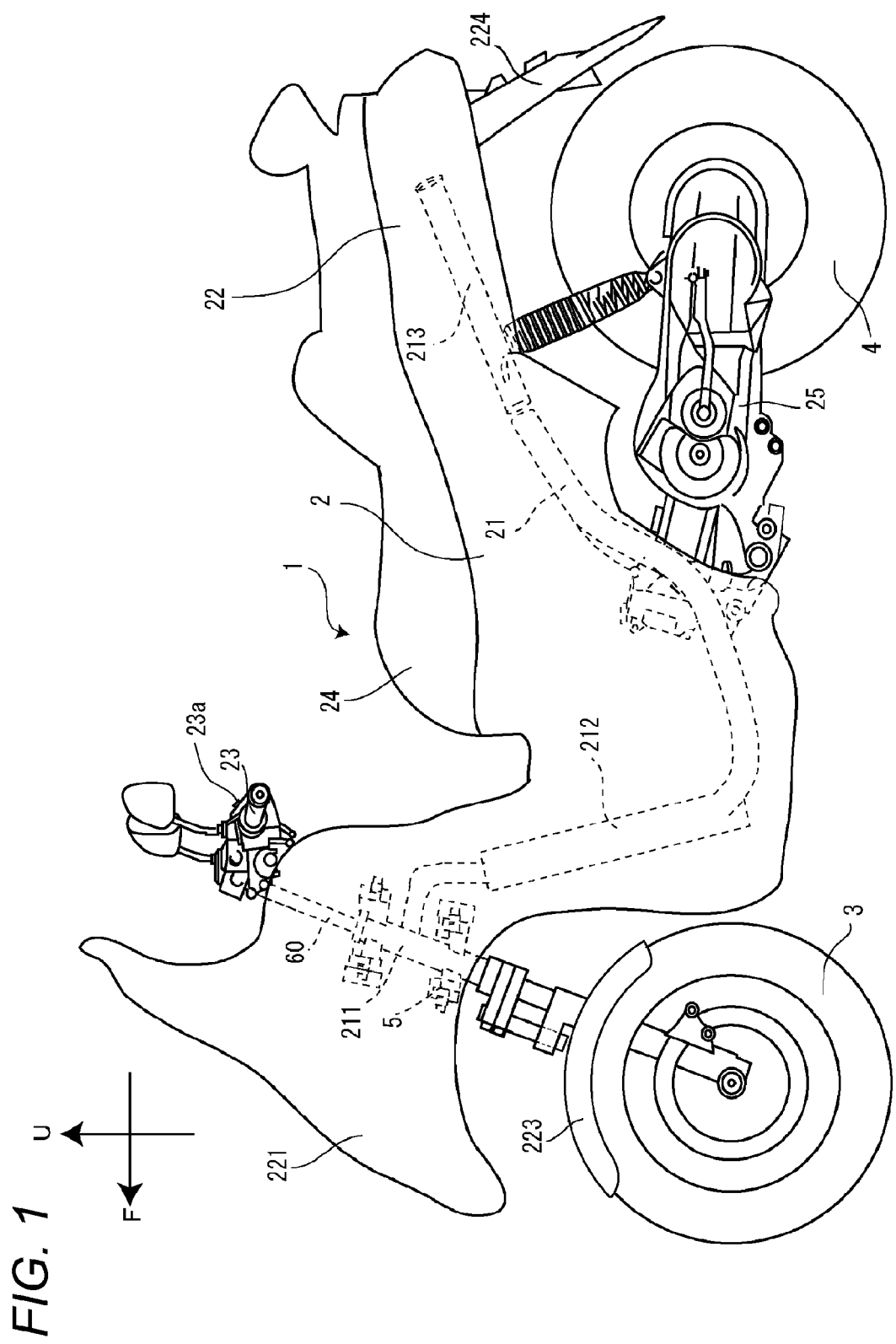
FIG. 1 is a left side view showing a three-wheeled vehicle according to a first preferred embodiment of the present invention.

Hereinafter, a three-wheeled vehicle, which is one kind of a vehicle, according to preferred embodiments of the present invention will be described with reference to the accompanying drawings.

First Preferred Embodiment

Referring to FIGS. 1 to 10, a three-wheeled vehicle 1 according to a first preferred embodiment of the present invention will be described. Like reference numerals will be assigned to like or corresponding elements, and similar descriptions thereof will not be repeated. Hereinafter, an arrow F shown in the drawings indicates a frontward direction of the three-wheeled vehicle 1. An arrow R shown in the drawings indicates a rightward direction of the three-wheeled vehicle 1. An arrow L shown in the drawings indicates a leftward direction of the three-wheeled vehicle 1. An arrow U indicates a vertical upward direction. Outward in a vehicle width direction means a leftward or rightward direction from a center in the vehicle width direction.

FIG. 1 is an overall side view of the three-wheeled vehicle 1. When a direction is referred to with a term "front", "rear", "left" and "right" in the following descriptions, the referred direction means a direction viewed from a rider who is driving the three-wheeled vehicle 1.

The three-wheeled vehicle 1 includes a vehicle main body 2, front wheels 3, and a rear wheel 4. The vehicle main body 2 includes a vehicle body frame 21, a body cover 22, a handlebar 23, a seat 24, and a power unit 25.

The vehicle body frame 21 supports the power unit 25, the seat 24, and the like. The power unit 25 includes an engine, a transmission, and the like. In FIG. 1, the vehicle body frame 21 is shown with a dashed line.

The vehicle body frame 21 includes a head pipe 211, a down frame 212, and a rear frame 213. The head pipe 211 is disposed at a front portion of the vehicle. A link mechanism 5 is disposed on the periphery of the head pipe 211. A steering shaft 60 is inserted into the head pipe 211 and is configured to turn in the head pipe 211. The steering shaft 60 extends substantially in an up-down direction. The handlebar 23 is provided at an upper end portion of the steering shaft 60. The down frame 212 is inclined downward and rearward from a front end thereof. The rear frame 213 supports the seat 24, a tail lamp, and the like. A switch 23a is attached to the handlebar 23.

The vehicle body frame 21 is covered by the body cover 22. The body cover 22 includes a front cover 221, front fenders 223, and a rear fender 224.

The front cover 221 is located directly forward of the seat 24. The front cover 221 covers the head pipe 211 and the link mechanism 5.

The front fenders 223 are respectively disposed directly above the pair of left and right front wheels 3. The front fenders 223 are disposed directly below the front cover 221. The rear fender 224 is disposed directly above the rear wheel 4.

The front wheels 3 are located below the head pipe 211 and the link mechanism 5. The front wheels 3 are disposed directly below the front cover 221. The rear wheel 4 is disposed directly below the body cover 22.

Figure 2:
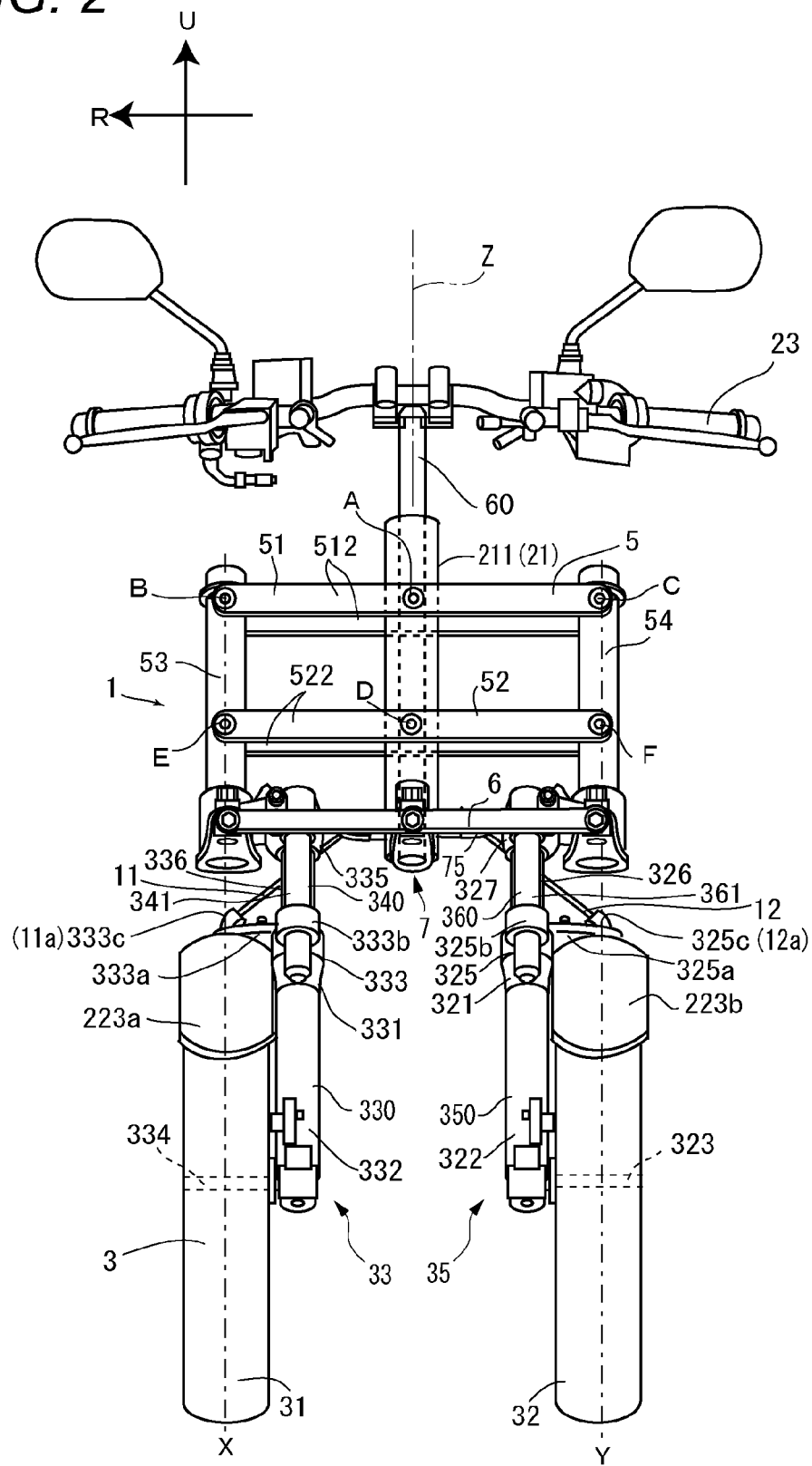
FIG. 2 is a front view showing the three-wheeled vehicle in a condition in which a vehicle body cover is removed.

FIG. 2 is an overall front view showing the three-wheeled vehicle 1 in a condition in which the body cover 22 is removed. In FIG. 2, the down frame 212 and the like are omitted.

The three-wheeled vehicle 1 includes the handlebar 23, the steering shaft 60, the head pipe 211, the pair of left and right front wheels 3, a first shock absorbing device 33, a first turn preventing mechanism 340, a second shock absorbing device 35, a second turn preventing mechanism 360, the link mechanism 5, an operation force transmitting mechanism 6, and a transformation restricting mechanism 7.

The front wheels 3 include a first front wheel 31 and a second front wheel 32 that are arranged side by side in the left-right direction of the vehicle body frame 21. The first front wheel 31, which is an example of a right front wheel, is disposed to the right of the center in the vehicle width direction. A first front fender 223a is disposed directly above the first front wheel 31. The second front wheel 32, which is an example of a left front wheel, is disposed to the left of the center in the vehicle width direction. A second front fender 223b is disposed directly above the second front wheel 32. The second front wheel 32 is disposed symmetrically with the first front wheel 31 relative to the left-right direction of the vehicle body frame 21. In this description, the "left-right direction of the vehicle body frame 21" denotes a direction that intersects vertically an axial direction of the head pipe 211 when the three-wheeled vehicle 1 is viewed from the front.

The first shock absorbing device 33, which is an example of a right shock absorbing device, supports the first front wheel 31 at a lower portion thereof and absorbs displacement of the first front wheel 31 in the up-down direction of the vehicle body frame 21. The first shock absorbing device 33 includes a first shock absorber 330 and the first turn preventing mechanism 340. In this description, the "up-down direction of the vehicle body frame 21" denotes a direction parallel or substantially parallel to the axial direction of the head pipe 211 when the three-wheeled vehicle 1 is viewed from the front.

The second shock absorbing device 35, which is an example of a left shock absorbing device, supports the second front wheel 32 at a lower portion thereof and absorbs displacement of the second front wheel 32 in the up-down direction of the front body 21. The second shock absorbing device 35 includes a second shock absorber 350 and the second turn preventing mechanism 360.

Figure 3:
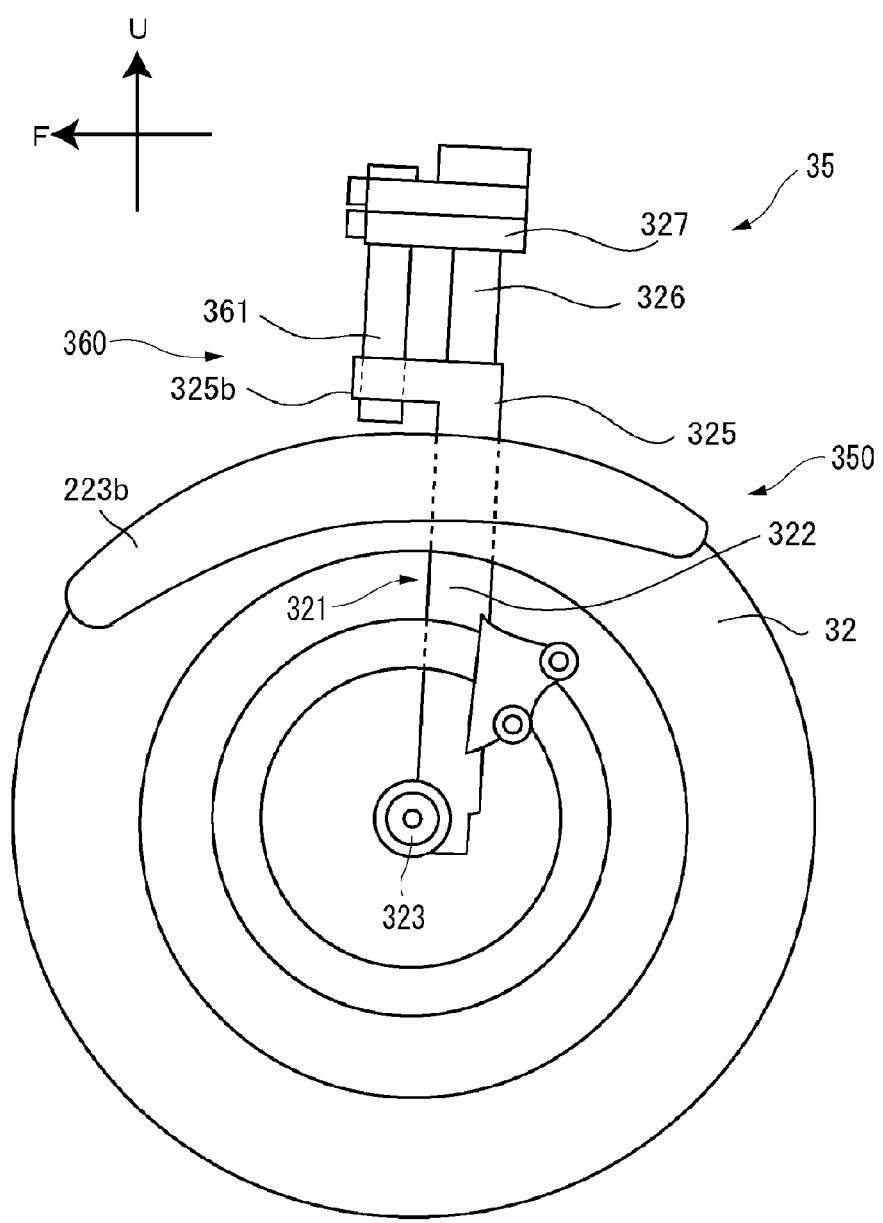
FIG. 3 is a left side view showing a relationship between a second front wheel and a second shock absorbing device in the three-wheeled vehicle of FIG. 1.

FIG. 3 is a left side view showing a relationship between the second front wheel 32 and the second shock absorbing device 35.

The second shock absorber 350 includes a second supporting member 321. The second supporting member 321 includes a second outer cylinder 322, a second supporting shaft 323, and a second inner tube 326. A portion of the second inner tube 326 is inserted in an inner circumferential side of the second outer cylinder 322. The second inner tube 326 is disposed directly above the second outer cylinder 322. The second inner tube 326 is configured to move relative to the second outer cylinder 322 in a direction in which the second outer cylinder 322 extends. The second shock absorber 350 preferably is a so-called telescopic shock absorber, for example.

The second turn preventing mechanism 360 prevents the turning of the second outer cylinder 322 relative to the second inner tube 326. The second turn preventing mechanism 360 includes a second guide 325, a second turn preventing rod 361, and a second bracket 327. The second guide 325 guides a direction in which the second turn preventing rod 361 moves. The second guide 325 includes a second guide tube 325b. The second turn preventing rod 361 is inserted in an inner circumferential side of the second guide tube 325b. The second turn preventing rod 361 is configured to move relative to the second guide tube 325b. The second turn preventing rod 361 prevents the relative turning of the second front wheel 32 to the second inner tube 326. The second turn preventing rod 361 is disposed so as to extend parallel or substantially parallel to the second shock absorber 350. An upper end of the second turn preventing rod 361 and an upper end of the second inner tube 326 are fixed to the second bracket 327. This configuration prevents the relative movement of the second turn preventing rod 361 to the second inner tube 326.

As shown in FIG. 2, the second front wheel 32 is supported by the second supporting member 321. The second front wheel 32 is connected to a lower portion of the second supporting member 321. The second supporting shaft 323 is provided at a lower end of the second outer cylinder 322 and supports the second front wheel 32. The second guide 325 includes a second plate 325a. The second plate 325a extends to a location directly above the second front fender 223b. The second front wheel 32 is configured to turn about a second center axis Y to change its direction. The second center axis Y intersects the second plate 325a at a second connection point 325c.

The first shock absorber 330 includes a first supporting member 331. The first supporting member 331 includes a first outer cylinder 332, a first supporting shaft 334, and a first inner tube 336. The first shock absorber 330 preferably has a similar configuration to that of the second shock absorber 350 that is described with reference to FIG. 3. Namely, a portion of the first inner tube 336 is inserted in an inner circumferential side of the first outer cylinder 332. The first inner tube 336 is disposed directly above the first outer cylinder 332. The first inner tube 336 is configured to move relative to the first outer cylinder 332 in a direction in which the first outer cylinder 332 extends. The first shock absorber 330 preferably is a so-called telescopic shock absorber, for example.

The first turn preventing mechanism 340 prevents the turning of the first outer cylinder 332 relative to the first inner tube 336. The first turn preventing mechanism 340 preferably has a similar configuration to that of the second turn preventing mechanism 360 that is described with reference to FIG. 3. Namely, the first turn preventing mechanism 34 includes a first guide 333, a first turn preventing rod 341, and a first bracket 335. The first guide 333 guides a direction in which the first turn preventing rod 341 moves. The first guide 333 includes a first guide tube 333b. The first turn preventing rod 341 is inserted in an inner circumferential side of the first guide tube 333b. The first turn preventing rod 341 is configured to move relative to the first guide tube 333b. The first turn preventing rod 341 prevents the relative turning of the first front wheel 31 relative to the first inner tube 336. The first turn preventing rod 341 is disposed so as to extend parallel or substantially parallel to the first shock absorber 330. Upper ends of the first turn preventing rod 341 and the first inner tube 336 are fixed to the first bracket 335. This configuration prevents the relative movement of the first turn preventing rod 341 to the first inner tube 336.

The first front wheel 31 is supported by the first supporting member 331. The first front wheel 31 is connected to a lower portion of the first supporting member 331. The first supporting shaft 334 is provided at a lower end of the first outer cylinder 332 and supports the first front wheel 31. The first guide 333 includes a first plate 333a. The first plate 333a extends to a location directly above the first front fender 223a. The first front wheel 31 is configured to turn about a first center axis X to change its direction. The first center axis X intersects the first plate 333a at a first connection point 333c.

The link mechanism 5 is disposed directly below the handlebar 23. The link mechanism 5 is disposed directly above the first front wheel 31 and the second front wheel 32. The link mechanism 5 is connected to the head pipe 211. The link mechanism 5 includes a first cross member 51 (an example of an upper cross member), a second cross member 52 (an example of a lower cross member), a first side member 53 (an example of a right side rod), and a second side member 54 (an example of a left side rod).

Figure 4:
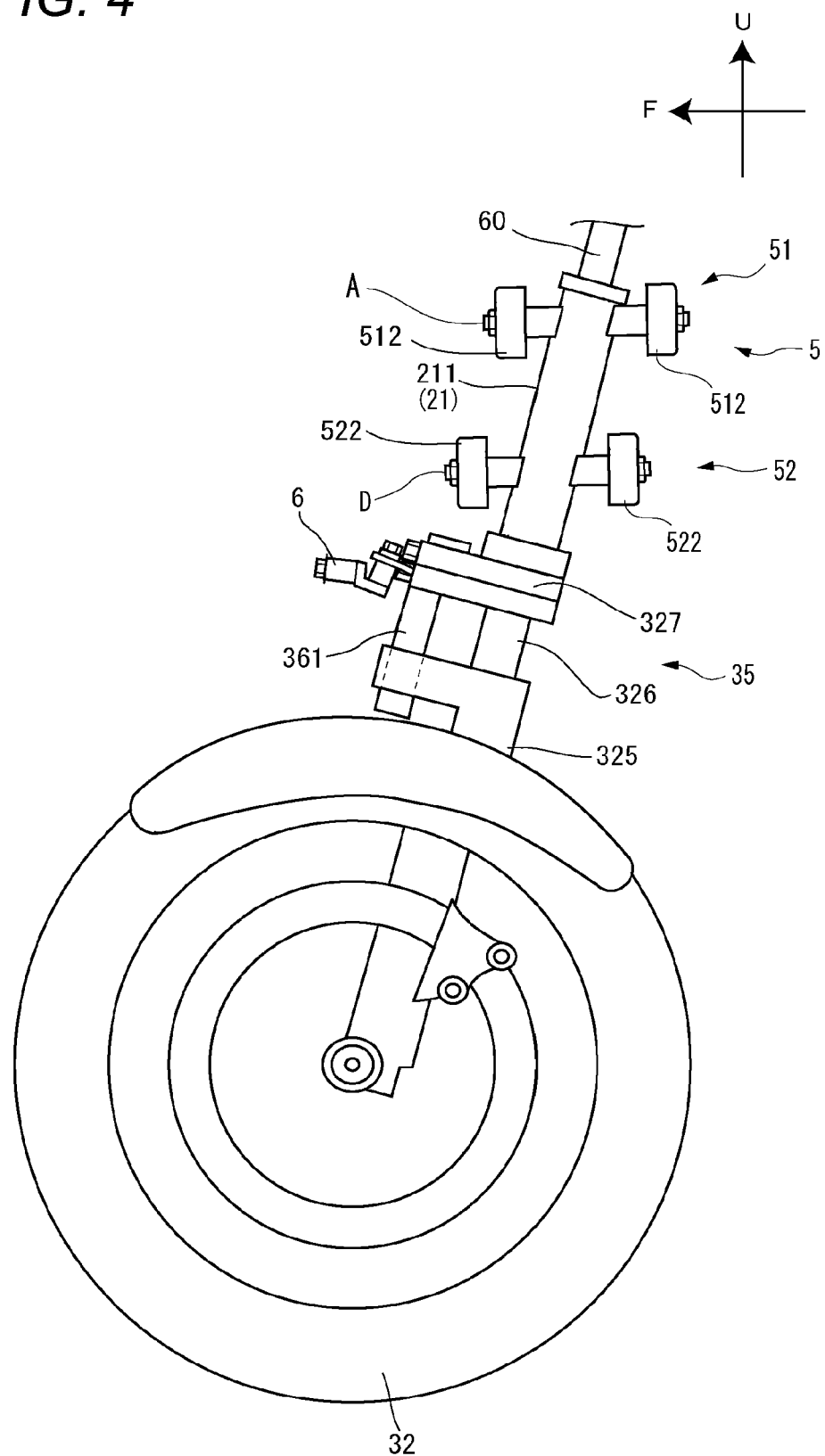
FIG. 4 is a left side view showing a portion of the three-wheeled vehicle of FIG. 1

As shown in FIG. 4, the first cross member 51 includes a pair of plate-shaped members 512. The first cross member 51 extends in the left-right direction of the vehicle body frame 21. The head pipe 512 is disposed between the pair of plate-shaped members 512 in the front-back direction of the vehicle body frame 21. In this description, the "front-back direction of the vehicle body frame 21" denotes a direction that coincides with a front-back direction of the three-wheeled vehicle 1. In this description, when an element is described as "extending in the left-right direction of the body frame 21," this includes a direction in which the element extends while being inclined in the left-right direction of the body frame 21 and means that the element extends substantially in the left-right direction of the body frame 21 rather than in the up-down direction and front-back direction of the body frame 21.

As shown in FIG. 2, an intermediate portion of the first cross member 51 is supported by the vehicle body frame 21 (the head pipe 211) by a supporting portion A. The intermediate portion of the first cross member 51 is supported by the vehicle body frame 21 at the supporting portion A so as to turn about a turning axis (an example of an upper axis) which extends in the front-back direction of the vehicle body frame 21. Even though the steering shaft 60 turns as the handlebar 23 is turned, the first cross member 51 does not turn about a turning axis of the steering shaft 60. In this description, when an element is described as "extending in the front-back direction of the body frame 21," this includes a direction in which the element extends while being inclined in the front-back direction of the body frame 21 and means that the element extends substantially in the front-back direction of the body frame 21 rather than in the up-down direction and left-right direction of the body frame 21.

As shown in FIG. 2, a right end portion of the first cross member 51 is connected to an upper portion of the first side member 53 by a connecting portion B. An upper portion of the first side member 53 is supported by a right end portion of the first cross member 51 at the connecting portion B so as to turn about a turning axis that extends in the front-back direction of the vehicle body frame 21. A left end portion of the first cross member 51 is connected to an upper portion of the second side member 54 by a connecting portion C. The upper portion of the second side member 54 is supported by the left end portion of the first cross member 51 at the connecting portion C so as to turn about a turning axis that extends in the front-back direction of the vehicle body frame 21.

As shown in FIG. 4, the second cross member 52 includes a pair of plate-shaped members 522. The second cross member 52 extends in the left-right direction of the vehicle body frame 21. The head pipe 211 is disposed between the pair of plate-shaped members 522 in the front-back direction of the vehicle body frame 21. The second cross member 52 is disposed below the first cross member 51 and above the first shock absorbing device 33 and the second shock absorbing device 35 when the vehicle body frame 21 is in the upright state.

An intermediate portion of the second cross member 52 is supported by the vehicle body frame 21 (the head pipe 211) by a supporting portion D. The intermediate portion of the second cross member 52 is supported by the vehicle body frame 21 at the supporting portion D so as to turn about a turning axis (an example of a lower axis) that extends in the front-back direction of the vehicle body frame 21. The turning axis that extends in the front-back direction of the vehicle body frame 21 at the supporting portion D is parallel or substantially parallel to the turning axis that extends in the front-back direction of the vehicle body frame 21 at the supporting portion A. Even though the steering shaft 60 turns as the handlebar 23 is turned, the second cross member 52 does not turn about the turning axis of the steering shaft 60.

As shown in FIG. 2, a right end portion of the second cross member 52 is connected to a lower portion of the first side member 53 by a connecting portion E. A lower portion of the first side member 53 is supported by the right end portion of the second cross member 52 at the connecting portion E so as to turn about a turning axis which extends in the front-back direction of the vehicle body frame 21. A left end portion of the second cross member 52 is connected to a lower portion of the second side member 54 at a connecting portion F. A lower portion of the second side member 54 is supported by the left end portion of the second cross member 52 at the connecting portion F so as to turn about a turning axis that extends in the front-back direction of the vehicle body frame 21.

In the present preferred embodiment, each of the first cross member 51 and the second cross member 52 is configured to include the pair of front and rear plate-shaped members that extend in the left-right direction. However, each of the first cross member 51 and the second cross member 52 may be configured to include a member that extends rightward from the head pipe 211 and a member that extends leftward from the head pipe 211.

The first side member 53 is disposed directly to the right of the head pipe 211. The first side member 53 extends in a direction that is parallel or substantially parallel to a direction in which the head pipe 211 and the steering shaft 60 extend. The first side member 53 is disposed directly above the first front wheel 31 and the first shock absorbing device 33. The first side member 53 supports an upper portion of the first shock absorbing device 33 so as to turn about a first center axis X (an example of a right axis).

The second side member 54 is disposed directly to the left of the head pipe 211. The second side member 54 extends in a direction that is parallel or substantially parallel to the direction in which the head pipe 211 and the steering shaft 60 extend. The second side member 54 is disposed directly above the second front wheel 32 and the second shock absorbing device 35. The second side member 54 supports an upper portion of the second shock absorbing device 35 so as to turn about a second center axis Y (an example of a left axis).

The steering shaft 60 is supported by the vehicle body frame 21 between the first side member 53 and the second side member 54 in the left-right direction of the vehicle body frame 21. The upper end portion of the steering shaft 60 is provided above the turning axis at the supporting portion D of the second cross member 52 in the up-down direction of the vehicle body frame 21. The steering shaft 60 is configured to turn about an intermediate axis Z that extends in the front-back direction of the vehicle body frame 21 (the head pipe 211). In this description, when an element is described as "extending in the up-down direction of the body frame 21," this includes a direction in which the element extends while being inclined in the up-down direction of the body frame 21 and means that the element extends substantially in the up-down direction of the body frame 21 rather than in the front-back direction and left-right direction of the body frame 21.

Figure 5:
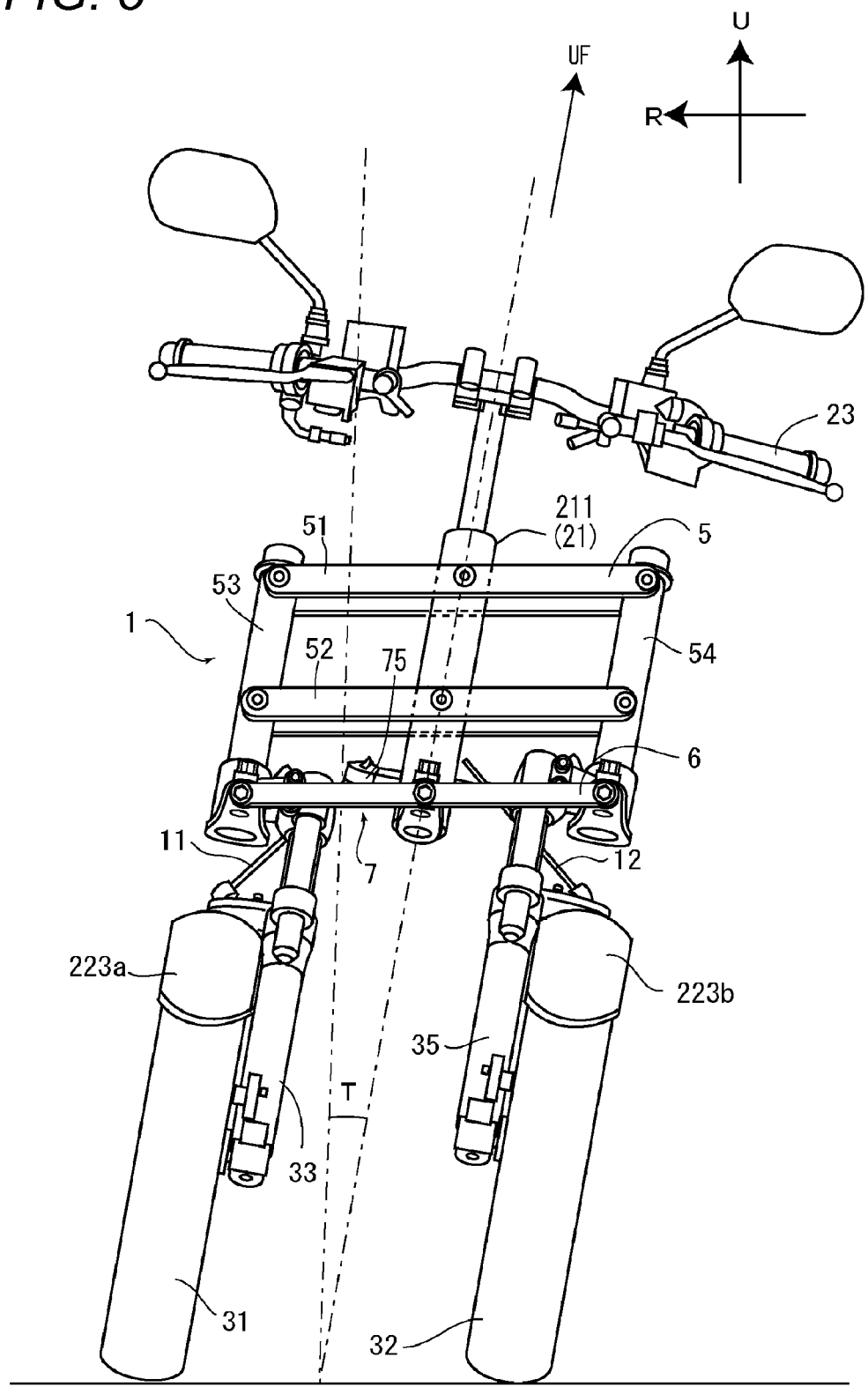
FIG. 5 is a front view showing a state when the three-wheeled vehicle of FIG. 1 is leaning.

FIG. 5 is a front view showing a state in which the vehicle body frame 21 is caused to lean leftward by an angle T. An upward direction of the vehicle body frame 21 is indicated by an arrow UF. When the three-wheeled vehicle 1 is in the upright state, an upward direction UF of the vehicle body frame 21 coincides with a vertically upward direction U. When the three-wheeled vehicle 1 is in a leaning state, the upward direction UF of the vehicle body frame 21 does not coincide with the vertically upward direction U.

When the vehicle body frame 21 leans leftward or rightward, the link mechanism 5 transforms. When the rider attempts to cause the three-wheeled vehicle 1 to lean leftward by the angle T, the vehicle body frame 21 (the head pipe 211) leans leftward from the posture in the upright state. Accordingly, the first cross member 51 and the second cross member 52 turn relative to the head pipe 211, the first side member 53, and the second side member 54. As this occurs, the direction in which the first cross member 51 extends and the direction in which the second cross member 52 extends are parallel or substantially parallel when the three-wheeled vehicle 1 is viewed from the front. As the head pipe 211 leans leftward, the left end portion of the first cross member 51 moves farther leftward than the left end portion of the second cross member 52. This causes the second side member 54 to lean leftward from the posture in the upright state. As this occurs, the direction in which the second side member 54 extends is parallel or substantially parallel to the direction in which the head pipe 211 extends when viewed from the front. As well as the second side member 54, the first side member 53 also leans leftward from the posture in the upright state. The direction in which the first side member 53 extends is parallel or substantially parallel to the direction in which the head pipe 211 extends when viewed from the front. As the link mechanism 5 transforms as described above, the second front wheel 32 is displaced farther upward in the up-down direction of the vehicle body frame 21 (the direction indicated by the arrow UF) than the first front wheel 31 such that the three-wheeled vehicle 1 is permitted to lean leftward.

Similarly, when the rider attempts to cause the three-wheeled vehicle 1 to lean rightward, the vehicle body frame 21 (the head pipe 211) leans rightward from the posture in the upright state. Accordingly, the first cross member 51 and the second cross member 52 turn relative to the head pipe 211, the first side member 53, and the second side member 54. As this occurs, the direction in which the first cross member 51 extends and the direction in which the second cross member 52 extends are parallel or substantially parallel when the three-wheeled vehicle 1 is viewed from the front. As the head pipe 211 leans rightward, the left end portion of the first cross member 51 moves farther rightward than the left end portion of the second cross member 52. This causes the second side member 54 to lean rightward from the posture in the upright state. As this occurs, the direction in which the second side member 54 extends is parallel or substantially parallel to the direction in which the head pipe 211 extends when viewed from the front. As well as the second side member 54, the first side member 53 also leans rightward from the posture in the upright state. The direction in which the first side member 53 extends is parallel or substantially parallel to the direction in which the head pipe 211 extends when viewed from the front. As the link mechanism 5 transforms as described above, the second front wheel 32 is displaced farther upward in the up-down direction of the vehicle body frame 21 (the direction indicated by the arrow UF) than the first front wheel 31 such that the three-wheeled vehicle 1 is permitted to lean rightward.

The operation force transmitting mechanism 6, which is an example of a turn transmitting mechanism, transmits a turning motion of the steering shaft 60 according to an operation of the handlebar 23 to the first shock absorbing device 33 and to the second shock absorbing device 35 so as to turn the first shock absorbing device 33 and the second shock absorbing device 35 about the first center axis X and the second center axis Y, respectively. A portion of the operation force transmitting mechanism 6 is disposed directly below the second cross member 52. The operation force transmitting mechanism 6 is disposed above the first front wheel 31 and the second front wheel 32.

As shown in FIG. 2, a lower end portion of the first side member 53 is connected to the first bracket 335. The first bracket 335 is attached to the first side member 53 so as to turn about the first center axis X. The operation force transmitting mechanism 6 connects the lower end portion of the steering shaft 60 and the first bracket 335 together. The operation force transmitting mechanism 6 transmits a turning motion of the steering shaft 60 in accordance with a turning motion of the handlebar 23 to the first bracket 335. This causes the first bracket 335 to turn about the first center axis X relative to the first side member 53. The first side member 53 never turns relative to the vehicle body frame 21, even though the handlebar 23 is turned.

A lower end portion of the second side member 54 is connected to the second bracket 327. The second bracket 327 is attached to the second side member 54 so as to turn about the second center axis Y relative to the second side member 54. The operation force transmitting mechanism 6 connects the lower end portion of the steering shaft 60 and the second bracket 327 together. The operation force transmitting mechanism 6 transmits a turning motion of the steering shaft 60 in accordance with a turning motion of the handlebar 23 to the second bracket 327. This causes the second bracket 327 to turn about the second center axis Y relative to the second side member 54. The second side member 54 never turns relative to the vehicle body frame 21, even though the handlebar 23 is turned.

Figure 6:
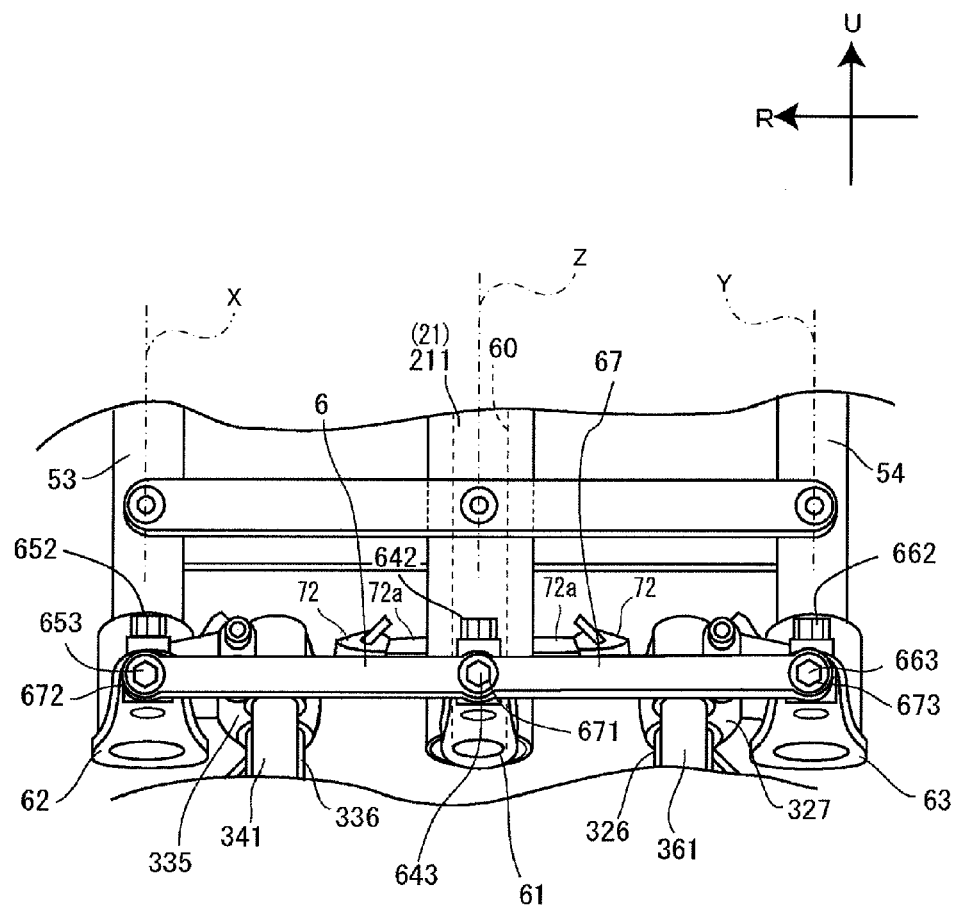
FIG. 6 is a front view showing an operation force transmitting mechanism in the three-wheeled vehicle of FIG. 1 in an enlarged manner.

FIG. 6 is a front view showing the operation force transmitting mechanism 6 in an enlarged manner. The operation force transmitting mechanism 6 includes the steering shaft 60, a first transmission plate 61, a second transmission plate 62, a third transmission plate 63, a first transmission member 67, the first bracket 335, and the second bracket 327.

The first transmission plate 61 is connected to the lower end portion of the steering shaft 60. The first transmission plate 61 is not allowed to turn relative to the steering shaft 60. When the handlebar 23 is turned relative to the head pipe 211, the steering shaft 60 is turned relative to the head pipe 211. The first transmission plate 61 is turned as the steering shaft 60 is turned.

The second transmission plate 62 is fixed to the first bracket 335 of the first shock absorbing device 33 and is allowed to turn together with the first bracket 335 relative to the first side member 53. The second transmission plate 62 is located below the first bracket 335.

The third transmission plate 63 is disposed symmetrically with the second transmission plate 62 with respect to the first transmission plate 61 when viewed from the front. The third transmission plate 63 is fixed to the second bracket 327 of the second shock absorbing device 35 and is allowed to turn together with the second bracket 327 relative to the second side member 54. The third transmission plate 63 is located below the second bracket 327.

In this description, the portion that is fixed to the first shock absorbing device 33 and that is allowed to turn together with the first shock absorbing device 33 is regarded as a portion of the first shock absorbing device 33. Consequently, the second transmission plate 62 of the operation force transmitting mechanism 6 also defines a portion of the first shock absorbing device 33. Similarly, the portion that is fixed to the second shock absorbing device 35 and that is allowed to turn together with the second shock absorbing device 35 is regarded as a portion of the second shock absorbing device 35. Consequently, the third transmission plate 63 of the operation force transmitting mechanism 6 also defines a portion of the second shock absorbing device 35.

The first transmission member 67 transmits an operation force that is transferred from the steering shaft 60 to the first bracket 335 and the second bracket 327. The first transmission member 67 extends in the left-right direction of the vehicle body frame 21. A detailed configuration that enables the operation force to be transferred from the steering shaft 60 to the first bracket 335 and the second bracket 327 will be described below.

Figure 7:
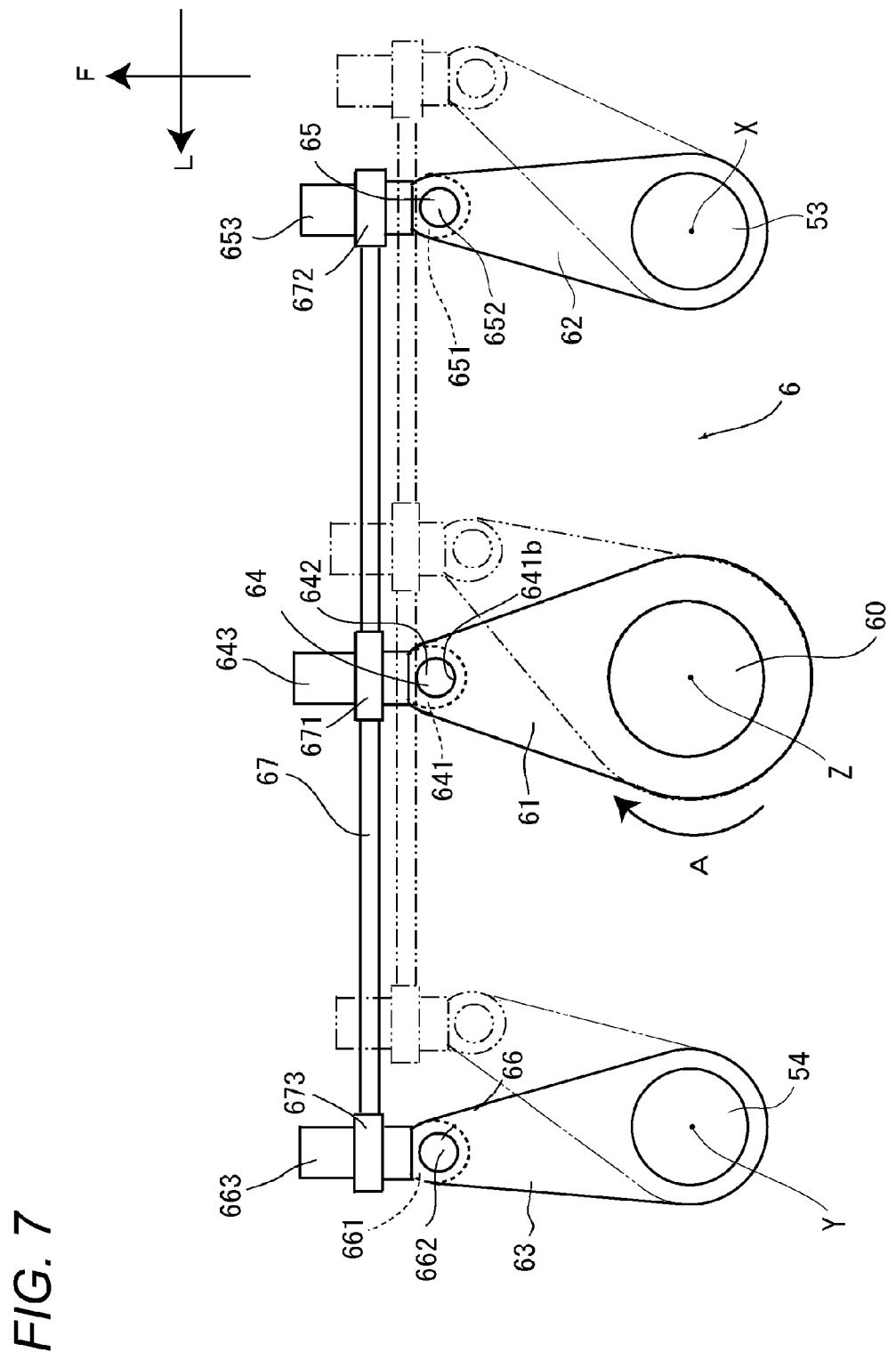
FIG. 7 is a schematic view showing operations of the operation force transmitting mechanism of FIG. 6.

FIG. 7 is a schematic plan view showing the configuration of the operation force transmitting mechanism 6. FIG. 7 shows the operation force transmitting mechanism 6 viewed from above, wherein the configurations of the link mechanism 5, the brackets and the like are all omitted. Dashed chain lines indicate a state in which the steering shaft 60 is turned in a direction indicated by an arrow A in FIG. 7.

The operation force transmitting mechanism 6 further includes a first joint 64, a second joint 65, and a third joint 66.

A front portion of the first transmission plate 61 is narrower in width in a front portion than in a rear portion of the first transmission plate 61. The first joint 64 is disposed at the front portion of the first transmission plate 61.

A front portion of the second transmission plate 62 is narrower in width than a rear portion of the second transmission plate 62. The second joint 65 is disposed at the front portion of the second transmission plate 62. The second transmission plate 62 is disposed directly to the right of the first transmission plate 61.

A front portion of the third transmission plate 63 is narrower in width than a rear portion of the third transmission plate 63. The third joint 66 is disposed at the front portion of the third transmission plate 63. The third transmission plate 63 is disposed directly to the left of the first transmission plate 61.

The first joint 64 includes a first bearing 641, a first shaft 642, and a first front rod 643. The first shaft 642 is configured to turn relative to the first bearing 641. The first bearing 641 supports the first shaft 642. The first bearing 641 is supported by the first transmission plate 61. The first transmission plate 61 includes a first supporting hole 641b that supports the first shaft 642 therein. The first shaft 642 is fitted in the first supporting hole 641b. The first bearing 641 is fixed to the first shaft 642. The first shaft 642 is disposed at a front end of the first transmission plate 61.

The first front rod 643 extends frontward from the first bearing 641. The first bearing 641 turns relative to the first transmission plate 61 such that the first front rod 643 turns leftward or rightward about the first shaft 642. The first front rod 643 is fixed to the first bearing 641.

The second joint 65 includes a second bearing 651, a second shaft 652, and a second front rod 653. The second bearing 651 preferably has a configuration similar to that of the first bearing 641. The second shaft 652 preferably has a configuration similar to that of the first shaft 642. The second front rod 653 preferably has a configuration similar to that of the first front rod 643.

The third joint 66 includes a third bearing 661, a third shaft 662, and a third front rod 663. The third bearing 661 preferably has a configuration similar to that of the first bearing 641. The third shaft 662 preferably has a configuration similar to that of the first shaft 642. The third front rod 663 preferably has a configuration similar to that of the first front rod 643.

The first transmission member 67 includes a first ring 671, a second ring 672, and a third ring 673. The first front rod 643 is inserted through the first ring 671. The first ring 671 is provided at a center of the first transmission member 67 in the left-right direction. The second ring 672 is disposed directly to the right of the first ring 671. A second front rod 653 is inserted through the second ring 672. The third ring 673 is disposed directly to the left of the first ring 671. A third front rod 663 is inserted through the third ring 673.

Figure 8:
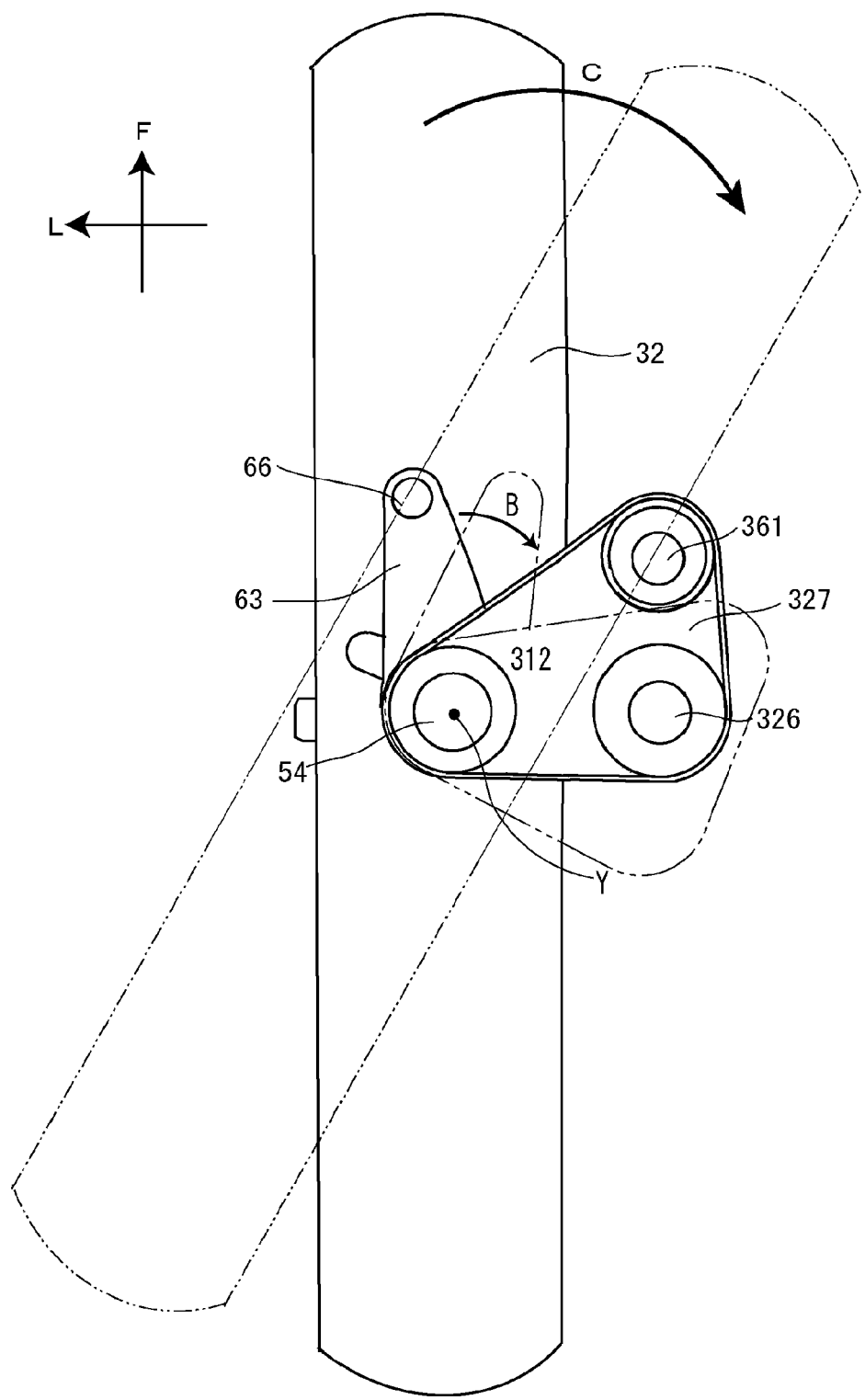
FIG. 8 is a schematic view showing operations of a second bracket and the second front wheel of the three-wheeled vehicle of FIG. 1.

FIG. 8 is a plan view of the second front wheel 32 and the second bracket 327. In FIG. 8, dashed chain lines indicate a state in which the second front wheel 32 is turned. Here, the second front fender 223b is omitted from the illustration.

The second bracket 327 is connected to the second side member 54 as has been described above. The third transmission plate 63 is mounted on the second bracket 327.

As the steering shaft 60 is turned, the first transmission plate 61 is turned. Here, for example, when the steering shaft 60 is turned in a direction indicated by an arrow A in FIG. 7, the first joint 64 moves rightward and rearward as the first transmission plate 61 turns. As this occurs, the first shaft 642 turns relative to the first bearing 641 to move the first transmission member 67 rightward and rearward while the first transmission member 67 maintains its posture. The second front rod 653 and the third front rod 663 move rightward and rearward as the first transmission member 67 moves rightward. When the second front rod 653 and the third front rod 663 move rightward and rearward, the second bearing 651 and the third bearing 661 move rightward and rearward. As the second bearing 651 and the third bearing 661 move rightward and rearward, the second transmission plate 62 and the third transmission plate 63 turn in the direction indicated by the arrow A about the first side member 53 and the second side member 54, respectively. This creates the state indicated by the dashed chain lines in FIG. 7. A turning center of the second transmission plate 62 coincides with the first center axis X. A turning center of the third transmission plate 63 coincides with the second center axis Y.

When the third transmission plate 63 turns about the second side member 54, the second bracket 327 is turned in a direction indicated by an arrow B in FIG. 8 by a third transmission member 69. When the second bracket 327 is turned in the direction indicated by the arrow B, the second front wheel 32 is turned in a direction indicated by an arrow C in FIG. 8 by the second shock absorber 350. The front wheel 32 turns rightward about the second center axis Y. As this occurs, the front wheel 32 takes a position indicated by dashed chain lines in FIG. 8. The first front wheel 31 turns rightward about the first center axis X similarly to the second front wheel 32. In this way, turning the handlebar 23 in the left-right direction of the vehicle body frame 21 turns the first front wheel 31 and the second front wheel 32 in the left-right direction of the vehicle body frame 21.

The transformation restricting mechanism 7, which is an example of a resisting force changing mechanism, restricts the transformation of the link mechanism 5. Specifically, the transformation restricting mechanism 7 changes a resisting force that is imparted to the first cross member 51 and the second cross member 52 that are turning relative to the vehicle body frame 21. As shown in FIG. 2, the transformation restricting mechanism 7 includes a first connecting member 11, a second connecting member 12, and a restricting mechanism 75.

The first connecting member 11 is attached to a first plate 333a. The first connecting member 11 is attached to a first connecting point 333c where the first plate 333a intersects the first center axis X. Here, the first connecting member 11 does not have to be disposed in a position that coincides strictly with the first connecting point 333c. That is, the first connecting member 11 may be disposed in a position that is slightly offset from the first connecting point 333c. The first connecting member 11 is attached to an upper surface of the first plate 333a. The first connecting member 11 extends from the first plate 333a toward the head pipe 211.

The second connecting member 12 is attached to a second plate 325a. The second connecting member 12 is attached to a second connecting point 325c where the second plate 325a intersects the second center axis Y. Here, the second connecting member 12 does not have to be disposed in a position that coincides strictly with the second connecting point 325c. That is, the second connecting member 12 may be disposed in a position that is slightly offset from the second connecting point 325c. The second connecting member 12 is attached to an upper surface of the second plate 325a. The second connecting member 12 extends from the second plate 325a toward the head pipe 211.

The restricting mechanism 75 restricts the movement of the first connecting member 11 relative to the head pipe 211. The restricting mechanism 75 restricts the movement of the second connecting member 12 relative to the head pipe 211.

Figure 9:
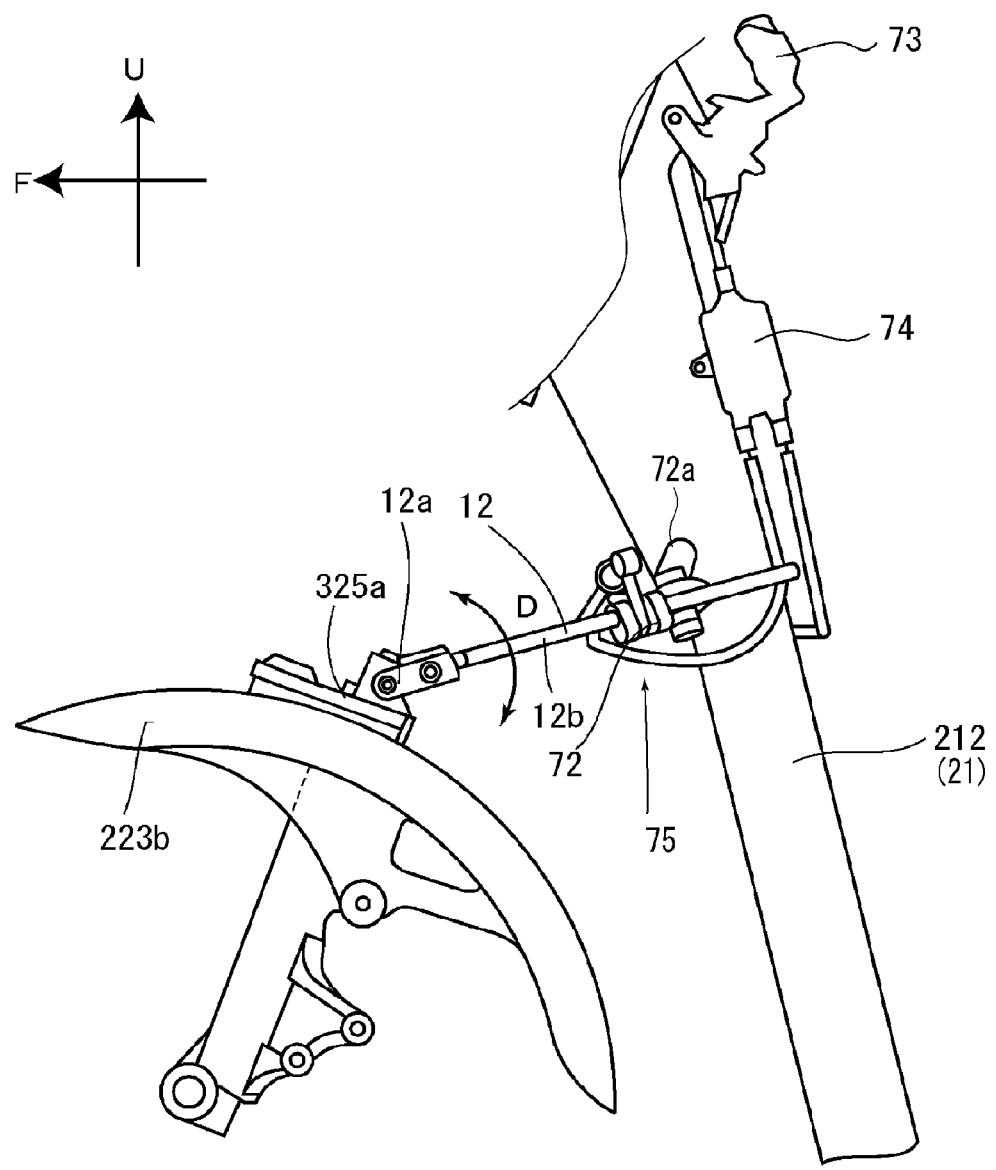
FIG. 9 is a left side view showing a portion of a transformation restricting mechanism of the three-wheeled vehicle of FIG. 1.

FIG. 9 is a left side view showing a portion of the restricting mechanism 75. The restricting mechanism 75 includes calipers 72, a lever 73, and a connecting mechanism 74. The calipers 72 are disposed directly to the right and left of the head pipe 211. However, only the left caliper 72 is shown in FIG. 9. Since the first connecting member 11 preferably has the same configuration as that of the second connecting member 12, the description of the first connecting member is omitted here. Only the second connecting member 12, which is located to the left of the head pipe 211, is shown in FIG. 9.

The second connecting member 12 includes a turn supporting portion 12a and a pole 12b. The turn supporting portion 12a supports one end of the pole 12b. The turn supporting portion 12a supports the pole 12b so that the pole 12b turns in a direction indicated by an arrow D about a turning axis that extends in the left-right direction of the vehicle body frame 21. The pole 12b extends rearward and upward from the second plate 325a. A rear end of the pole 12b is a free end. A portion of the pole 12b is supported by the caliper 72. The pole 12b and the caliper 72 are configured to be displaced relative to each other.

Figure 10:
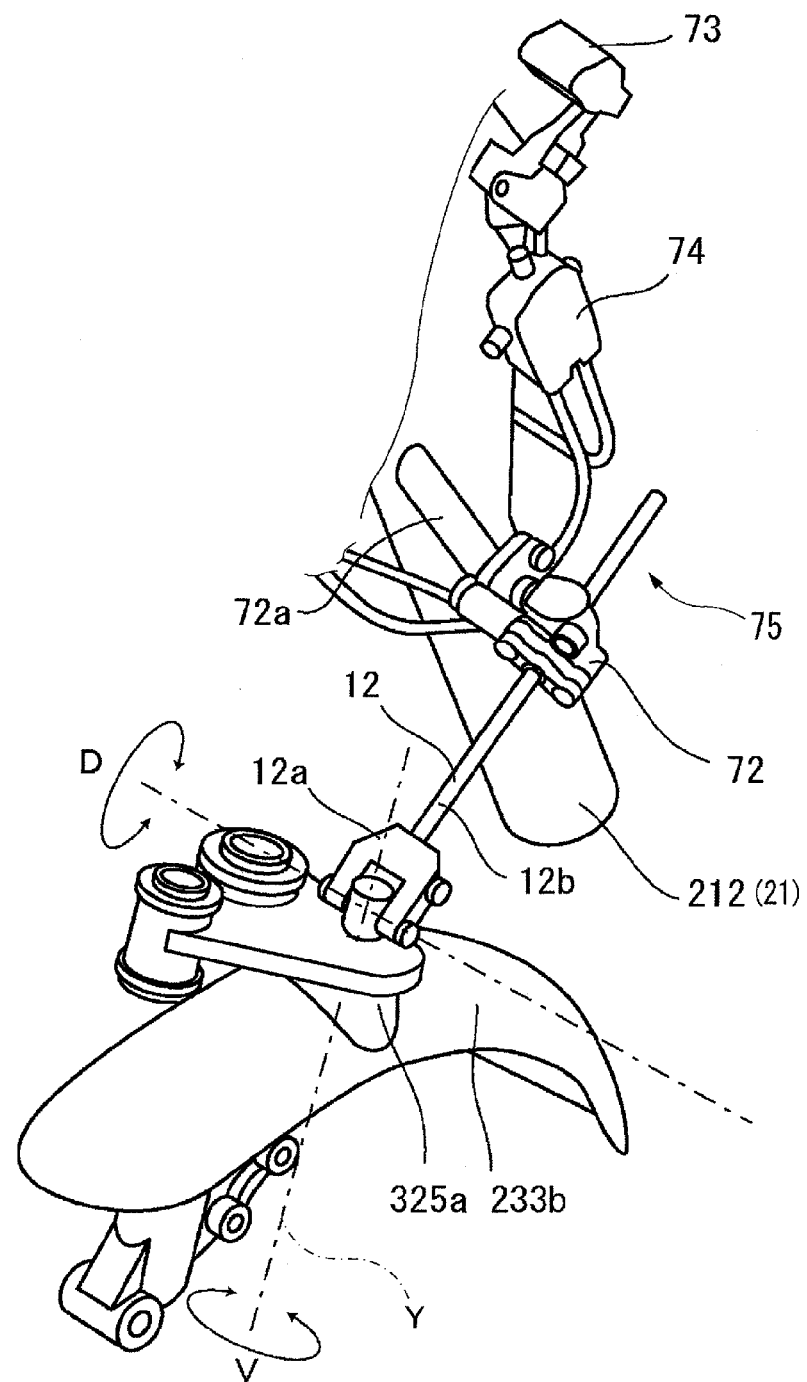
FIG. 10 is a perspective view showing a portion of the transformation restricting mechanism of the three-wheeled vehicle of FIG. 1.

FIG. 10 is a perspective view showing a portion of the restricting mechanism 75. The turn supporting portion 12a supports the pole 12b so that the pole 12b turns not only in a direction indicated by an arrow D but also in a direction indicated by an arrow V. The arrow V denotes a direction in which the pole 12b turns about a turning axis (the second center axis Y) that extends in the up-down direction of the vehicle body frame 21. The caliper 72 is disposed in an area outward of the down frame 212. The caliper 72 includes a supporting member 72a. The supporting member 72a is connected to the vehicle body frame 21. The lever 73 is disposed directly behind the down frame 212.

The lever 73 is used to operate the caliper 72. The lever 73 is connected to the connecting mechanism 74. The lever 73 is attached to the body cover 22.

The connecting mechanism 74 connects the lever 73 with the caliper 72. The connecting mechanism 74 operates the caliper 72 so as to hold the pole 12b of the second connecting member 12 when the lever 73 is operated.

As a result of the caliper 72 holding the pole 12b, a frictional force against a relative displacement between the second connecting member 12 and the caliper 72 is increased. This restricts the relative movement between the second connecting member 12 and the caliper 72. Similarly, a relative movement between the first connecting member 11 and the caliper 72 is also restricted. That is, when the lever 73 is operated, the caliper 72 restricts the movement of the first connecting member 11 and the second connecting member 12 relative to the head pipe 211.

When attempting to restrict the leaning of the three-wheeled vehicle 1 (that is, the transformation of the link mechanism 5) to park the vehicle or the like, the rider operates the lever 73. When the lever 73 is operated, the caliper 72 restricts the movement of the first connecting member 11 and the second connecting member 12 relative to the head pipe 211. This restricts the movement of the first front wheel 31 and the second front wheel 32 in the up-down direction of the vehicle body frame 21 such that the transformation of the link mechanism 5 is restricted. Since the transformation of the link mechanism 5 is restricted, the three-wheeled vehicle 1 is restricted from leaning further from the current state.

Thus, as has been described above, the transformation restricting mechanism 7 includes the first connecting member 11 and the second connecting member 12 (an example of a first portion) that are configured to be relatively displaced, and the calipers 72 (an example of a second portion) and the resisting force against the relative displacement of these elements is changed. As shown in FIG. 2, the first connecting member 11 and the second connecting member 12 include the turn supporting portions 11a, 12a (an example of a first supporting portion) that are supported by the first shock absorbing device 33 and the second shock absorbing device 35, respectively. As shown in FIG. 6, the caliper 72 includes a supporting member 72a (an example of a second supporting portion) that is supported by the vehicle body frame 21 (the down frame 212). As shown in FIG. 2, when the vehicle body frame 21 is in the upright state, the position where the turn supporting portion 11a is supported is located below the second cross member 52 in the up-down direction of the vehicle body frame 21, and is closer to the first center axis X than the intermediate axis Z in the left-right direction of the vehicle body frame 21. When the vehicle body frame 21 is in the upright state, the position where the turn supporting portion 12a is supported is located farther downward in the up-down direction of the vehicle body frame 21 than the second cross member 52, and is closer to the second center axis Y than the intermediate axis Z in the left-right direction of the vehicle body frame 21.

According to such a configuration, most of the portions of the first shock absorbing device 33 and the second shock absorbing device 35 are located below the second cross member 52 when the vehicle body frame 21 is in the upright state. Additionally, spaces are defined between the first shock absorbing device 33 and the second shock absorbing device 35, and between the link mechanism 5 and the vehicle body frame 21 so as to avoid interference therebetween. When the vehicle body frame 21 is in the upright state, the turn supporting portions 11a, 12a of the transformation restricting mechanism 7 are supported by the first shock absorbing device 33 and the second shock absorbing device 35, respectively, in the positions below the second cross member 52 in the up-down direction of the vehicle body frame 21 such that a movable range of the transformation restricting mechanism 7 is smaller than a movable range of the link mechanism 5. In addition, the space defined between the first shock absorbing device 33 and the second shock absorbing device 35 and the space defined between the link mechanism 5 and the vehicle body frame 21 are also used as the movable range of the transformation restricting mechanism 7.

Further, a portion of the vehicle body frame 21 is located above the first shock absorbing device 33 and the second shock absorbing device 35 when viewed from the first shock absorbing device 33 and the second shock absorbing device 35. In other words, portions where the supporting members 72a of the transformation restricting mechanism 7 are supported exist over a wide range, thus enhancing the degree of freedom in design. This makes it easy to support the supporting members 72a at portions that help to make the movable range of the transformation restricting mechanism 7 smaller. This makes the movable range of the transformation restricting mechanism 7 smaller.

In the event that the transformation restricting mechanism 7 is supported by the first shock absorbing device 33 and the second shock absorbing device 35, the movable range of the transformation restricting mechanism 7 would be increased due to the relative turning described above. However, the turn supporting portions 11a, 12a are supported by the first shock absorbing device 33 and the second shock absorbing device 35 in the positions that are closer to the first center axis X and the second center axis Y, respectively, than the intermediate axis Z. Accordingly, it is possible to significantly reduce or prevent the expansion of the movable range of the transformation restricting mechanism 7 that would otherwise be caused in association with the relative turning described above. In addition, the space defined between the first shock absorbing device 33 and the second shock absorbing device 35 and the space defined between the link mechanism 5 and the vehicle body frame 21 are preferably used as the movable range of the transformation restricting mechanism 7, thus making it possible to significantly reduce or prevent the expansion of the movable range of the transformation restricting mechanism 7 that would otherwise be caused in association with the relative turning described above.

According to such a configuration described above, the movable range of the transformation restricting mechanism 7 is smaller than the movable range of the link mechanism 5. Additionally, even though the first shock absorbing device 33 and the second shock absorbing device 35 turn, it is possible to significantly reduce or prevent the expansion of the movable range of the transformation restricting mechanism 7. Consequently, the movable range of the transformation restricting mechanism 7 that restricts the operation of the link mechanism 5 is spaced away from the steering shaft 60. Thus, even though a function to restrict the operation of the link mechanism 5 is provided, it is possible to significantly reduce or prevent an increase in the size of a peripheral construction of the steering shaft 60 that is disposed above the two front wheels 31, 32.

As shown in FIGS. 9 and 10, when the vehicle body frame 21 is in the upright state, the supporting members 72a of the calipers 72 are disposed above the turn supporting portions 11a, 12a.

According to this configuration, the turn supporting portions 11a, 12a and the supporting members 72a relatively move in the up-down direction of the vehicle body frame 21 as the vehicle body frame 21 leans. Accordingly, the transformation restricting mechanism 7 is preferably configured to include the turn supporting portions 11a, 12a at a lower portion thereof and the supporting members 72a at an upper portion thereof, and to change the resisting force against the relative movement of the turn supporting portions 11a, 12a and the supporting members 72a in the up-down direction. This enables the transformation restricting mechanism 7 to be made smaller in size and simplified in structure. Additionally, the movable range of the transformation restricting mechanism 7 is made smaller. Consequently, even though the function to restrict the operation of the link mechanism 5 is provided, it is possible to significantly reduce or prevent an increase in the size of the peripheral construction of the steering shaft 60 that is disposed above the two front wheels 31, 32.

As shown in FIG. 6, when the vehicle body frame 21 is in the upright state, the supporting members 72a are disposed closer to the intermediate axis Z than the first center axis X and the second center axis Y.

According to this configuration, the turn supporting portions 11a, 12a and the supporting members 72a relatively move in the up-down direction of the vehicle body frame 21 as the vehicle body frame 21 leans. In addition, the supporting members 72a also relatively move in the left-right direction of the vehicle body frame 21 as the vehicle body frame 21 leans. This allows the transformation restricting mechanism 7 to make use of at least either the movement in the up-down direction or the movement in the left-right direction. Additionally, in conjunction with the fact that the space defined between the link mechanism 5 and the vehicle body frame 21 and the space defined between the first shock absorbing device 33 and the second shock absorbing device 35 are preferably used as the movable range of the transformation restricting mechanism 7, the transformation restricting mechanism 7 is made smaller in size and simplified in structure. In addition, the movable range of the transformation restricting mechanism 7 is smaller. Consequently, even though the function to restrict the operation of the link mechanism 5 is provided, it is possible to significantly reduce or prevent an increase in the size of the peripheral construction of the steering shaft 60 that is disposed above the two front wheels 31, 32.

As has been described with reference to FIG. 10, the first connecting member 11 and the second connecting member 12 are configured to turn about the axes that extend in the up-down direction of the vehicle body frame 21 (the first center axis X and the second center axis Y) relative to the first shock absorbing device 33 and the second shock absorbing device 35, respectively.

According to this configuration, the turning axes of the first shock absorbing device 33 and the second shock absorbing device 35 and the turning axes of the first connecting member 11 and the second connecting member 12 both extend in the up-down direction of the vehicle body frame 21. This significantly reduces or prevents the expansion of movable ranges of the first connecting member 11 and the second connecting member 12 when they turn as the first shock absorbing device 33 and the second shock absorbing device 35 turn. Consequently, even though the function to restrict the operation of the link mechanism 5 is provided, it is possible to significantly reduce or prevent an increase in the size of the peripheral construction of the steering shaft 60 that is disposed above the two front wheels 31, 32.

As shown in FIG. 2, the first connecting member 11 includes the turn supporting portion 11a (an example of a right first supporting portion) that is supported by a first supporting portion 331 that is disposed at a lower portion of the first shock absorbing device 33. The second connecting member 12 includes the turn supporting portion 12a (an example of a left first supporting portion) that is supported by a second supporting portion 321 that is disposed at a lower portion of the second shock absorbing device 35. When the vehicle body frame 21 is in the upright state, the position where the turn supporting portion 11a is supported is located below the second cross member 52 in the up-down direction of the vehicle body frame 21 and closer to the first center axis X than the intermediate axis Z in the left-right direction of the vehicle body frame 21. When the vehicle body frame 21 is in the upright state, the position where the turn supporting portion 12a is supported is located below the second cross member 52 in the up-down direction of the vehicle body frame 21 and closer to the second center axis Y than the intermediate axis Z in the left-right direction of the vehicle body frame 21.

According to this configuration, the resisting force that is imparted by the transformation restricting mechanism 7 is exerted so as to restrict the displacement of the first shock absorbing device 33 and the second shock absorbing device 35.

In the configuration according to the first preferred embodiment, the movement of the first front wheel 31 and the second front wheel 32 relative to the head pipe 211 is restricted in such a state that the first front wheel 31 and the second front wheel 32 are located in different positions relative to the up-down direction of the vehicle body frame 21. Therefore, the three-wheeled vehicle 1 can be parked while in a leaning state or in a state in which one of the front wheels 3 is on an elevated portion of the road surface or the like.

In the configuration according to the first preferred embodiment, a portion of the transformation restricting mechanism 7 is disposed below the second cross member 52. Therefore, the center of gravity of the three-wheeled vehicle 1 is located in a lower position compared to a configuration in which the entire transformation restricting mechanism 7 is disposed above the second cross member 52.

In the configuration according to the first preferred embodiment, the turn supporting portion 11a is disposed at the first connecting point 333c. In addition, the turn supporting portion 12a is disposed at the second connecting point 325c. Accordingly, even though the first front wheel 31 turns about the first center axis X and the second front wheel 32 turns about the second center axis Y, the positions of the first connecting point 333c and the second connecting point 325c relative to the head pipe 211 are unchanged. Consequently, the turning of the first front wheel 31 and the second front wheel 32 is not interrupted by the first connecting member 11 and the second connecting member 12.

Second Preferred Embodiment

Figure 11:
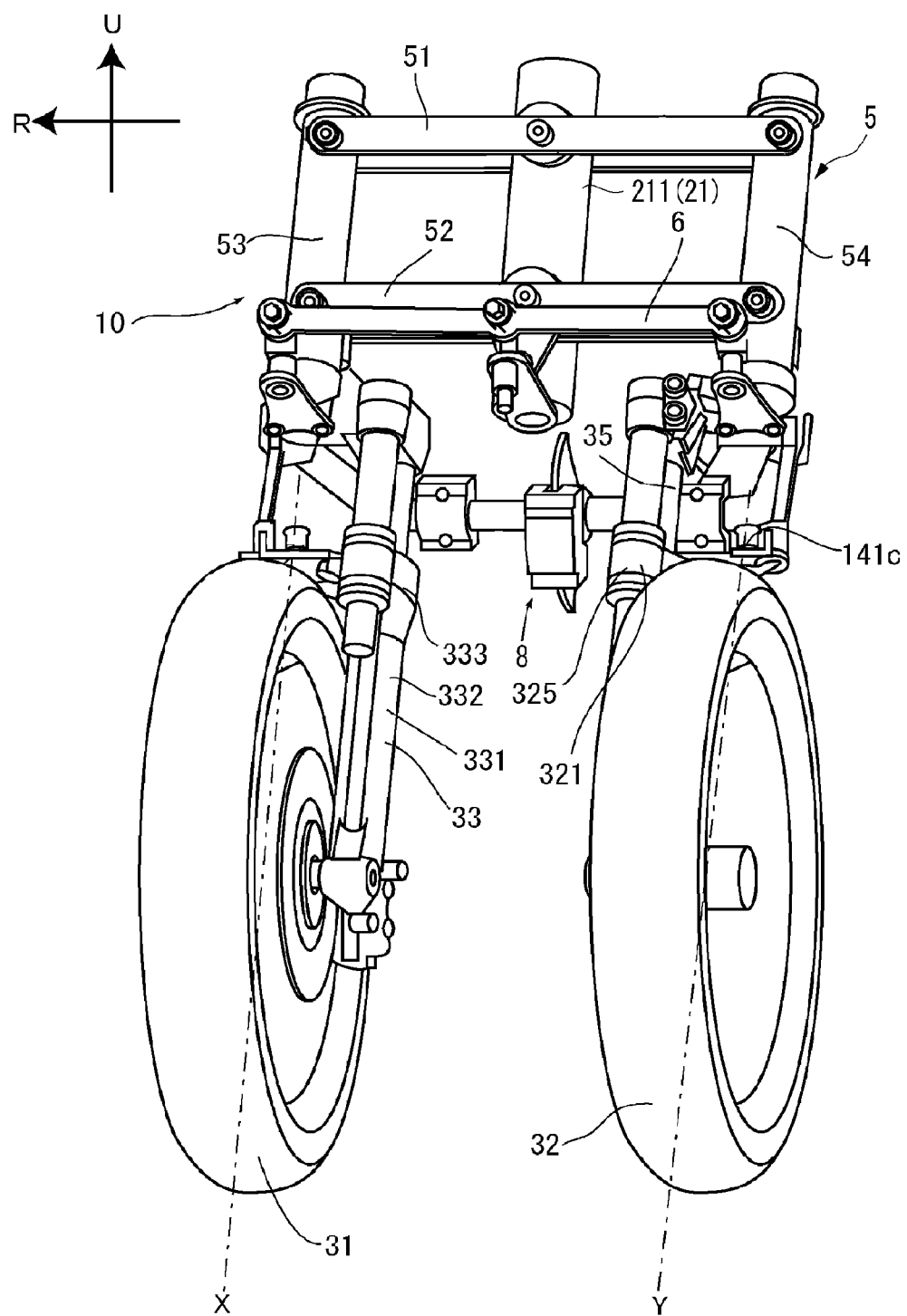
FIG. 11 is a perspective front view of a portion of a three-wheeled vehicle according to a second preferred embodiment of the present invention.
Figure 12:
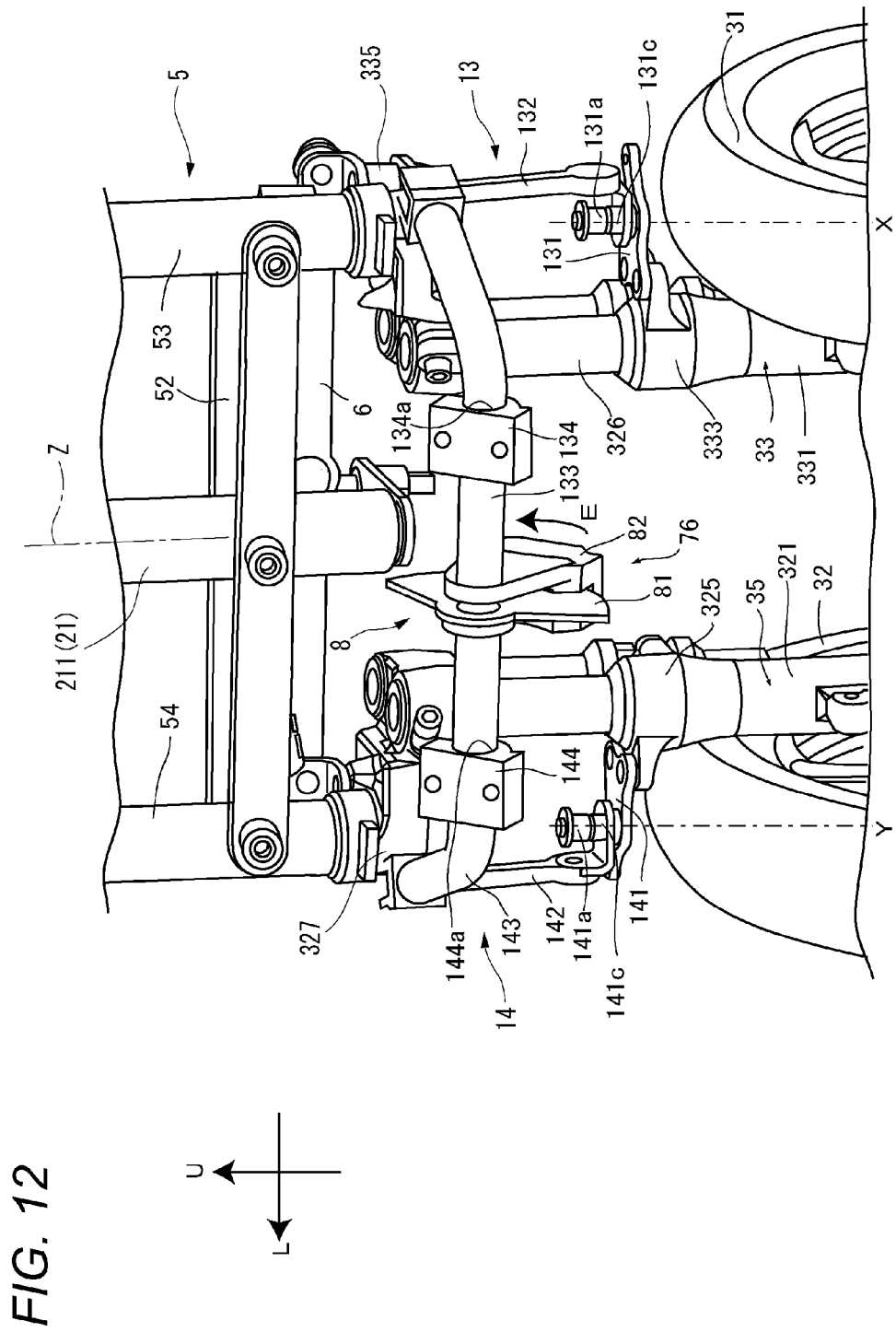
FIG. 12 is a perspective rear view showing a front portion of the three-wheeled vehicle of FIG. 11.
Figure 13:
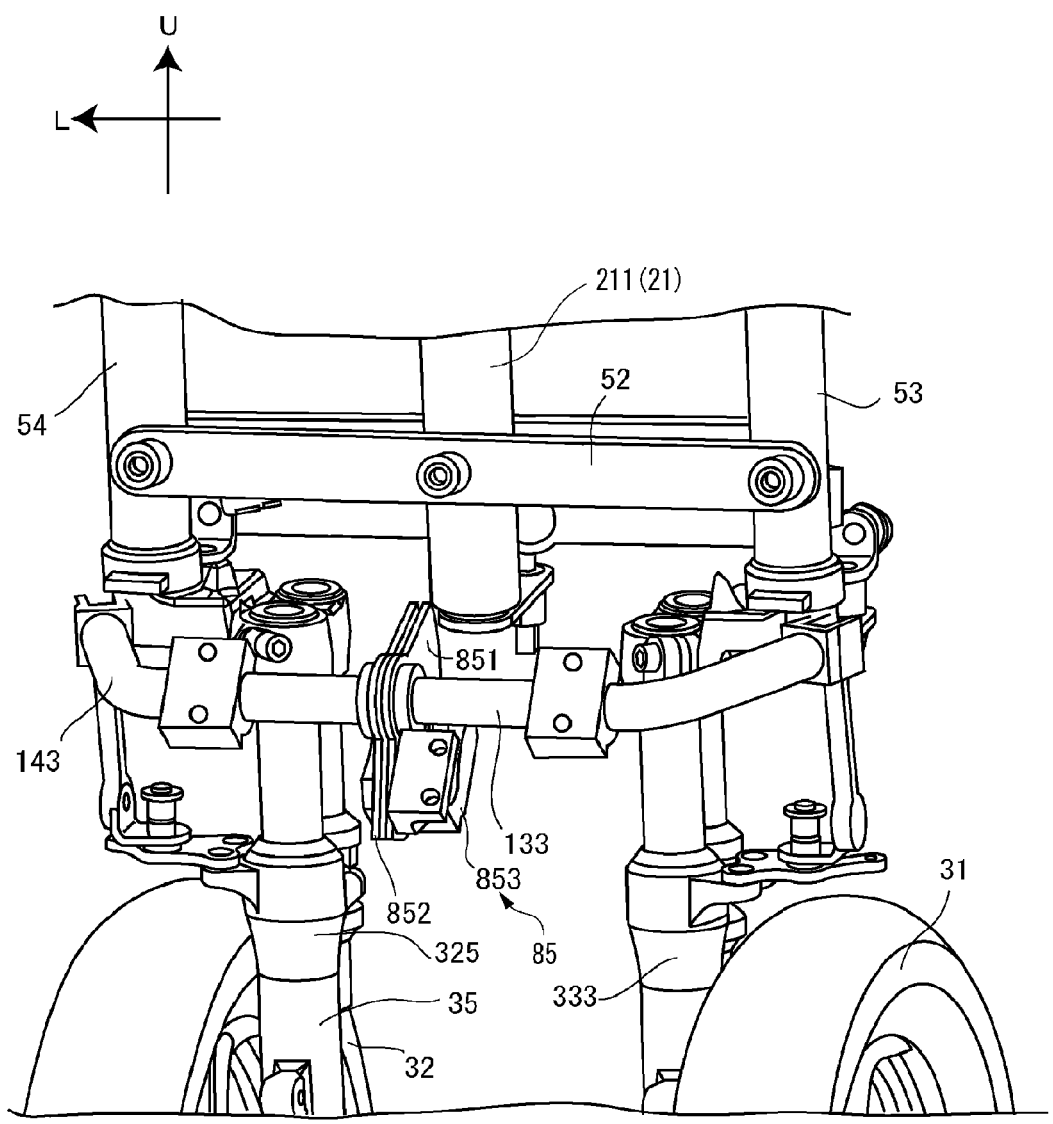
FIG. 13 is a perspective rear view showing a three-wheeled vehicle according to a modified example of the second preferred embodiment of the present invention.

Referring to FIGS. 11 to 13, a three-wheeled vehicle 10 according to a second preferred embodiment of the present invention will be described. FIG. 11 is a perspective view showing a portion of the three-wheeled vehicle 10. In FIG. 11, a handlebar and a steering shaft are omitted from illustration. Elements having the same or similar configurations as those described in the first preferred embodiment will be omitted from illustration or like reference numerals will be assigned to those elements so as to avoid the repetition of the same or similar descriptions.

The three-wheeled vehicle 10 according to the second preferred embodiment includes a transformation restricting mechanism 8. The transformation restricting mechanism 8 differs from the transformation restricting mechanism 7 according to the first preferred embodiment in the configuration of restricting the transformation of a link mechanism 5.

FIG. 12 is an enlarged view of a portion of the three-wheeled vehicle 10 as viewed from the rear. The transformation restricting mechanism 8 includes a first connecting member 13, a second connecting member 14, and a restricting mechanism 76.

A first supporting member 331 of a first shock absorbing device 33 includes a first guide 333. The first guide 333 includes a first supporting plate 131. The first supporting plate 131 is located above a first front wheel 31. The first supporting plate 131 extends from the first guide 333 rightward of a vehicle body frame 21. The first supporting plate 131 includes a first fixing member 131a. The first fixing member 131a is disposed at a first connecting point 131c where a first center axis X intersects the first supporting plate 131.

The first connecting member 13 includes a first supporting arm 132, a first connecting arm 133, and a first mounting member 134.

The first supporting arm 132 extends in a direction in which the first supporting arm 132 intersects the first supporting plate 131. The first supporting arm 132 is fixed to the first fixing member 131a. The first connecting arm 133 is turnably supported by an upper end portion of the first supporting arm 132. The first supporting arm 132 is configured to turn about the first center axis X at the first connecting point 131c where the first center axis X intersects the first supporting plate 131. Namely, the first supporting arm 132 and the first connecting arm 133 are configured to be displaced relative to each other.

One end portion of the first connecting arm 133 is connected to a first bracket 335 that is supported by a first side member 53 of the link mechanism 5. The first connecting arm 133 extends leftward and rearward from the upper end portion of the first supporting arm 132. The first mounting member 134 is fixed to the vehicle body frame 21. A first through hole 134a is provided in the first mounting member 134 so as to extend in a left-right direction of the vehicle body frame 21. A portion of the first connecting arm 133 is disposed inside the first through hole 134a. The first connecting arm 133 is configured to turn about a turning axis that extends in the left-right direction of the vehicle body frame 21 at the portion where the first connecting arm 133 is supported by the first mounting member 134.

A second supporting member 321 of a second shock absorbing device 35 includes a second guide 325. The second guide 325 includes a second supporting plate 141. The second supporting plate 141 is located above a second front wheel 32. The second supporting plate 141 extends from the second guide 325 leftward of the vehicle body frame 21. The second supporting plate 141 includes a second fixing portion 141a. The second fixing member 141a is disposed at a second connecting point 141c where a second center axis Y intersects the second supporting plate 141.

The second connecting member 14 includes a second supporting arm 142, a second connecting arm 143, and a second mounting member 144.

The second supporting arm 142 extends in a direction in which the second supporting arm 142 intersects the second supporting plate 141. The second supporting arm 142 is fixed to the second fixing member 141a. The second connecting arm 143 is turnably supported by an upper end portion of the second supporting arm 142. The second supporting arm 142 is configured to turn about the second center axis Y at the second connecting point 141c where the second center axis Y intersects the second supporting plate 141. Namely, the second supporting arm 142 and the second connecting arm 143 are configured to be displaced relative to each other.

One end portion of the second connecting arm 143 is connected to a second bracket 327 that is supported by a second side member 54 of the link mechanism 5. The second connecting arm 143 extends rightward and rearward from the upper end portion of the second supporting arm 142. The second mounting member 144 is fixed to the vehicle body frame 21. A second through hole 144a is provided in the second mounting member 144 so as to extend in the left-right direction of the vehicle body frame 21. A portion of the second connecting arm 143 is disposed inside the second through hole 144a. The second connecting arm 143 is configured to turn about a turning axis that extends in the left-right direction of the vehicle body frame 21 at the portion where the second connecting arm 143 is supported by the second mounting member 144.

The restricting mechanism 76 includes a disc 81 and a caliper 82.

The disc 81 is attached to a right end portion of the second connecting arm 143. The disc 81 is configured to turn relative to the second connecting arm 143. Consequently, when the second connecting arm 143 is turned about an axis that extends in the left-right direction of the vehicle body frame 21, the disc 81 is turned about a connecting portion with the second connecting arm 143. The disc 81 is preferably a fan-shaped plate.

The caliper 82 is attached to a left end portion of the first connecting arm 133. The caliper 82 is configured to turn relative to the first connecting arm 133. Consequently, when the first connecting arm 133 is turned about an axis that extends in the left-right direction of the vehicle body frame 21, the caliper 82 is turned about a connecting portion with the first connecting arm 133. A groove is provided in the caliper 82. The disc 81 is inserted in the groove in the caliper 82. A pad (not shown) is disposed in the groove in the caliper 82. A mechanism (not shown) that is configured to press the pad against the disc 81 is provided on the caliper 82. The caliper 82 restricts the rotation of the disc 81 relative to the caliper 82 by pressing the pad against the disc 81. When a switch 23a (refer to FIG. 1) that is mounted on a handlebar 23 is operated, the caliper 82 restricts the turning of the disc 81.

When the first front wheel 31 moves to a location higher than the second front wheel 32, the first supporting portion 331 moves upward. In accordance with the movement of the first supporting portion 331, the first supporting plate 131 and the first supporting arm 132 move upward. When the first supporting arm 132 moves upward, a right end portion of the first connecting arm 133 is lifted upward. Since the first connecting arm 133 is supported so as to turn relative to the first mounting member 134, the first connecting arm 133 turns about a turning center axis that extends in the left-right direction of the vehicle body frame 21. In accordance with the turning of the first connecting arm 133, the caliper 82 turns in a direction indicated by an arrow E.

When the second front wheel 32 moves upward, the second supporting member 321 moves upward. In accordance with the movement of the second supporting member 321, the second supporting plate 141 and the second supporting arm 142 move upward. When the second supporting arm 142 moves upward, a left end portion of the second connecting arm 143 is lifted upward. Since the second connecting arm 143 is supported so as to turn relative to the second mounting member 144, the second connecting arm 143 turns about a turning center axis that extends in the left-right direction of the vehicle body frame 21. In accordance with the turning of the second connecting arm 143, the disc 81 turns in the direction indicated by the arrow E.

When the first front wheel 31 and the second front wheel 32 move relatively in the up-down direction of the vehicle body frame 21, the caliper 82 and the disc 81 turn relatively. When the switch 23a is operated, the pad provided in the groove in the caliper 82 is pressed against the disc 81. The turning of the disc 81 relative to the caliper 82 is restricted in this manner. When the turning of the disc 81 relative to the caliper 82 is restricted, the resistance to a relative displacement between the first supporting arm 132 and the first connecting arm 133 is increased. Similarly, the resistance to a relative displacement between the second supporting arm 142 and the second connecting arm 143 is increased. Accordingly, the relative movement between the first front wheel 31 and the second front wheel 32 is restricted in the up-down direction of the vehicle body frame 21. Additionally, the first connecting arm 133 and the second connecting arm 143 are connected to the first side member 53 and the second side member 54, respectively. Thus, the displacement of the first side member 53 and the second side member 54 in the up-down direction of the vehicle body frame 21 is also restricted such that the transformation of the link mechanism 5 is restricted.

As has been described heretofore, the transformation restricting mechanism 8 includes the first connecting member 13 and the second connecting member 14. The first connecting member 13 includes the first supporting arm 132 (an example of a first portion) and the first connecting arm 133 (an example of a second portion) that are displaced relatively. The resisting force against the relative displacement thereof is changed by the restricting mechanism 76. The first supporting arm 132 is supported by the first shock absorbing device 33 in the first fixing member 131a (an example of a first supporting portion). The first connecting arm 133 is supported by the vehicle body frame 21 in the first mounting member 134 (an example of a second supporting portion). The second connecting member 14 includes the second supporting arm 142 (an example of a first portion) and the second connecting arm 143 (an example of a second portion) that are displaced relatively. The resisting force against the relative displacement thereof is changed by the restricting mechanism 76. The second supporting arm 142 is supported by the second shock absorbing device 35 in the second fixing member 141a (an example of a first supporting portion). The second connecting arm 143 is supported by the vehicle body frame 21 in the second mounting member 144 (an example of a second supporting portion). When the vehicle body frame 21 is in the upright state, the position where the first fixing member 131a is supported is located below the second cross member 52 in the up-down direction of the vehicle body frame 21 and closer to the first center axis X than the intermediate axis Z in the left-right direction of the vehicle body frame 21. When the vehicle body frame 21 is in the upright state, the position where the second fixing member 141a is supported is located below the second cross member 52 in the up-down direction of the vehicle body frame 21 and closer to the second center axis Y than the intermediate axis Z in the left-right direction of the vehicle body frame 21.

According to such a configuration, most of the portions of the first shock absorbing device 33 and the second shock absorbing device 35 are located below the second cross member 52 when the vehicle body frame 21 is in the upright state. Additionally, spaces are defined between the first shock absorbing device 33 and the second shock absorbing device 35, and between the link mechanism 5 and the vehicle body frame 21 so as to avoid interference therebetween. When the vehicle body frame 21 is in the upright state, the first fixing member 131a and the second fixing member 141a of the transformation restricting mechanism 8 are supported by the first shock absorbing device 33 and the second shock absorbing device 35, respectively, in the positions located below the second cross member 52 in the up-down direction of the vehicle body frame 21 such that a movable range of the transformation restricting mechanism 8 is smaller than a movable range of the link mechanism 5. In addition, the space defined between the first shock absorbing device 33 and the second shock absorbing device 35 and the space defined between the link mechanism 5 and the vehicle body frame 21 are also preferably used as the movable range of the transformation restricting mechanism 8.

Further, a portion of the vehicle body frame 21 is located above the first shock absorbing device 33 and the second shock absorbing device 35 when viewed from the first shock absorbing device 33 and the second shock absorbing device 35. In other words, portions where the first mounting member 134 and the second mounting member 144 of the transformation restricting mechanism 8 are supported exist over a wide range, thus enhancing the degree of freedom in design. This makes it easy to support the support the first mounting member 134 and the second mounting member 144 at portions that help to make the movable range of the transformation restricting mechanism 8 smaller. This makes the movable range of the transformation restricting mechanism 8 smaller.

In the event that the transformation restricting mechanism 8 is supported by the first shock absorbing device 33 and the second shock absorbing device 35, the movable range of the transformation restricting mechanism 8 would be increased due to the relative turning described above. However, the first fixing member 131a and the second fixing member 141a are supported by the first shock absorbing device 33 and the second shock absorbing device 35 in positions located closer to the first center axis X and the second center axis Y, respectively, than the intermediate axis Z. Accordingly, it is possible to significantly reduce or prevent the expansion of the movable range of the transformation restricting mechanism 8 that would otherwise be caused in association with the relative turning described above. In addition, the space defined between the first shock absorbing device 33 and the second shock absorbing device 35 and the space defined between the link mechanism 5 and the vehicle body frame 21 are preferably used as the movable range of the transformation restricting mechanism 8. Accordingly, it is possible to significantly reduce or prevent the expansion of the movable range of the transformation restricting mechanism 8 that would otherwise be caused in association with the relative turning described above.

According to such a configuration described above, the movable range of the transformation restricting mechanism 8 is smaller than the movable range of the link mechanism 5. Additionally, even though the first shock absorbing device 33 and the second shock absorbing device 35 turn, it is possible to significantly reduce or prevent the expansion of the movable range of the transformation restricting mechanism 8. Consequently, the movable range of the transformation restricting mechanism 8 serving to restrict the operation of the link mechanism 5 is spaced away from the steering shaft 60. Thus, even though a function to restrict the operation of the link mechanism 5 is provided, it is possible to significantly reduce or prevent an increase in the size of a peripheral construction of the steering shaft 60 that is disposed above the two front wheels 31, 32.

When the vehicle body frame 21 is in the upright state, the first mounting member 134 and the second mounting member 144 are disposed above the first fixing member 131a and the second fixing member 141a.

According to this configuration, as the vehicle body frame 21 leans, the first fixing member 131a and the second fixing member 141a move relatively in the up-down direction of the vehicle body frame 21, and the first mounting member 134 and the second mounting member 144 also move relatively in the up-down direction of the vehicle body frame 21. Accordingly, the transformation restricting mechanism 8 is preferably configured to include the first fixing member 131a and the second fixing member 141a at a lower portion thereof and the first mounting member 134 and the second mounting member 144 at an upper portion thereof, and to change the resisting force against the relative movement of the first fixing member 131a and the second fixing member 141a in the up-down direction and the relative movement of the first mounting member 134 and the second mounting member 144 in the up-down direction. This enables the transformation restricting mechanism 8 to be smaller in size and simplified in structure. Additionally, the movable range of the transformation restricting mechanism 8 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

When the vehicle body frame 21 is in the upright state, the first mounting member 134 and the second mounting member 144 are disposed closer to the intermediate axis Z than the first center axis X and the second center axis Y.

According to this configuration, as the vehicle body frame 21 leans, the first fixing member 131a and the second fixing member 141a move relatively in the up-down direction of the vehicle body frame 21, and the first mounting member 134 and the second mounting member 144 also move relatively in the up-down direction of the vehicle body frame 21. In addition, the supporting members 72a also relatively move in the left-right direction of the vehicle body frame 21 as the vehicle body frame 21 leans. This allows the transformation restricting mechanism 8 to make use of at least either the movements in the up-down direction or the movements in the left-right direction. Additionally, in conjunction with the fact that the space defined between the link mechanism 5 and the vehicle body frame 21 and the space defined between the first shock absorbing device 33 and the second shock absorbing device 35 are preferably used as the movable range of the transformation restricting mechanism 8, the transformation restricting mechanism 8 is made smaller in size and simplified in structure. In addition, the movable range of the transformation restricting mechanism 8 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first supporting arm 132 and the second supporting arm 142 are configured to turn about axes that extend in the up-down direction of the vehicle body frame 21 (the first center axis X and the second center axis Y) relative to the first shock absorbing device 33 and the second shock absorbing device 35, respectively.

According to this configuration, the turning axes of the first shock absorbing device 33 and the second shock absorbing device 35 and the turning axes of the first supporting arm 132 and the second supporting arm 142 both extend in the up-down direction of the vehicle body frame 21. Accordingly, it is possible to significantly reduce or prevent the expansion of movable ranges of the first supporting arm 132 and the second supporting arm 142 in accordance with turning of the first shock absorbing device 33 and the second shock absorbing device 35. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first supporting arm 132 includes the first fixing member 131a (an example of a right first supporting portion) that is supported by the first supporting portion 331 that is disposed at the lower portion of the first shock absorbing device 33. The second supporting arm 142 includes the second fixing member 141a (an example of a left first supporting portion) that is supported by the second supporting portion 321 that is disposed at the lower portion of the second shock absorbing device 35. When the vehicle body frame 21 is in the upright state, the position where the first fixing member 131a is supported is located below the second cross member 52 in the up-down direction of the vehicle body frame 21 and closer to the first center axis X than the intermediate axis Z in the left-right direction of the vehicle body frame 21. When the vehicle body frame 21 is in the upright state, the position where the second fixing member 141a is supported is located below the second cross member 52 in the up-down direction of the vehicle body frame 21 and closer to the second center axis Y than the intermediate axis Z in the left-right direction of the vehicle body frame 21.

According to this configuration, the resisting force that is imparted by the transformation restricting mechanism 8 is exerted so as to restrict the displacement of the first shock absorbing device 33 and the second shock absorbing device 35.

In the configuration according to the second preferred embodiment, the movement of the first front wheel 31 and the second front wheel 32 relative to the head pipe 211 is restricted in such a state that the first front wheel 31 and the second front wheel 32 are located in different positions relative to the up-down direction of the vehicle body frame 21. Therefore, the three-wheeled vehicle 10 can be parked in a leaning state or in a state in which one of the front wheels 3 is on an elevated portion on the road surface or the like.

In the configuration according to the second preferred embodiment, a portion of the transformation restricting mechanism 8 is disposed below the second cross member 52. Therefore, the center of gravity of the three-wheeled vehicle 10 is located in a lower position compared to a configuration in which the entire transformation restricting mechanism 8 is disposed above the second cross member 52.

In the configuration according to the second preferred embodiment, one end portion of the first supporting arm 132 is disposed at the first connecting point 131c. In addition, one end portion of the second supporting arm 142 is disposed at the second connecting point 141c. Accordingly, even though the first front wheel 31 turns about the first center axis X and the second front wheel 32 turns about the second center axis Y, the positions of the first connecting point 131c and the second connecting point 141c relative to the head pipe 211 are unchanged. Consequently, the turning of the first front wheel 31 and the second front wheel 32 is not interrupted by the first supporting arm 132 and the second supporting arm 142.

Modified Example of the Second Preferred Embodiment

In the three-wheeled vehicle 10 according to the second preferred embodiment, the restricting mechanism 76 preferably includes the disc 81 and the caliper 82, for example. However, the restricting mechanism 76 may be replaced by a configuration that will be described below.

FIG. 13 is a view of a restricting mechanism 85 according to a modified example of the second preferred embodiment. The restricting mechanism 85 preferably includes a first disc 851, a second disc 852, and a caliper 853.

The first disc 851 is preferably a fan-shaped plate. The first disc 851 is fixed to the left end portion of the first connecting arm 133. Consequently, the first disc 851 is turned in accordance with the turning of the first connecting arm 133.

The second disc 852 is a fan-shaped plate. The second disc 852 is fixed to the right end portion of the second connecting arm 143. Consequently, the second disc 852 is turned in accordance with the turning of the second connecting arm 143. The second disc 852 is disposed directly to the left of the first disc 851.

The caliper 853 is fixed to the vehicle body frame 21. The caliper 853 includes a groove which is configured to accommodate a portion of the first disc 851 and a portion of the second disc 852. The caliper 853 includes a pad (not shown) inside the groove. The caliper 853 restricts the turning of each of the first disc 851 and the second disc 852 by pressing the pad against the first disc 851 and the second disc 852 individually within the groove.

In the modified example, the single caliper 853 is configured so as to restrict the turning of the first disc 851 and the second disc 852. As another modified example, a configuration may be used in which the restricting mechanism 85 includes a first caliper to restrict the turning of the first disc 851 and a second caliper to restrict the turning of the second disc 852.

Third Preferred Embodiment

Figure 14:
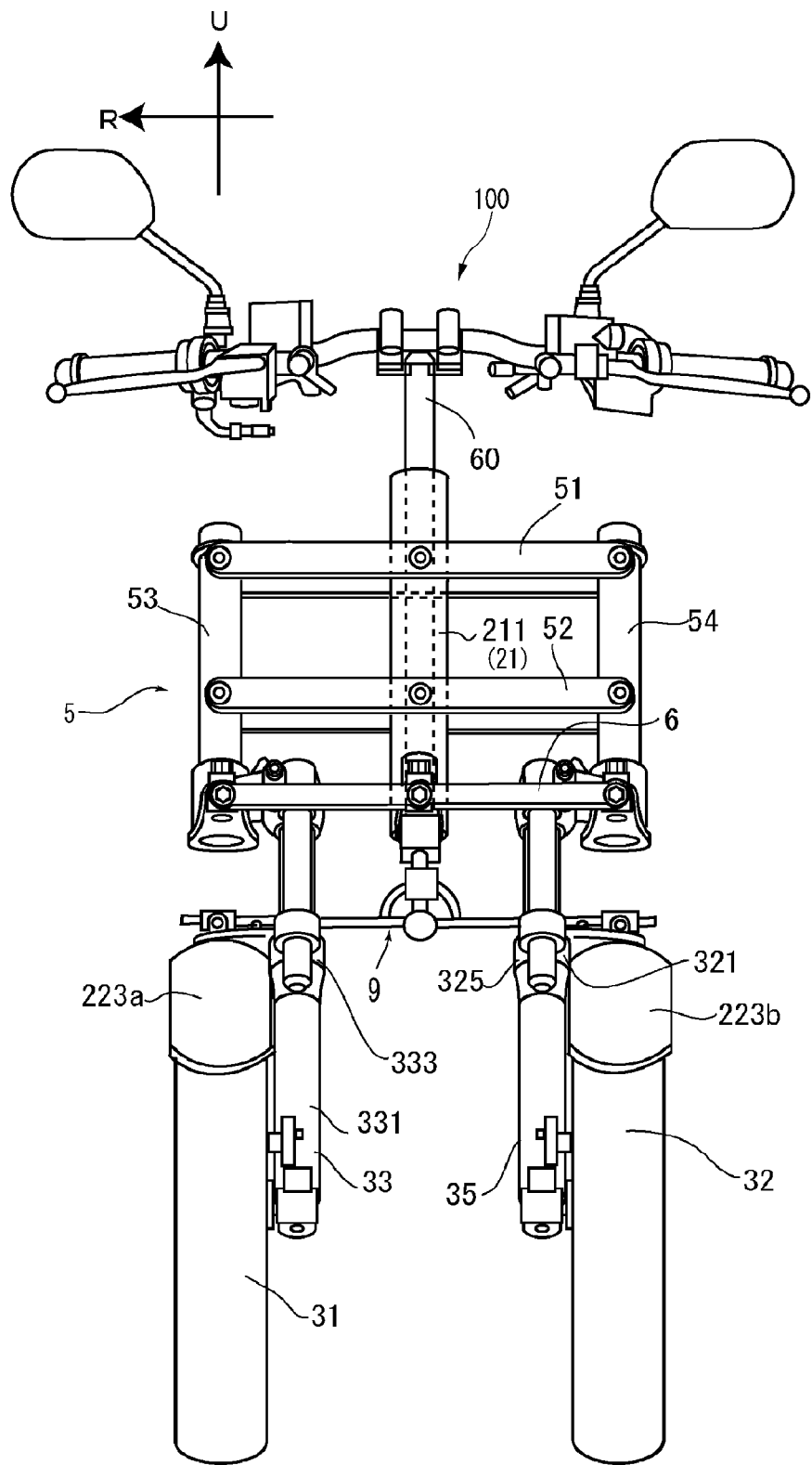
FIG. 14 is a front view showing a three-wheeled vehicle according to a third preferred embodiment of the present invention in a condition that a vehicle body cover is removed.

Next, referring to FIGS. 14 to 17, a three-wheeled vehicle 100 according to a third preferred embodiment of the present invention will be described. FIG. 14 is a front view of the three-wheeled vehicle 100 in a condition in which a body cover 22 is removed. Elements having the same or similar configurations as those described in the first preferred embodiment will be omitted from illustration or like reference numerals will be assigned to those elements so as to avoid the repetition of the same or similar descriptions.

The three-wheeled vehicle 100 according to the third preferred embodiment includes a transformation restricting mechanism 9. The transformation restricting mechanism 9 differs from the transformation restricting mechanism 7 according to the first preferred embodiment in the configuration that restricts the transformation of a link mechanism 5.

Figure 15:
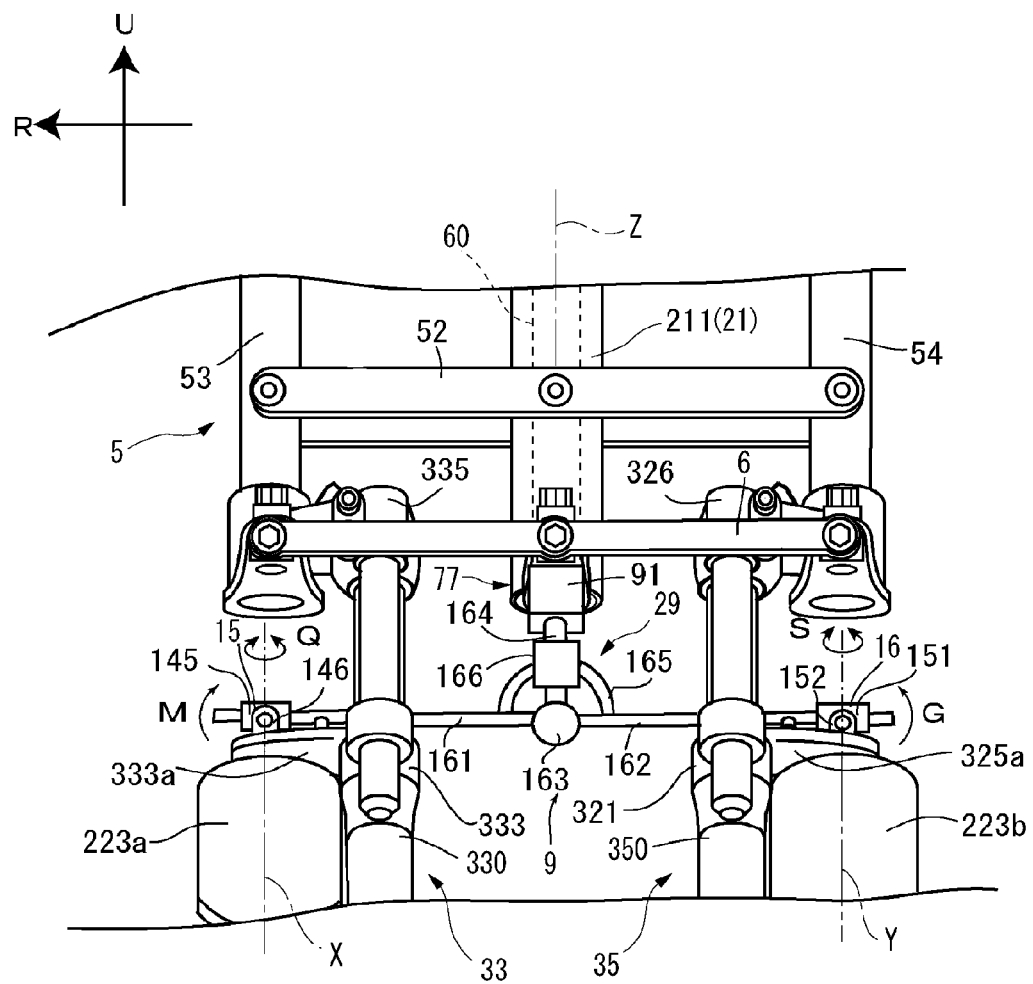
FIG. 15 is a front view showing a transformation restricting mechanism of the three-wheeled vehicle of FIG. 14.

FIG. 15 is an enlarged front view showing the configuration of a portion of the transformation restricting mechanism 9. The transformation restricting mechanism 9 includes a first connecting portion 15, a second connecting portion 16, a restricting mechanism 29, and a fixing mechanism 77.

The first connecting portion 15 is attached to the first plate 333a of the first shock absorbing device 33. The first connecting portion 15 includes a first supporting cylinder 145 and a first cylinder supporting portion 146. The first supporting cylinder 145 extends in a left-right direction of the vehicle body frame 21. The first supporting cylinder 145 is supported by the first cylinder supporting portion 146.

The first cylinder supporting portion 146 includes a turning axis that extends in a front-back direction of the vehicle body frame 21. The first cylinder supporting portion 146 supports the first supporting cylinder 145 so as to turn about the turning axis in a direction indicated by an arrow M. The first plate 333a supports the first cylinder supporting portion 146 so as to turn about the first center axis X in directions indicated by arrows Q.

The second connecting portion 16 is attached to the second plate 325a of the second shock absorbing device 35. The second connecting portion 16 includes a second supporting cylinder 151 and a second cylinder supporting portion 152. The second supporting cylinder 151 extends in the left-right direction of the vehicle body frame 21. The second supporting cylinder 151 is supported by the second cylinder supporting portion 152.

The second cylinder supporting portion 152 includes a turning axis that extends in the front-back direction of the vehicle body frame 21. The second cylinder supporting portion 152 supports the second supporting cylinder 151 so as to turn about the turning axis in a direction indicated by an arrow G. The second plate 325*a* supports the second cylinder supporting portion 152 so as to turn about the second center axis Y in directions indicated by arrows S.

The restricting mechanism 29 includes a first restricting pole 161, a second restricting pole 162, a turning center shaft 163, a supporting pole 164, a disc 165, and a first caliper 166.

The first restricting pole 161 is inserted in the first supporting cylinder 145. The first restricting pole 161 extends in the left-right direction of the vehicle body frame 21. The first restricting pole 161 is located above the first front wheel 31. The first restricting pole 161 is located behind the first shock absorber 330. The first restricting pole 161 is located below the link mechanism 5.

The second restricting pole 162 is inserted in the second supporting cylinder 151. The second restricting pole 162 is located directly to the left of the first restricting pole 161. The second restricting pole 162 extends in the left-right direction of the vehicle body frame 21. The second restricting pole 162 is located above the second front wheel 32. The second restricting pole 162 is located behind the second shock absorber 350. The second restricting pole 162 is located below the link mechanism 5.

The turning center shaft 163 supports a left end portion of the first restricting pole 161 and a right end portion of the second restricting pole 162. The turning center shaft 163 extends in the front-back direction of the vehicle body frame 21.

Figure 16:
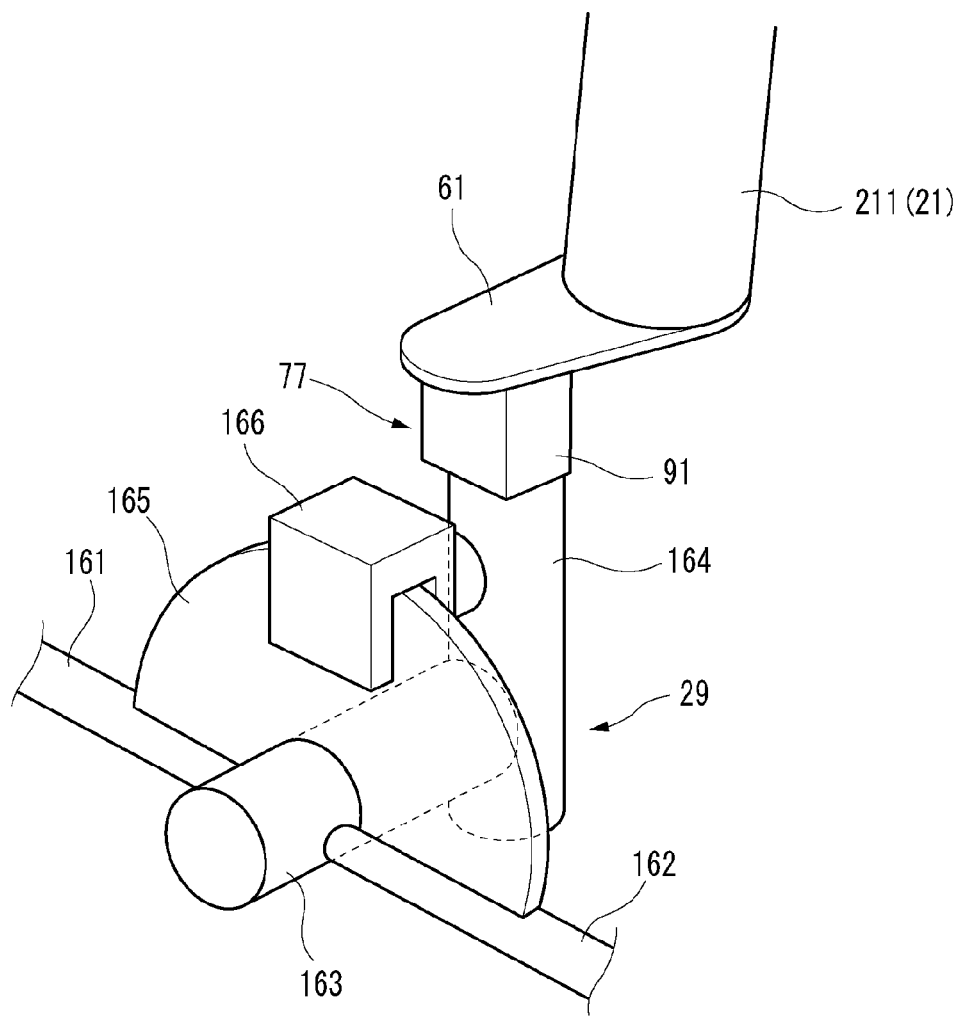
FIG. 16 is a perspective view showing a portion of the transformation restricting mechanism of FIG. 15.

FIG. 16 is a perspective view schematically showing a portion of the restricting mechanism 29 in an enlarged manner. A rear end portion of the turning center shaft 163 is connected to the supporting pole 164. The turning center shaft 163 is configured to turn relative to the supporting pole 164 about a turning axis that extends in the front-back direction of the vehicle body frame 21. The supporting pole 164 extends in an up-down direction of the vehicle body frame 21.

The disc 165 is fixed to the first restricting pole 161 and the second restricting pole 162. The disc 165 preferably has a semicircular or substantially semicircular shape that is centered at the turning center shaft 163. The disc 165 is located directly above the first restricting pole 161 and the second restricting pole 162. The first restricting pole 161, the second restricting pole 162, and the disc 165 turn altogether about the turning center shaft 163.

The first caliper 166 is fixed to the supporting pole 164. The first caliper 166 is located above the turning center shaft 163. When a switch 23*a* (see FIG. 1) that is mounted on a handlebar 23 is operated, a pad (not shown) is pressed against the disc 165 such that the first caliper 166 restricts the turning of the disc 165.

That is, the first connecting portion 15 and the second connecting portion 16 are configured to be displaced relative to the first caliper 166. Additionally, the first caliper 166 changes a resisting force that is exerted against a relative displacement.

The fixing mechanism 77 fixes the restricting mechanism 29 to the vehicle body frame 21. The fixing mechanism 77 includes a second caliper 91.

The second caliper 91 is located above the first caliper 166. The second caliper 91 is attached to the vehicle body frame 21 (a head pipe 211) by a first transmission plate 61. The supporting pole 164 is configured to move in the up-down direction of the vehicle body frame 21 in an interior of the second caliper 91. When the switch 23*a* provided on the handlebar 23 is operated, the second caliper 91 holds the supporting pole 164 so as to restrict the supporting pole 164 from moving in the up-down direction. That is, the first caliper 166 is configured to be displaced relative to the second caliper 91. Additionally, the second caliper 91 changes a resisting force that is exerted against a relative displacement.

Figure 17:
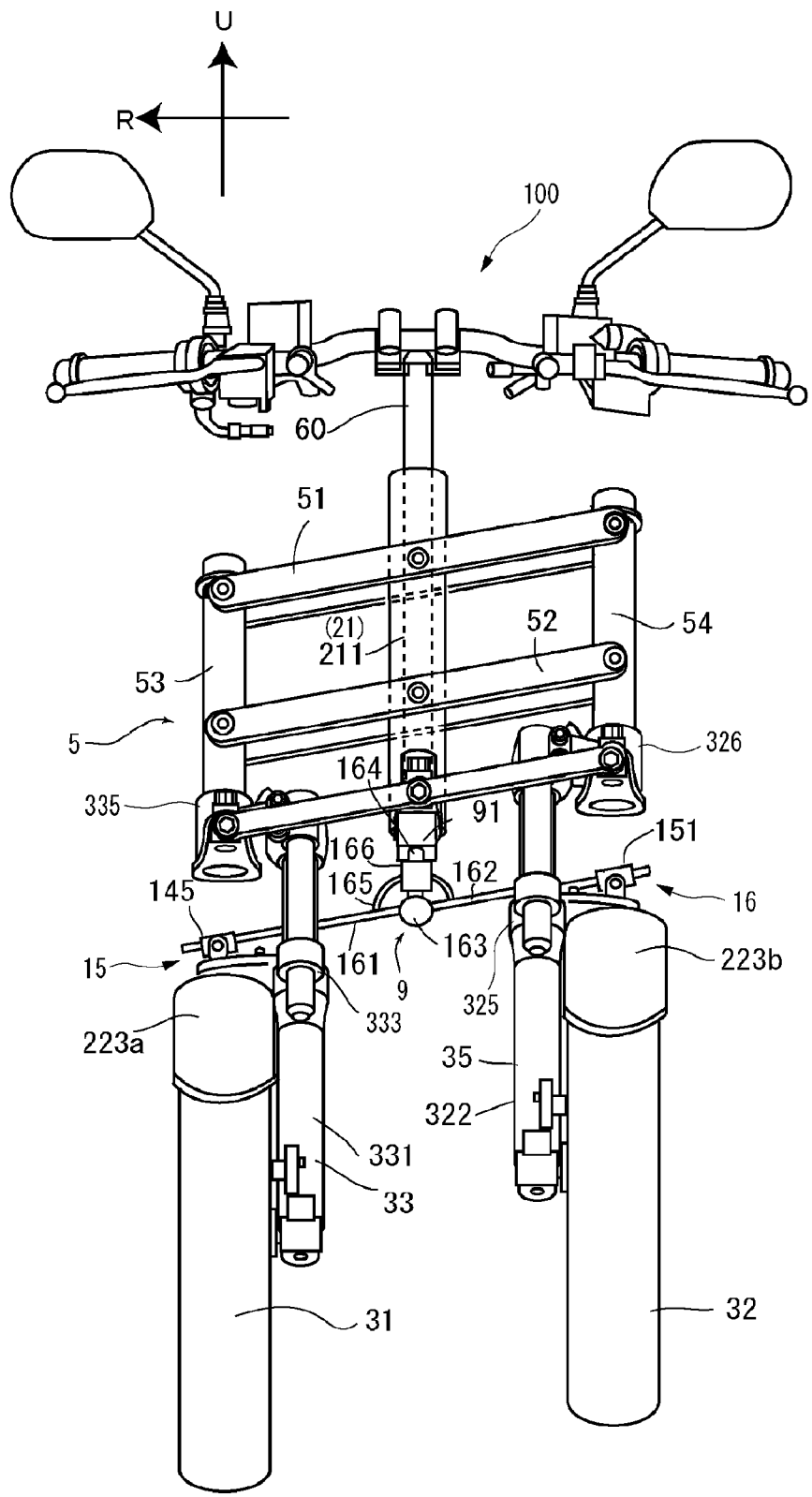
FIG. 17 is a front view showing a state in which a first front wheel and a second front wheel of the three-wheeled vehicle of FIG. 14 are relatively moved.

As shown in FIG. 17, when the second front wheel 32 moves to a location higher than the first front wheel 31, a left end of the second restricting pole 162 is lifted upward by the second guide 325 that supports the second connecting portion 16. Accordingly, the second supporting cylinder 151, the turning center shaft 163, and the first supporting cylinder 145 turn in the direction indicated by the arrow G in FIG. 15. The disc 165 also turns in the direction indicated by the arrow G. This action of the disc 165 causes the second bracket 327 to move farther upward than the first bracket 335 such that the link mechanism 5 transforms so that a second side member 54 moves farther upward than a first side member 53. That is, a head pipe 211 is permitted to lean leftward from its upright state. Further, the supporting pole 164 is displaced relative to the second caliper 91 in response to the operation of the first shock absorbing device 33 and the second shock absorbing device 35 such that the restricting mechanism 29 in which the second restricting pole 162 is located above the first restricting pole 161 is permitted to be displaced in the up-down direction relative to the head pipe 211.

On the contrary, when the first front wheel 31 moves farther upward than the second front wheel 32, a right end of the first restricting pole 161 is lifted upward by the first guide 333 that supports the first connecting portion 15. Accordingly, the first supporting cylinder 145, the turning center shaft 163, and the second supporting cylinder 151 turn in the direction indicated by the arrow M in FIG. 15. The disc 165 also turns in the direction indicated by the arrow M. This action of the disc 165 causes the first bracket 335 to move to a location above the second bracket 327 such that the link mechanism 5 transforms so that the first side member 53 moves farther upward than the second side member 54. That is, the head pipe 211 is permitted to lean rightward from its upright state. Further, the supporting pole 164 is displaced relative to the second caliper 91 in response to the operation of the first shock absorbing device 33 and the second shock absorbing device 35 such that the restricting mechanism 29 in which the first restricting pole 161 is located above the second restricting pole 162 is permitted to be displaced in the up-down direction relative to the head pipe 211.

When the switch 23*a* is operated, the first caliper 166 restricts the disc 165 from turning relative to the first caliper 166. Since a change in posture of the first restricting pole 161 and the second restricting pole 162 is restricted, a relative movement of the first connecting portion 15 and the second connecting portion 16 to the first caliper 166 is restricted. Consequently, this restricts not only the relative movement of the first front wheel 31 and the second front wheel 32 in the up-down direction of the vehicle body frame 21 but also the transformation of the link mechanism 5 is restricted.

Additionally, operating the switch 23*a* restricts the movement of the supporting pole 164 in the up-down direction relative to the second caliper 91 such that the relative displacement of the first caliper 166 to the second caliper 91 is restricted. Consequently, the first front wheel 31 and the second front wheel 32, relative movement of which is restricted, are restricted from being displaced in the up-down direction of the vehicle body frame 21 in response to the operation of the first shock absorbing device 33 and the second shock absorbing device 35. The restriction of the displacement of the first caliper 166 relative to the second caliper 91 may be carried out independently of the restriction of the displacement of the disc 165 relative to the first caliper 166.

Thus, as has been described above, the transformation restricting mechanism 9 preferably includes the first restricting pole 161 and the second restricting pole 162 (an example of a first portion) that are displaced relatively, and the first caliper 166 (an example of a second portion) and the resisting force against the relative displacement of these elements is changed. The first restricting pole 161 and the second restricting pole 162 are supported by the first shock absorbing device 33 and the second shock absorbing device 35 by the first connecting portion 15 and the second connecting portion 16 (an example of a first supporting portion), respectively. The first caliper 166 is supported by the vehicle body frame 21 (the head pipe 211) by the fixing mechanism 77 (an example of a second supporting portion). When the vehicle body frame 21 is in the upright state, the position where the first connecting portion 15 is supported is located below the second cross member 52 in the up-down direction of the vehicle body frame 21 and closer to the first center axis X than the intermediate axis Z in the left-right direction of the vehicle body frame 21. When the vehicle body frame 21 is in the upright state, the position where the second connecting portion 16 is supported is located below the second cross member 52 in the up-down direction of the vehicle body frame 21 and closer to the second center axis Y than the intermediate axis Z in the left-right direction of the vehicle body frame 21.

According to such a configuration, most of the portions of the first shock absorbing device 33 and the second shock absorbing device 35 are located below the second cross member 52 when the vehicle body frame 21 is in the upright state. Additionally, spaces are defined between the first shock absorbing device 33 and the second shock absorbing device 35, and between the link mechanism 5 and the vehicle body frame 21 so as to avoid interference therebetween. When the vehicle body frame 21 is in the upright state, the first connecting portion 15 and the second connecting portion 16 of the transformation restricting mechanism 9 are supported by the first shock absorbing device 33 and the second shock absorbing device 35, respectively, in positions located below the second cross member 52 in the up-down direction of the vehicle body frame 21 such that a movable range of the transformation restricting mechanism 9 is smaller than a movable range of the link mechanism 5. In addition, the space defined between the first shock absorbing device 33 and the second shock absorbing device 35 and the space defined between the link mechanism 5 and the vehicle body frame 21 are also preferably used as the movable range of the transformation restricting mechanism 9.

Further, a portion of the vehicle body frame 21 is located above the first shock absorbing device 33 and the second shock absorbing device 35 when viewed from the first shock absorbing device 33 and the second shock absorbing device 35. In other words, portions where the fixing mechanism 77 of the transformation restricting mechanism 9 are supported extend over a wide range, thus enhancing the degree of freedom in design. This makes it easy to support the fixing mechanism 77 at portions that help to make the movable range of the transformation restricting mechanism 9 smaller. This makes the movable range of the transformation restricting mechanism 9 smaller.

In the event that the transformation restricting mechanism 9 is supported by the first shock absorbing device 33 and the second shock absorbing device 35, the movable range of the transformation restricting mechanism 9 would be increased due to the relative turning described above. However, the first connecting portion 15 and the second connecting portion 16 are supported by the first shock absorbing device 33 and the second shock absorbing device 35 in positions located closer to the first center axis X and the second center axis Y, respectively, than the intermediate axis Z, and this significantly reduces or prevents the expansion of the movable range of the transformation restricting mechanism 9 that would otherwise be caused in association with the relative turning described above. In addition, the space defined between the first shock absorbing device 33 and the second shock absorbing device 35 and the space defined between the link mechanism 5 and the vehicle body frame 21 are preferably used as the movable range of the transformation restricting mechanism 9, thus making it possible to significantly reduce or prevent the expansion of the movable range of the transformation restricting mechanism 9 that would otherwise be caused in association with the relative turning described above.

According to such a configuration described above, the movable range of the transformation restricting mechanism 9 is made smaller than the movable range of the link mechanism 5. Additionally, even though the first shock absorbing device 33 and the second shock absorbing device 35 turn, it is possible to significantly reduce or prevent the expansion of the movable range of the transformation restricting mechanism 9. Consequently, the movable range of the transformation restricting mechanism 9 having a function to restrict the operation of the link mechanism 5 is spaced away from the steering shaft 60. Thus, even though a function to restrict the operation of the link mechanism 5 is provided, it is possible to significantly reduce or prevent an increase in the size of a peripheral construction of the steering shaft 60 that is disposed above the two front wheels 31, 32.

When the vehicle body frame 21 is in the upright state, the fixing mechanism 77 is disposed above the first connecting portion 15 and the second connecting portion 16.

According to this configuration, the first connecting portion 15, the second connecting portion 16, and the fixing mechanism 77 move relatively in the up-down direction of the vehicle body frame 21 as the vehicle body frame 21 leans. Accordingly, the transformation restricting mechanism 9 is preferably configured so as to include the first connecting portion 15 and the second connecting portion 16 at a lower portion thereof and the fixing mechanism 77 at an upper portion thereof, and to change the resisting force against the relative movement of the first connecting portion 15, the second connecting portion 16, and the fixing mechanism 77 in the up-down direction. This enables the transformation restricting mechanism 9 to be smaller in size and simplified in structure. Additionally, the movable range of the transformation restricting mechanism 9 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

When the vehicle body frame 21 is in the upright state, the fixing mechanism 77 is disposed closer to the intermediate axis Z than the first center axis X and the second center axis Y.

According to this configuration, the first connecting portion 15, the second connecting portion 16, and the fixing mechanism 77 move relatively in the up-down direction of the vehicle body frame 21 as the vehicle body frame 21 leans. In addition, as the vehicle body frame 21 leans, the first connecting portion 15, the second connecting portion 16, and the fixing mechanism 77 also move relatively in the left-right direction of the vehicle body frame 21. This allows the transformation restricting mechanism 9 to make use of at least either the movements in the up-down direction or the movements in the left-right direction. Additionally, in conjunction with the fact that the space defined between the link mechanism 5 and the vehicle body frame 21 and the space defined between the first shock absorbing device 33 and the second shock absorbing device 35 are preferably used as the movable range of the transformation restricting mechanism 9, the transformation restricting mechanism 9 is made smaller in size and simplified in structure. In addition, the movable range of the transformation restricting mechanism 9 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first restricting pole 161 and the second restricting pole 162 are configured to turn about the axes that extend in the up-down direction of the vehicle body frame 21 (the first center axis X and the second center axis Y) relative to the first shock absorbing device 33 and the second shock absorbing device 35, respectively.

According to this configuration, the turning axes of the first shock absorbing device 33 and the second shock absorbing device 35 and the turning axes of the first restricting pole 161 and the second restricting pole 162 both extend in the up-down direction of the vehicle body frame 21. This significantly reduces or prevents the expansion of movable ranges of the first restricting pole 161 and the second restricting pole 162 in accordance with the turnings of the first shock absorbing device 33 and the second shock absorbing device 35. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first restricting pole 161 includes the first connecting portion 15 (an example of a right first supporting portion) that is supported by the first supporting member 331 that is disposed at the lower portion of the first shock absorbing device 33. The second restricting pole 162 includes the second connecting portion 16 (an example of a left first supporting portion) that is supported by the second supporting member 321 that is disposed at the lower portion of the second shock absorbing device 35. When the vehicle body frame 21 is in the upright state, the position where the first connecting portion 15 is supported is located below the second cross member 52 in the up-down direction of the vehicle body frame 21 and closer to the first center axis X than the intermediate axis Z in the left-right direction of the vehicle body frame 21. When the vehicle body frame 21 is in the upright state, the position where the second connecting portion 16 is supported is located below the second cross member 52 in the up-down direction of the vehicle body frame 21 and closer to the second center axis Y than the intermediate axis Z in the left-right direction of the vehicle body frame 21.

According to this configuration, the resisting force that is imparted by the transformation restricting mechanism 9 is exerted so as to restrict the displacement of the first shock absorbing device 33 and the second shock absorbing device 35.

In the configuration according to the third preferred embodiment, the restriction of the vertical movement of the supporting pole 164 by the second caliper 91 is preferably performed independently of the restriction of the turning of the disc 165 by the first caliper 166. In this case, the first front wheel 31 and the second front wheel 32 are permitted to move together in the up-down direction in a condition that the first front wheel 31 and the second front wheel 32 are restricted from moving relative to each other. Consequently, the rider can easily move the three-wheeled vehicle 100 in a condition that the vehicle body frame 21 is kept leaning from its upright state.

In the configuration according to the third preferred embodiment, a portion of the transformation restricting mechanism 9 is disposed below the second cross member 52. Accordingly, the center of gravity of the three-wheeled vehicle 100 is located in a lower position compared to the configuration in which the entire transformation restricting mechanism 9 is disposed above the second cross member 52.

Fourth Preferred Embodiment

Figure 18:
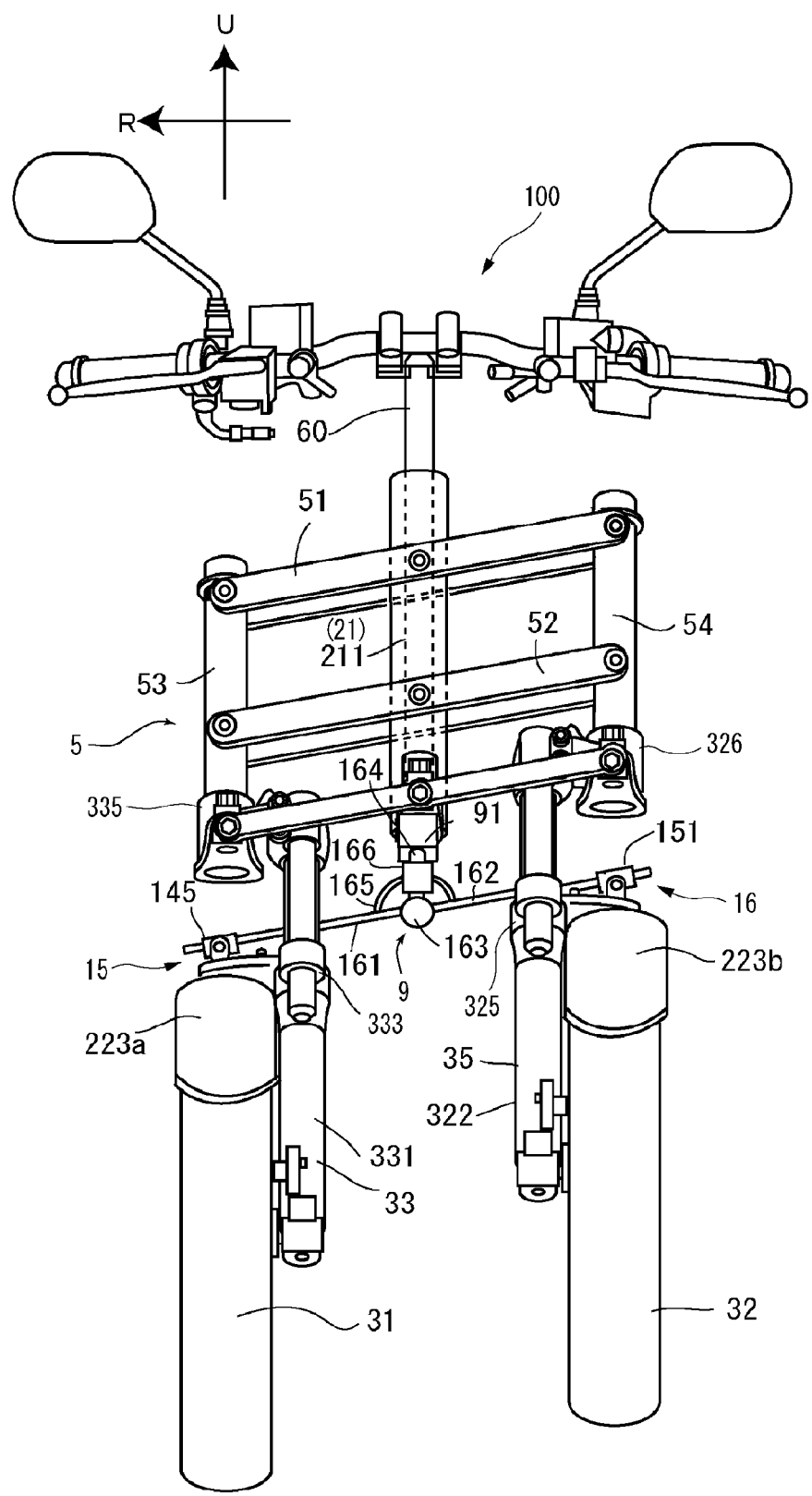
FIG. 18 is a front view showing a three-wheeled vehicle according to a fourth preferred embodiment of the present invention in a condition that a vehicle body cover is removed.

Next, referring to FIGS. 18 to 20, a three-wheeled vehicle 101 according to a fourth preferred embodiment of the invention will be described. FIG. 18 is a perspective view showing the three-wheeled vehicle 101 in a condition in which a body cover 22 is removed. Elements having the same or similar configurations as those described in the first preferred embodiment will be omitted from illustration or like reference numerals will be assigned to those elements, so as to avoid the repetition of the same or similar descriptions.

The three-wheeled vehicle 101 according to the fourth preferred embodiment includes a transformation restricting mechanism 78. The transformation restricting mechanism 78 differs from the transformation restricting mechanism 7 according to the first preferred embodiment in the configuration to restrict the transformation of a link mechanism 5.

The transformation restricting mechanism 78 includes a first connecting member 17, a second connecting member 18, a restricting mechanism 19, and a fixing mechanism 30.

The first connecting member 17 is fixed to a first outer cylinder 332 of a first shock absorber 330. The first connecting member 17 is preferably a plate member having a semicircular or substantially semicircular shape. The first connecting member 17 extends from the first outer cylinder 332 toward a second front wheel 32.

The second connecting member 18 is fixed to a second outer cylinder 322 of a second shock absorber 350. The second connecting member 18 is preferably a plate member having a semicircular or substantially semicircular shape. The second connecting member 18 extends from the second outer cylinder 322 toward a first front wheel 31.

The restricting mechanism 19 is disposed between the first connecting member 17 and the second connecting member 18 in a position located below a second cross member 52.

The fixing mechanism 30 is disposed above the restricting mechanism 19. The fixing mechanism 30 is supported by a head pipe 211.

Figure 19:
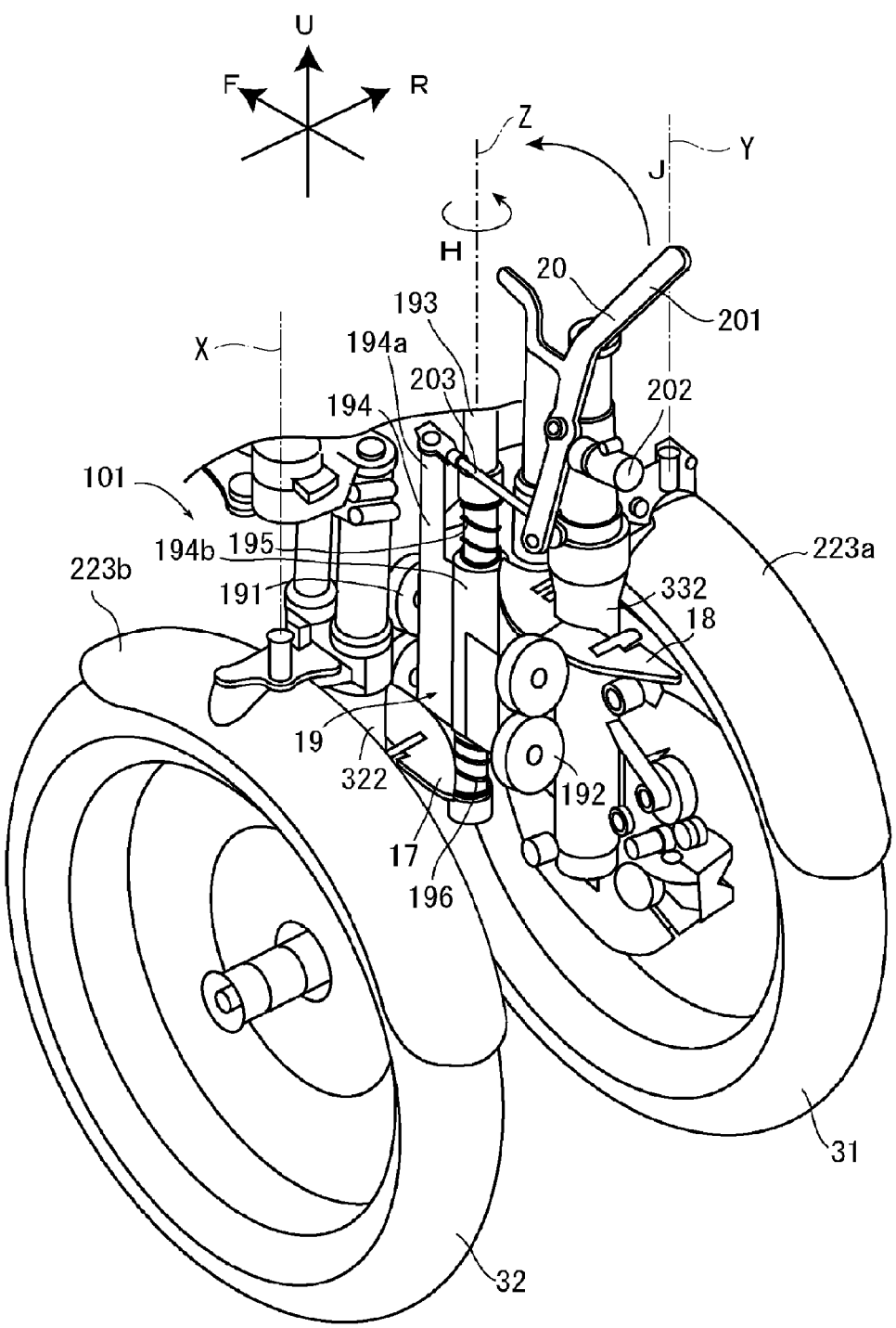
FIG. 19 is a perspective view showing a lower portion of the three-wheeled vehicle of FIG. 18.

FIG. 19 is a perspective view showing a lower portion of the three-wheeled vehicle 101. The restricting mechanism 19 includes a first roller unit 191, a second roller unit 192, a roller supporting shaft 193, a roller supporting plate 194, a first coil spring 195, a second coil spring 196, and a turning mechanism 20.

The first roller unit 191 includes a pair of rollers that are aligned in an up-down direction of a vehicle body frame 21. The first roller unit 191 is supported by the roller supporting plate 194.

The second roller unit 192 includes a pair of rollers that are aligned in the up-down direction of the vehicle body frame 21. The second roller unit 192 is supported by the roller supporting plate 194. The second roller unit 192 is disposed symmetrically with the first roller unit 191 with respect to the roller supporting shaft 193.

The roller supporting shaft 193 supports the roller supporting plate 194. The roller supporting shaft 193 is disposed below the head pipe 211. The roller supporting shaft 193 extends in the same direction as a direction in which the head pipe 211 extends (that is, an up-down direction of the vehicle body frame 21). The fixing mechanism 30 is disposed above the roller supporting shaft 193. The fixing mechanism 30 preferably has the same configuration as that of the fixing mechanism 77 of the three-wheeled vehicle 100 according to the third preferred embodiment. That is, the fixing mechanism 30 preferably includes a caliper that supports the roller supporting shaft 193 so as to be displaced in the up-down direction of the vehicle body frame 21. For example, when a switch 23*a* (refer to FIG. 1) is operated, the caliper holds the roller supporting shaft 193 so that the roller supporting shaft 193 is restricted from being displaced in the up-down direction of the vehicle body frame 21.

The roller supporting plate 194 supports the first roller unit 191 and the second roller unit 192. The roller supporting plate 194 includes a thin plate 194*a* and a supporting cylinder 194*b*. The thin plate 194*a* extends to a location above the supporting cylinder 194*b*. The supporting cylinder 194*b* covers a portion of the roller supporting shaft 193. The supporting cylinder 194*b* is configured to turn relative to the roller supporting shaft 193. The roller supporting plate 194 is configured to turn about the roller supporting shaft 193 in a direction indicated by an arrow H. The roller supporting shaft 193 extends to a location below a lower end of the roller supporting plate 194.

The first coil spring 195 is wound around the roller supporting shaft 193. The first coil spring 195 is disposed directly above the supporting cylinder 194*b*. A lower end of the first coil spring 195 is brought into contact with an upper end of the supporting cylinder 194*b*.

The second coil spring 196 is wound around the roller supporting shaft 193. The second coil spring 196 is disposed directly below the supporting cylinder 194*b*. An upper end of the second coil spring 196 is brought into contact with a lower end of the roller supporting plate 194.

The turning mechanism 20 moves the thin plate 194*a* of the roller supporting plate 194 rearward. The turning mechanism 20 turns the roller supporting plate 194 about the roller supporting shaft 193. The turning mechanism 20 turns the roller supporting plate 194 in the direction indicated by the arrow H. The turning mechanism 20 is located above the roller supporting plate 194. The turning mechanism 20 includes a lever 201, a lever supporting member 202, and a connecting rod 203.

The lever 201 extends in the up-down direction of the vehicle body frame 21. A lower end of the lever 201 is connected to the connecting rod 203.

The lever supporting member 202 supports the lever 201 from the rear. The lever supporting member 202 is disposed directly in front of the head pipe 211. The lever 201 is turnably supported by the lever supporting member 202. The lever 201 is configured to turn about a turning axis that extends in a left-right direction of the vehicle body frame 21 in a direction indicated by an arrow J.

The connecting rod 203 connects the lever 201 and the thin plate 194*a* together. A rear end of the connecting rod 203 is connected to a lower end of the lever 201. The connecting rod 203 is turnable relative to the lever 201. A front end of the connecting rod 203 is connected to an upper end of the thin plate 194*a*. The connecting rod 203 is turnable relative to the thin plate 194*a*.

Figure 20:
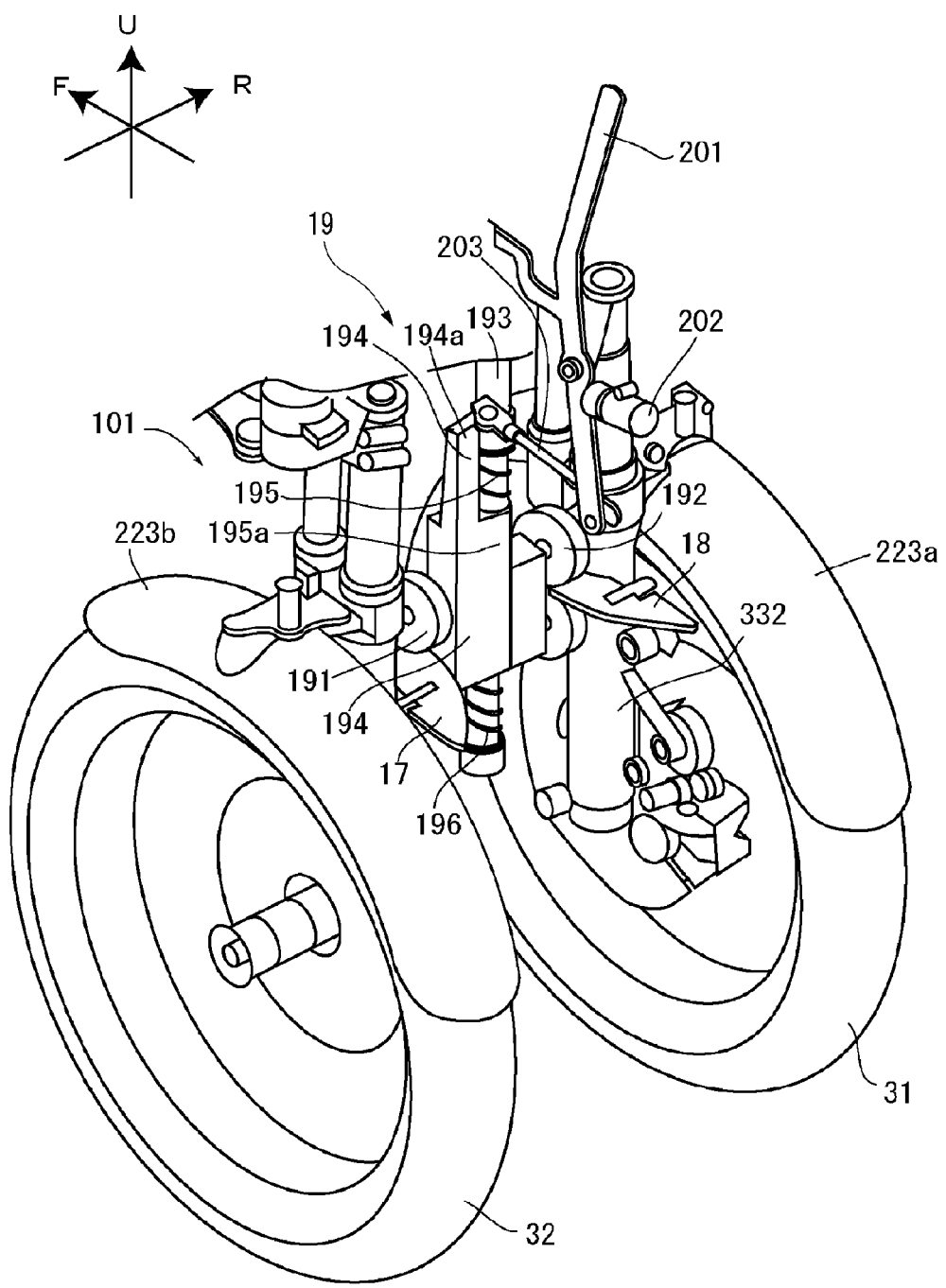
FIG. 20 is a perspective view showing a state when the relative movement of the first front wheel and the second front wheel of the three-wheeled vehicle of FIG. 18 is restricted.

FIG. 20 shows the lower portion of the three-wheeled vehicle 101 with an upper portion of the lever 201 displaced forward from the state shown in FIG. 19. When the upper portion of the lever 201 is displaced forward, the lever 201 turns about the turning axis that extends in the left-right direction of the vehicle body frame 21 at a point where the lever 201 is supported by the lever supporting member 202. A lower portion of the lever 201 moves rearward in accordance with the turning of the lever 201. As the lower portion of the lever 201 moves rearward, the connecting rod 203 moves the thin plate 194*a* rearward. As this occurs, the roller supporting plate 194 turns about the roller supporting shaft 193 in the direction indicated by the arrow H. FIG. 20 shows a state in which the roller supporting plate 194 has turned. The first connecting member 17 is held by the pair of rollers of the first roller unit 191 therebetween and the second connecting member 18 is held by the pair of rollers of the second roller unit 192 therebetween as the roller supporting plate 194 turns. Namely, the first connecting member 17, the second connecting member 18, and the restricting mechanism 19 are configured to be displaced relatively. Additionally, a resisting force against the relative displacements of these elements is changed (a changeover from a state where a resisting force is exerted to a state where no resisting force is exerted or vice versa) by operating the restricting mechanism 19.

According to the above operation, the relative displacement of the first front wheel 31 and the second front wheel 32 is restricted in the up-down direction of the vehicle body frame 21. Thus, it is possible to restrict a relative displacement in the up-down direction of the vehicle body frame 21 between a first side member 53 that is connected to the first front wheel 31 by a first shock absorbing device 33 and a second side member 54 that is connected to the second front wheel 32 by a second shock absorbing device 35. This restricts the transformation of the link mechanism 5.

In this state, the first front wheel 31 and the second front wheel 32 move together in the up-down direction. Here, the supporting cylinder 194*b* of the roller supporting plate 194 is held by the first coil spring 195 and the second coil spring 196 therebetween. Accordingly, even though an impact is exerted on the first front wheel 31 and the second front wheel 32 when moving the three-wheeled vehicle 101 in such a state that the first front wheel 31 and the second front wheel 32 are not allowed to move relatively, the impact is absorbed by the first coil spring 195 and the second coil spring 196.

For example, the movement of the roller supporting shaft 193 in the up-down direction is restricted by controlling the switch 23*a* to operate the fixing mechanism 30 such that the first front wheel 31 and the second front wheel 32 are restricted from moving together in the up-down direction.

Thus, as has been described above, the transformation restricting mechanism 78 includes the first connecting member 17 and the second connecting member 18 (an example of a first portion) that are configured to be displaced relatively, and the restricting mechanism 19 (an example of a second portion) and the resisting force against the relative displacement of these elements is changed. The first connecting member 17 and the second connecting member 18 are supported by the first shock absorbing device 33 and the second shock absorbing device 35 by the first outer cylinder 332 and the second outer cylinder 322 (an example of a first supporting portion), respectively. The restricting mechanism 19 is supported by the vehicle body frame 21 (the head pipe 211) by the fixing mechanism 30 (an example of a second supporting portion). When the vehicle body frame 21 is in the upright state, the position where the first outer cylinder 332 is supported is located below the second cross member 52 in the up-down direction of the vehicle body frame 21 and closer to the first center axis X than the intermediate axis Z in the left-right direction of the vehicle body frame 21. When the vehicle body frame 21 is in the upright state, the position where the second outer cylinder 322 is supported is located below the second cross member 52 in the up-down direction of the vehicle body frame 21 and closer to the second center axis Y than the intermediate axis Z in the left-right direction of the vehicle body frame 21.

According to such a configuration, most of the portions of the first shock absorbing device 33 and the second shock absorbing device 35 are located below the second cross member 52 when the vehicle body frame 21 is in the upright state. Additionally, spaces are defined between the first shock absorbing device 33 and the second shock absorbing device 35, and between the link mechanism 5 and the vehicle body frame 21 so as to avoid interference therebetween. When the vehicle body frame 21 is in the upright state, the first outer cylinder 332 and the second outer cylinder 322 of the transformation restricting mechanism 78 are supported by the first shock absorbing device 33 and the second shock absorbing device 35, respectively, in positions located below the second cross member 52 in the up-down direction of the vehicle body frame 21 such that a movable range of the transformation restricting mechanism 78 is made smaller than a movable range of the link mechanism 5. In addition, the space defined between the first shock absorbing device 33 and the second shock absorbing device 35 and the space defined between the link mechanism 5 and the vehicle body frame 21 are also preferably used as the movable range of the transformation restricting mechanism 78.

Further, a portion of the vehicle body frame 21 is located above the first shock absorbing device 33 and the second shock absorbing device 35 when viewed from the first shock absorbing device 33 and the second shock absorbing device 35. In other words, portions where the fixing mechanism 30 of the transformation restricting mechanism 78 are supported extend over a wide range, thus enhancing the degree of freedom in design. This makes it easy to support the fixing mechanism 30 at portions that help to make a movable range thereof smaller. This makes the movable range of the transformation restricting mechanism 78 smaller.

In the event that the transformation restricting mechanism 78 is supported by the first shock absorbing device 33 and the second shock absorbing device 35, the movable range of the transformation restricting mechanism 78 would be increased due to the relative turning described above. However, the first outer cylinder 332 and the second outer cylinder 322 are supported by the first shock absorbing device 33 and the second shock absorbing device 35 in positions located closer to the first center axis X and the second center axis Y, respectively, than the intermediate axis Z such that it is possible to significantly reduce or prevent the expansion of the movable range of the transformation restricting mechanism 78 that would otherwise be caused in association with the relative turning described above. In addition, the space defined between the first shock absorbing device 33 and the second shock absorbing device 35 and the space defined between the link mechanism 5 and the vehicle body frame 21 are preferably used as the movable range of the transformation restricting mechanism 78, thus making it possible to significantly reduce or prevent the expansion of the movable range of the transformation restricting mechanism 78 that would otherwise be caused in association with the relative turning described above.

According to such a configuration described above, the movable range of the transformation restricting mechanism 78 is made smaller than the movable range of the link mechanism 5. Additionally, even though the first shock absorbing device 33 and the second shock absorbing device 35 turn, it is possible to significantly reduce or prevent the expansion of the movable range of the transformation restricting mechanism 78. Consequently, the movable range of the transformation restricting mechanism 78 that has a function to restrict the operation of the link mechanism 5 is spaced away from the steering shaft 60. Thus, even though a function to restrict the operation of the link mechanism 5 is provided, it is possible to significantly reduce or prevent an increase in the size of a peripheral construction of the steering shaft 60 that is disposed above the two front wheels 31, 32.

When the vehicle body frame 21 is in the upright state, the fixing mechanism 30 is disposed above the first outer cylinder 332 and the second outer cylinder 322.

According to this configuration, the first outer cylinder 332, the second outer cylinder 322, and the fixing mechanism 30 move relatively in the up-down direction of the vehicle body frame 21 in accordance with the turning of the vehicle body frame 21. Accordingly, the transformation restricting mechanism 78 is preferably configured to include the first outer cylinder 332 and the second outer cylinder 322 at a lower portion thereof and the fixing mechanism 30 at an upper portion thereof, and to change the resisting force against the relative movement of the first outer cylinder 332, the second outer cylinder 322, and the fixing mechanism 30 in the up-down direction. This enables the transformation restricting mechanism 78 to be smaller in size and simplified in structure. Additionally, the movable range of the transformation restricting mechanism 78 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

When the vehicle body frame 21 is in the upright state, the fixing mechanism 30 is disposed closer to the intermediate axis Z than the first center axis X and the second center axis Y.

According to this configuration, the first outer cylinder 332, the second outer cylinder 322, and the fixing mechanism 30 move relatively in the up-down direction of the vehicle body frame 21 in accordance with the turning of the vehicle body frame 21. In addition, the supporting members 72a also relatively move in the left-right direction of the vehicle body frame 21 as the vehicle body frame 21 leans. This allows the transformation restricting mechanism 78 to use at least either the movements in the up-down direction or the movements in the left-right direction. Additionally, in conjunction with the fact that the space defined between the link mechanism 5 and the vehicle body frame 21 and the space defined between the first shock absorbing device 33 and the second shock absorbing device 35 are preferably used as the movable range of the transformation restricting mechanism 78, the transformation restricting mechanism 78 is made smaller in size and simplified in structure. In addition, the movable range of the transformation restricting mechanism 78 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first connecting member 17 and the second connecting member 18 are configured to turn about the axes that extend in the up-down direction of the vehicle body frame 21 (the first center axis X and the second center axis Y) relative to the first shock absorbing device 33 and the second shock absorbing device 35, respectively. The restricting mechanism 19 is configured to turn about the axis that extends in the up-down direction of the vehicle body frame 21 (the intermediate axis Z).

According to this configuration, the turning axes of the first shock absorbing device 33 and the second shock absorbing device 35, the turning axes of the first connecting member 17 and the second connecting member 18, and the turning axis of the restricting mechanism 19 all extend in the up-down direction of the vehicle body frame 21. This significantly reduces or prevents the expansion of movable ranges of the first connecting member 17 and the second connecting member 18 in accordance with the turnings of the first shock absorbing device 33 and the second shock absorbing device 35. In addition, the movable range of the restricting mechanism 19 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first connecting member 17 includes the first outer cylinder 332 (an example of a right first supporting portion) that is supported by the first supporting portion 331 that is disposed at a lower portion of the first shock absorbing device 33. The second connecting member 18 includes the second outer cylinder 322 (an example of a left first supporting portion) that is supported by a second supporting portion 321 that is disposed at a lower portion of the second shock absorbing device 35. When the vehicle body frame 21 is in the upright state, the position where the first outer cylinder 332 is supported is located below the second cross member 52 in the up-down direction of the vehicle body frame 21 and closer to the first center axis X than the intermediate axis Z in the left-right direction of the vehicle body frame 21. When the vehicle body frame 21 is in the upright state, the position where the second outer cylinder 322 is supported is located below the second cross member 52 in the up-down direction of the vehicle body frame 21 and closer to the second center axis Y than the intermediate axis Z in the left-right direction of the vehicle body frame 21.

According to this configuration, the resisting force that is imparted by the transformation restricting mechanism 78 is exerted so as to restrict the displacement of the first shock absorbing device 33 and the second shock absorbing device 35.

In the configuration of the fourth preferred embodiment, it is possible to perform independently the restriction of the vertical movement of the roller supporting shaft 193 by the fixing mechanism 30 and the restriction of the relative displacement of the first connecting member 17 and the second connecting member 18 by the restricting mechanism 19. In this case, the first front wheel 31 and the second front wheel 32 are permitted to move together in the up-down direction in a condition that the first front wheel 31 and the second front wheel 32 are restricted from moving relative to each other. Consequently, the rider easily moves the three-wheeled vehicle 101 in a condition that the vehicle body frame 21 is prevented from being leaned from its upright state.

In the configuration of the fourth preferred embodiment, a portion of the transformation restricting mechanism 78 is disposed below the second cross member 52. Accordingly, the center of gravity of the three-wheeled vehicle 101 is located in a lower position compared to the configuration in which the entire transformation restricting mechanism 78 is disposed above the second cross member 52.

In the configuration of the fourth preferred embodiment, the first connecting member 17 preferably is held between the pair of rollers in the first roller unit 191. Additionally, the second connecting member 18 preferably is held by the pair of rollers in the second roller unit 192. However, as long as the first connecting member 17 and the second connecting member 18 are each restricted from moving in the up-down direction, it is possible to use a configuration in which the first connecting member 17 and the second connecting member 18 are individually held between, for example, pairs of plates that are disposed in the up-down direction of the vehicle body frame 21. In the case of the first connecting member 17 and the second connecting member 18 being held between the pairs of rollers, even though the first connecting member 17 and the second connecting member 18 are not positioned strictly between the pair of rollers, the first connecting member 17 and the second connecting member 18 are guided individually to predetermined holding positions through take-in operations of the pairs of rollers.

Fifth Preferred Embodiment

Figure 21:
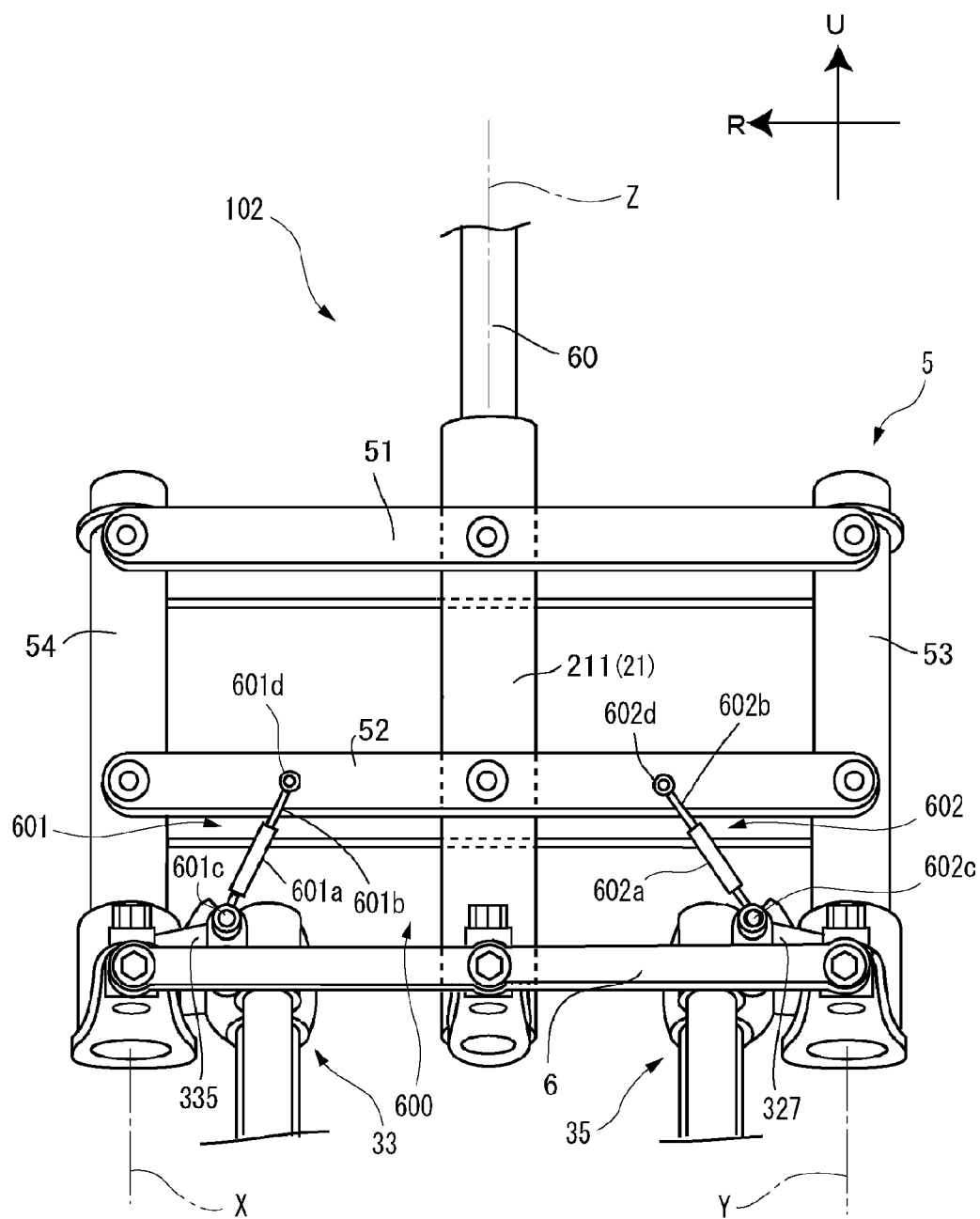
FIG. 21 is a front view showing a portion of a three-wheeled vehicle according to a fifth preferred embodiment of the present invention.

Next, referring to FIG. 21, a three-wheeled vehicle 102 according to a fifth preferred embodiment of the present invention will be described. FIG. 21 is a front view showing a portion of the three-wheeled vehicle 102 in an enlarged manner. Elements having the same or similar configurations as those described in the first preferred embodiment will be omitted from illustration or like reference numerals will be assigned to those elements, so as to avoid the repetition of the same or similar descriptions.

The three-wheeled vehicle 102 includes a transformation restricting mechanism 600. The transformation restricting mechanism 600 differs from the transformation restricting mechanism 7 according to the first preferred embodiment in the configuration that restricts the transformation of a link mechanism 5. The transformation restricting mechanism 600 includes a first damper 601 and a second damper 602.

The first damper 601 is an oil damper including a first cylinder 601a and a first rod 601b. The first rod 601b includes a piston (not shown) configured to slide inside the first cylinder 601a. A lower end portion 601c of the first cylinder 601a is supported by a first bracket 335 of a first shock absorbing device 33. The lower end portion 601c of the first cylinder 601a is configured to be displaced relative to the first bracket 335 in a three-dimensional manner by a ball joint or the like. An upper end portion 601d of the first rod 601b is supported by a second cross member 52 of the link mechanism 5. The upper end portion 601d of the first rod 601b is permitted to be displaced relative to the second cross member 52 in a three-dimensional manner by a ball joint or the like.

The first cylinder 601a and the first rod 601b are configured to be displaced relative to each other. For example, when a switch 23a (refer to FIG. 1) is operated, the flow of oil that is held within the first cylinder 601a is restricted to increase a resisting force against the relative displacement of the first cylinder 601a and the first rod 601b.

The second damper 602 is an oil damper including a second cylinder 602a and a second rod 602b. The second rod 602b includes a piston (not shown) configured to slide inside the second cylinder 602a. A lower end portion 602c of the second cylinder 602a is supported by a second bracket 327 of a second shock absorbing device 35. The lower end portion 602c of the second cylinder 602a is configured to be displaced relative to the second bracket 327 in a three-dimensional manner by a ball joint or the like. An upper end portion 602d of the second rod 602b is supported by the second cross member 52 of the link mechanism 5. The upper end portion 602d of the second rod 602b is configured to be displaced relative to the second cross member 52 in a three-dimensional manner by a ball joint or the like.

The second cylinder 602a and the second rod 602b are configured to be displaced relative to each other. For example, when the switch 23a is operated, the flow of oil that is held within the second cylinder 602a is restricted to increase a resisting force against the relative displacement of the second cylinder 602a and the second rod 602b.

Namely, with a vehicle body frame 21 (a head pipe 211) shown in FIG. 21 is in an upright state, when the switch 23a is operated, the extension and contraction of the first damper 601 and the second damper 602 are restricted. Consequently, the head pipe 211 is restricted from leaning leftward or rightward from its upright state, thus the transformation of the link mechanism 5 is restricted. When the link mechanism 5 is desired to be restricted from being transformed with the head pipe 211 kept in a leaning posture after it has been caused to lean from the upright state, the switch 23a should be operated with the head pipe 211 kept in that posture.

Thus, as has been described above, the transformation restricting mechanism 600 includes the first damper 601 and the second damper 602. The first damper 601 includes the first cylinder 601a (an example of a first portion) and a first rod 601b (an example of a second portion) that are configured to be displaced relative to each other, and the resisting force against the relative displacement is changed. The lower end portion 601c (an example of a first supporting portion) of the first cylinder 601a is supported by the first bracket 335 of the first shock absorbing device 33. The upper end portion 601d (an example of a second supporting portion) of the first rod 601b is supported by the second cross member 52 of the link mechanism 5. The second damper 602 includes the second cylinder 602a (an example of a first portion) and the second rod 602b (an example of a second portion) that are configured to be displaced relative to each other, and the resisting force against the relative displacement is changed. The lower end portion 602c (an example of a first supporting portion) of the second cylinder 602a is supported by the second bracket 327 of the second shock absorbing device 35. The upper end portion 602d (an example of a second supporting portion) of the second rod 602b is supported by the second cross member 52 of the link mechanism 5. When the vehicle body frame 21 is in the upright state, the position where the lower end portion 601c of the first cylinder 601a is supported is located below the second cross member 52 in the up-down direction of the vehicle body frame 21 and closer to a first center axis X than an intermediate axis Z in a left-right direction of the vehicle body frame 21. When the vehicle body frame 21 is in the upright state, the position where the lower end portion 602c of the second cylinder 602a is supported is located below the second cross member 52 in the up-down direction of the vehicle body frame 21 and closer to a second center axis Y than the intermediate axis Z in the left-right direction of the vehicle body frame 21.

According to such a configuration, most of the portions of the first shock absorbing device 33 and the second shock absorbing device 35 are located below the second cross member 52 when the vehicle body frame 21 is in the upright state. Additionally, spaces are defined between the first shock absorbing device 33 and the second shock absorbing device 35, and between the link mechanism 5 and the vehicle body frame 21 so as to avoid interference therebetween. When the vehicle body frame 21 is in the upright state, the lower end portion 601c of the first cylinder 601a and the lower end portion 602c of the second cylinder 602a of the transformation restricting mechanism 600 are supported by the first shock absorbing device 33 and the second shock absorbing device 35, respectively, in the positions located below the second cross member 52 in the up-down direction of the vehicle body frame 21 such that a movable range of the transformation restricting mechanism 600 is made smaller than a movable range of the link mechanism 5. In addition, the space defined between the first shock absorbing device 33 and the second shock absorbing device 35 and the space defined between the link mechanism 5 and the vehicle body frame 21 are also made of use as the movable range of the transformation restricting mechanism 600.

Further, a portion of the vehicle body frame 21 is located above the first shock absorbing device 33 and the second shock absorbing device 35 when viewed from the first shock absorbing device 33 and the second shock absorbing device 35. In other words, portions where the upper end portion 601d of the first rod 601b and the upper end portion 602d of the second rod 602b of the transformation restricting mechanism 600 are supported exist over a wide range, thus enhancing the degree of freedom in design. This makes it easy to support the upper end portion 601d of the first rod 601b and the upper end portion 602d of the second rod 602b at portions that help to make the movable ranges thereof smaller. This makes the movable range of the transformation restricting mechanism 600 smaller.

In the event that the transformation restricting mechanism 600 is supported by the first shock absorbing device 33 and the second shock absorbing device 35, the movable range of the transformation restricting mechanism 600 would be increased due to the relative turning described above. However, the lower end portion 601c of the first cylinder 601a and the lower end portion 602c of the second cylinder 602a are supported by the first shock absorbing device 33 and the second shock absorbing device 35 in positions located closer to the first center axis X and the second center axis Y, respectively, than the intermediate axis Z, and this significantly reduces or prevents the expansion of the movable range of the transformation restricting mechanism 600 that would otherwise be caused in association with the relative turning described above. In addition, the space defined between the first shock absorbing device 33 and the second shock absorbing device 35 and the space defined between the link mechanism 5 and the vehicle body frame 21 are preferably used as the movable range of the transformation restricting mechanism 600, thus making it possible to significantly reduce or prevent the expansion of the movable range of the transformation restricting mechanism 600 that would otherwise be caused in association with the relative turning described above.

According to such a configuration described above, the movable range of the transformation restricting mechanism 600 is made smaller than the movable range of the link mechanism 5. Additionally, even though the first shock absorbing device 33 and the second shock absorbing device 35 turn, it is possible to significantly reduce or prevent the expansion of the movable range of the transformation restricting mechanism 600. Consequently, the movable range of the transformation restricting mechanism 600 that has a function to restrict the operation of the link mechanism 5 is spaced away from the steering shaft 60. Thus, even though a function to restrict the operation of the link mechanism 5 is provided, it is possible to significantly reduce or prevent an increase in the size of a peripheral construction of the steering shaft 60 that is disposed above the two front wheels 31, 32.

When the vehicle body frame 21 is in the upright state, the upper end portion 601d of the first rod 601b and the upper end portion 602d of the second rod 602b are disposed above the lower end portion 601c of the first cylinder 601a and the lower end portion 602c of the second cylinder 602a.

According to this configuration, the lower end portion 601c of the first cylinder 601a and the lower end portion 602c of the second cylinder 602a and the upper end portion 601d of the first rod 601b and the upper end portion 602d of the second rod 602b move relatively in the up-down direction of the vehicle body frame 21 as the vehicle body frame 21 leans. Thus, the transformation restricting mechanism 600 is preferably configured to include the lower end portion 601c of the first cylinder 601a and the lower end portion 602c of the second cylinder 602a at a lower portion thereof and the upper end portion 601d of the first rod 601b and the upper end portion 602d of the second rod 602b at an upper portion thereof, and to change a resisting force against the movements of the lower end portion 601c of the first cylinder 601a and the lower end portion 602c of the second cylinder 602a in the up-down direction relative to the upper end portion 601d of the first rod 601b and the upper end portion 602d of the second rod 602b. This enables the transformation restricting mechanism 600 to be made smaller in size and simplified in structure. Additionally, the movable range of the transformation restricting mechanism 600 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

When the vehicle body frame 21 is in the upright state, the first mounting member 134 and the second mounting member 144 are disposed closer to the intermediate axis Z than the first center axis X and the second center axis Y.

According to this configuration, the lower end portion 601c of the first cylinder 601a and the lower end portion 602c of the second cylinder 602a and the upper end portion 601d of the first rod 601b and the upper end portion 602d of the second rod 602b move relatively in the up-down direction of the vehicle body frame 21 as the vehicle body frame 21 leans. In addition, the supporting members 72a also relatively move in the left-right direction of the vehicle body frame 21 as the vehicle body frame 21 leans. This allows the transformation restricting mechanism 600 to make use of at least either the movements in the up-down direction or the movements in the left-right direction. Additionally, in conjunction with the fact that the space defined between the link mechanism 5 and the vehicle body frame 21 and the space defined between the first shock absorbing device 33 and the second shock absorbing device 35 are made of use as the movable range of the transformation restricting mechanism 600, the transformation restricting mechanism 600 is made smaller in size and simplified in structure. In addition, the movable range of the transformation restricting mechanism 600 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first cylinder 601a and the second cylinder 602a are configured to turn about the axes that extend in the up-down direction of the vehicle body frame 21 (the first center axis X and the second center axis Y) relative to the first shock absorbing device 33 and the second shock absorbing device 35, respectively.

According to this configuration, the turning axes of the first shock absorbing device 33 and the second shock absorbing device 35 and the turning axes of the first cylinder 601a and the second cylinder 602a both extend in the up-down direction of the vehicle body frame 21. This significantly reduces or prevents the expansion of movable ranges of the first cylinder 601a and the second cylinder 602a in accordance with the turnings of the first shock absorbing device 33 and the second shock absorbing device 35. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The lower end portion 601c of the first cylinder 601a and the lower end portion 602c of the second cylinder 602a are supported by the first bracket 335 and the second bracket 327, respectively, that are disposed at upper portions of the first shock absorbing device 33 and the second shock absorbing device 35.

According to this configuration, a dimension of the transformation restricting mechanism 600 relative to the up-down direction of the vehicle body frame 21 is made smaller than in a case where the lower end portion 601c of the first cylinder 601a and the lower end portion 602c of the second cylinder 602a are supported at lower portions of the first shock absorbing device 33 and the second shock absorbing device 35, respectively. This make the movable range of the transformation restricting mechanism 600 smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

Sixth Preferred Embodiment

Figure 22:
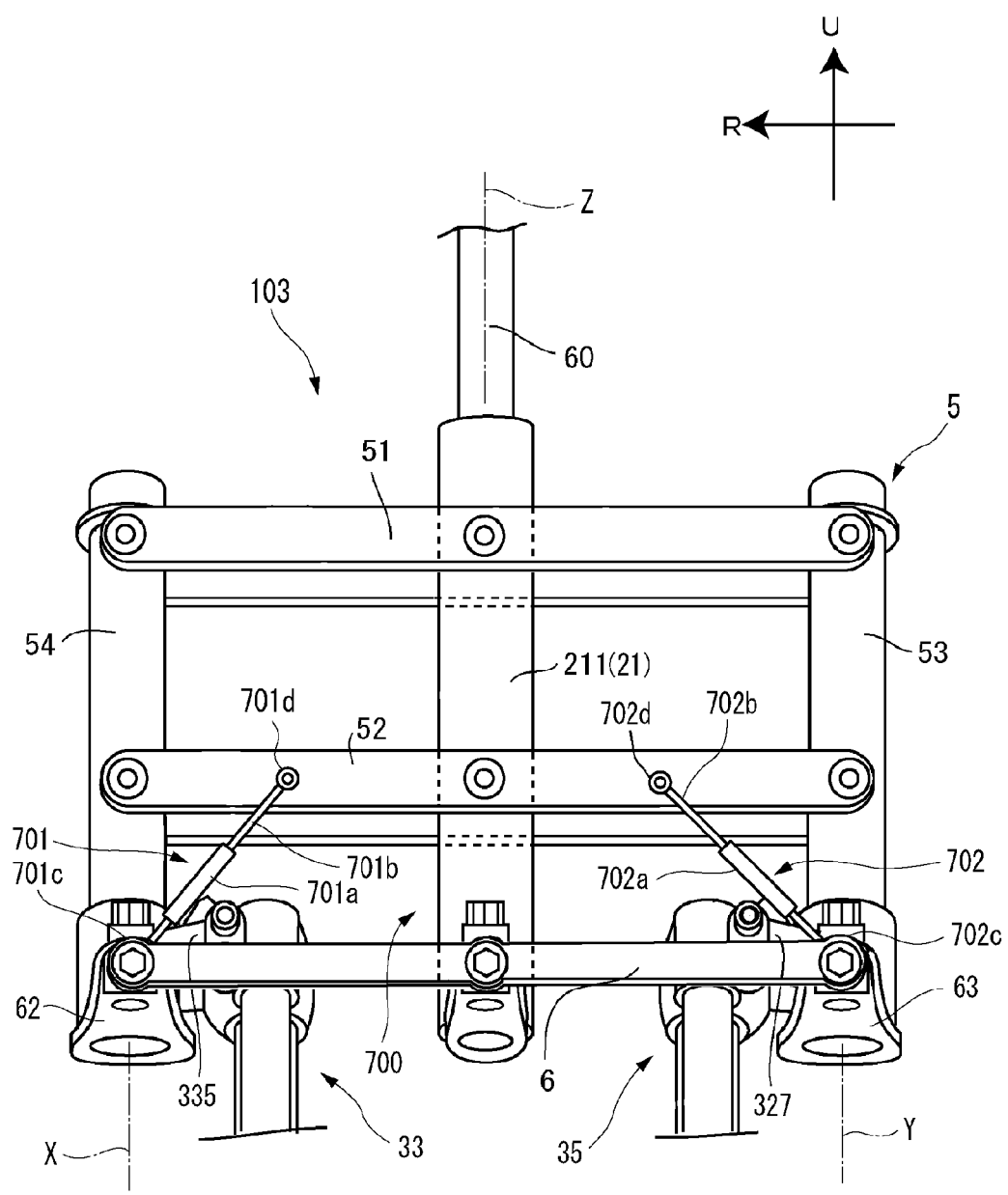
FIG. 22 is a front view showing a portion of a three-wheeled vehicle according to a sixth preferred embodiment of the present invention.

Next, referring to FIG. 22, a three-wheeled vehicle 103 according to a sixth preferred embodiment will be described. FIG. 22 is a front view showing a portion of the three-wheeled vehicle 103 in an enlarged manner. Elements having the same or similar configurations as those described in the first preferred embodiment will be omitted from illustration or like reference numerals will be assigned to those elements, so as to avoid the repetition of the same or similar descriptions.

The three-wheeled vehicle 103 includes a transformation restricting mechanism 700. The transformation restricting mechanism 700 differs from the transformation restricting mechanism 7 according to the first preferred embodiment in the configuration of restricting the transformation of a link mechanism 5. The transformation restricting mechanism 700 includes a first damper 701 and a second damper 702.

The first damper 701 is an oil damper including a first cylinder 701a and a first rod 701b. The first rod 701b includes a piston (not shown) configured to slide inside the first cylinder 701a. A lower end portion 701c of the first cylinder 701a is supported by a second transmission plate 62 of a first shock absorbing device 33. As described above, the second transmission plate 62 also defines a portion of an operation force transmitting mechanism 6. The lower end portion 701c of the first cylinder 701a is configured to be displaced relative to the first bracket 335 in a three-dimensional manner by a ball joint or the like. An upper end portion 701d of the first rod 701b is supported by a second cross member 52 of a link mechanism 5. The upper end portion 701d of the first rod 701b is configured to be displaced relative to the second cross member 52 in a three-dimensional manner by a ball joint or the like.

The first cylinder 701a and the first rod 701b are configured to be displaced relative to each other. For example, when a switch 23a is operated, the flow of oil that is held within the first cylinder 701a is restricted to increase a resisting force against the relative displacement of the first cylinder 701a and the first rod 701b.

The second damper 702 is an oil damper including a second cylinder 702a and a second rod 702b. The second rod 702b includes a piston (not shown) configured to slide inside the second cylinder 702a. A lower end portion 702c of the second cylinder 702a is supported by a third transmission plate 63 of a second shock absorbing device 35. As described above, the third transmission plate 63 also defines a portion of the operation force transmitting mechanism 6. The lower end portion 702c of the second cylinder 702a is configured to be displaced relative to the second bracket 327 in a three-dimensional manner by a ball joint or the like. An upper end portion 702d of the second rod 702b is supported by the second cross member 52 of the link mechanism 5. The upper end portion 702d of the second rod 702b is configured to be displaced relative to the second cross member 52 in a three-dimensional manner by a ball joint or the like.

The second cylinder 702a and the second rod 702b are configured to be displaced relative to each other. For example, when the switch 23a (refer to FIG. 1) is operated, the flow of oil that is held within the second cylinder 702a is restricted to increase a resisting force against the relative displacement of the second cylinder 702a and the second rod 702b.

Namely, when the switch 23a is operated in a condition that a vehicle body frame 21 (a head pipe 211) shown in FIG. 22 is in an upright state, the extension and contraction of the first damper 701 and the second damper 702 are restricted. Consequently, the head pipe 211 is restricted from leaning leftward or rightward from its upright state, thus the transformation of the link mechanism 5 is restricted. When the link mechanism 5 is desired to be restricted from being transformed with the head pipe 211 kept in a leaning posture after it has been caused to lean from the upright state, the switch 23a should be operated with the head pipe 211 kept in that posture.

As has been described above, the transformation restricting mechanism 700 includes the first damper 701 and the second damper 702. The first damper 701 includes the first cylinder 701a (an example of a first portion) and the first rod 701b (an example of a second portion) that are configured to be displaced relative to each other, and the resisting force against the relative displacement is changed. The lower end portion 701c (an example of a first supporting portion) of the first cylinder 701a is supported by the second transmission plate 62 of the first shock absorbing device 33. The upper end portion 701d (an example of a second supporting portion) of the first rod 701b is supported by the second cross member 52 of the link mechanism 5. The second damper 702 includes the second cylinder 702a (an example of a first portion) and the second rod 702b (an example of a second portion) that are configured be displaced relative to each other, and the resisting force against the relative displacement is changed. The lower end portion 702c (an example of a first supporting portion) of the second cylinder 702a is supported by the third transmission plate 63 of the second shock absorbing device 35. The upper end portion 702d (an example of a second supporting portion) of the second rod 702b is supported by the second cross member 52 of the link mechanism 5. When the vehicle body frame 21 is in the upright state, the position where the lower end portion 701c of the first cylinder 701a is supported is located below the second cross member 52 in the up-down direction of the vehicle body frame 21 and closer to a first center axis X than an intermediate axis Z in a left-right direction of the vehicle body frame 21. When the vehicle body frame 21 is in the upright state, the position where the lower end portion 702c of the second cylinder 702a is supported is located below the second cross member 52 in the up-down direction of the vehicle body frame 21 and closer to a second center axis Y than the intermediate axis Z in the left-right direction of the vehicle body frame 21.

According to such a configuration, most of the portions of the first shock absorbing device 33 and the second shock absorbing device 35 are located below the second cross member 52 when the vehicle body frame 21 is in the upright state. Additionally, spaces are defined between the first shock absorbing device 33 and the second shock absorbing device 35, and between the link mechanism 5 and the vehicle body frame 21 so as to avoid interference therebetween. When the vehicle body frame 21 is in the upright state, the lower end portion 701c of the first cylinder 701a and the lower end portion 702c of the second cylinder 702a of the transformation restricting mechanism 700 are supported by the first shock absorbing device 33 and the second shock absorbing device 35, respectively, in positions located below the second cross member 52 in the up-down direction of the vehicle body frame 21 such that a movable range of the transformation restricting mechanism 700 is made smaller than a movable range of the link mechanism 5. In addition, the space defined between the first shock absorbing device 33 and the second shock absorbing device 35 and the space defined between the link mechanism 5 and the vehicle body frame 21 are also made of use as the movable range of the transformation restricting mechanism 700.

Further, a portion of the vehicle body frame 21 is located above the first shock absorbing device 33 and the second shock absorbing device 35 when viewed from the first shock absorbing device 33 and the second shock absorbing device 35. In other words, portions where the upper end portion 701d of the first rod 701b and the upper end portion 702d of the second rod 702b of the transformation restricting mechanism 700 are supported exist over a wide range, thus enhancing the degree of freedom in design. This makes it easy to support the upper end portion 701d of the first rod 701b and the upper end portion 702d of the second rod 702b at portions that help to make the movable ranges thereof smaller. This makes the movable range of the transformation restricting mechanism 700 smaller.

In the event that the transformation restricting mechanism 700 is supported by the first shock absorbing device 33 and the second shock absorbing device 35, the movable range of the transformation restricting mechanism 700 would be increased due to the relative turning described above. However, the lower end portion 701c of the first cylinder 701a and the lower end portion 702c of the second cylinder 702a are supported by the first shock absorbing device 33 and the second shock absorbing device 35 in positions located closer to the first center axis X and the second center axis Y, respectively, than the intermediate axis Z, and this significantly reduces or prevents the expansion of the movable range of the transformation restricting mechanism 700 that would otherwise be caused in association with the relative turning described above. In addition, the space defined between the first shock absorbing device 33 and the second shock absorbing device 35 and the space defined between the link mechanism 5 and the vehicle body frame 21 are made of use as the movable range of the transformation restricting mechanism 700, thus making it possible to significantly reduce or prevent the expansion of the movable range of the transformation restricting mechanism 700 that would otherwise be caused in association with the relative turning described above.

According to such a configuration described above, the movable range of the transformation restricting mechanism 700 is made smaller than the movable range of the link mechanism 5. Additionally, even though the first shock absorbing device 33 and the second shock absorbing device 35 turn, it is possible to significantly reduce or prevent the expansion of the movable range of the transformation restricting mechanism 700. Consequently, the movable range of the transformation restricting mechanism 700 that has a function to restrict the operation of the link mechanism 5 is spaced away from the steering shaft 60. Thus, even though a function to restrict the operation of the link mechanism 5 is provided, it is possible to significantly reduce or prevent an increase in the size of a peripheral construction of the steering shaft 60 that is disposed above the two front wheels 31, 32.

When the vehicle body frame 21 is in the upright state, the upper end portion 701d of the first rod 701b and the upper end portion 702d of the second rod 702b are disposed above the lower end portion 701c of the first cylinder 701a and the lower end portion 702c of the second cylinder 702a.

According to this configuration, the lower end portion 701c of the first cylinder 701a and the lower end portion 702c of the second cylinder 702a and the upper end portion 701d of the first rod 701b and the upper end portion 702d of the second rod 702b move relatively in the up-down direction of the vehicle body frame 21 as the vehicle body frame 21 leans. Thus, the transformation restricting mechanism 700 is preferably configured to include the lower end portion 701c of the first cylinder 701a and the lower end portion 702c of the second cylinder 702a at a lower portion thereof and the upper end portion 701d of the first rod 701b and the upper end portion 702d of the second rod 702b at an upper portion thereof, and to change a resisting force against the movements of the lower end portion 701c of the first cylinder 701a and the lower end portion 702c of the second cylinder 702a in the up-down direction relative to the upper end portion 701d of the first rod 701b and the upper end portion 702d of the second rod 702b. This enables the transformation restricting mechanism 700 to be made smaller in size and simplified in structure. Additionally, the movable range of the transformation restricting mechanism 700 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

When the vehicle body frame 21 is in the upright state, the first mounting member 134 and the second mounting member 144 are disposed closer to the intermediate axis Z than the first center axis X and the second center axis Y.

According to this configuration, the lower end portion 701c of the first cylinder 701a and the lower end portion 702c of the second cylinder 702a and the upper end portion 701d of the first rod 701b and the upper end portion 702d of the second rod 702b move relatively in the up-down direction of the vehicle body frame 21 as the vehicle body frame 21 leans. In addition, the supporting members 72a also relatively move in the left-right direction of the vehicle body frame 21 as the vehicle body frame 21 leans. This allows the transformation restricting mechanism 700 to make use of at least either the movements in the up-down direction or the movements in the left-right direction. Additionally, in conjunction with the fact that the space defined between the link mechanism 5 and the vehicle body frame 21 and the space defined between the first shock absorbing device 33 and the second shock absorbing device 35 are made of use as the movable range of the transformation restricting mechanism 700, the transformation restricting mechanism 700 is made smaller in size and simplified in structure. In addition, the movable range of the transformation restricting mechanism 700 is made smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The first cylinder 701a and the second cylinder 702a are configured to turn about the axes that extend in the up-down direction of the vehicle body frame 21 (the first center axis X and the second center axis Y) relative to the first shock absorbing device 33 and the second shock absorbing device 35, respectively.

According to this configuration, the turning axes of the first shock absorbing device 33 and the second shock absorbing device 35, and the turning axes of the first cylinder 701a and the second cylinder 702a both extend in the up-down direction of the vehicle body frame 21. This significantly reduces or prevents the expansion of movable ranges of the first cylinder 701a and the second cylinder 702a in accordance with the turnings of the first shock absorbing device 33 and the second shock absorbing device 35. Consequently, even though a function to restrict the operation of the link mechanism 5 is provided, it is possible to significantly reduce or prevent an increase in the size of the peripheral construction of the steering shaft 60 that is disposed above the two front wheels 31, 32.

The lower end portion 701c of the first cylinder 701a and the lower end portion 702c of the second cylinder 702a are supported by the second transmission plate 62 and the third transmission plate 63, respectively, that are disposed at upper portions of the first shock absorbing device 33 and the second shock absorbing device 35.

According to this configuration, a dimension of the transformation restricting mechanism 700 relative to the up-down direction of the vehicle body frame 21 is made smaller than in a case where the lower end portion 701c of the first cylinder 701a and the lower end portion 702c of the second cylinder 702a are supported at lower portions of the first shock absorbing device 33 and the second shock absorbing device 35, respectively. This makes the movable range of the transformation restricting mechanism 700 smaller. Consequently, even though a function to restrict the operation of the link mechanism 5 is provided, it is possible to significantly reduce or prevent an increase in the size of the peripheral construction of the steering shaft 60 that is disposed above the two front wheels 31, 32.

Other Preferred Embodiments

In the preferred embodiments described above, a portion of the link mechanism 5 is preferably supported by the head pipe 211. However, as long as a portion of the link mechanism 5 is supported by the vehicle body frame 21, for example, a configuration may be used in which the down frame 212 supports a portion of the link mechanism 5.

In the preferred embodiments described above, the first shock absorbing device 33 and the second shock absorbing device 35 each preferably include a telescopic type shock absorber, for example. However, the first shock absorbing device 33 and the second shock absorbing device 35 may each include a bottom-link type shock absorber, for example.

In the preferred embodiments that have been described above, the portion that corresponds to the first portion of the transformation restricting mechanism that restricts the transformation of the link mechanism 5 is preferably supported by both the first shock absorbing device 33 and the second shock absorbing device 35. However, a configuration may be used in which the portion of the transformation restricting mechanism is supported by either the first shock absorbing device 33 or the second shock absorbing device 35, as long as the desired function is provided.

In the preferred embodiments that have been described above, the technique of changing the resisting force against the relative displacement of the portions that correspond to the first portion and the second portion of the transformation restricting mechanism that are displaced relative to each other to restrict the transformation of the link mechanism 5 can be modified as required. The techniques described with reference to the individual preferred embodiments can be replaced mutually. Additionally, in the case of the transformation restricting mechanism 8 according to the second preferred embodiment or the transformation restricting mechanism 9 according to the third preferred embodiment, it is possible to use a configuration in which the resisting force against the portions that turn relative to each other is changed by the use of a magnetic fluid.

Preferred embodiments of the present invention may be applied to a scooter-type riding vehicle, for example, as long as the vehicle includes a leanable vehicle body frame and two front wheels.

This application claims priority to Japanese Patent Application No. 2012-209873 filed on Sep. 24, 2012; Japanese Patent Application No. 2012-209874 filed on Sep. 24, 2012; and Japanese Patent Application No. 2012-235605 filed on Oct. 25, 2012, the contents of which are all incorporated herein by reference.

The terms "right side", "left side", "upper side", "lower side" and "outer side" used in the descriptions of the above Japanese Patent Applications respectively correspond to the term "rightward", "leftward", "upward", "downward" and "outward" used in the description of the preferred embodiment of the present application.

The terms and expressions that are used herein are used to describe the preferred embodiments of the present invention and hence should not be construed as limiting the scope of the present invention. It should be understood that any equivalents to the characteristic matters that are shown and described herein should not be excluded and that various modifications made within the scope of claims to be made later are included.

The present invention can be implemented with many different preferred embodiments. This disclosure should be regarded as provision of the preferred embodiments based on the principle of the present invention. Based on the understanding that the preferred embodiments which are described and/or illustrated herein are not intended to limit the present invention thereto, several preferred embodiments are described and illustrated herein.

Several illustrated preferred embodiments of the present invention are described herein. The present invention should not be limited to the preferred embodiments described herein. The present invention includes every preferred embodiment that includes equivalent elements, modifications, deletions, combinations (for example, combinations of characteristics that are common to various preferred embodiments), improvements and/or modifications that those skilled in the art to which the present invention pertains can recognize based on the disclosure made herein. Matters limited by claims should be construed widely based on terms that are used in the claims and should not be limited to the preferred embodiments described in this description or the prosecution of this patent application. Such preferred embodiments are interpreted to be non-exclusive. For example, in this disclosure, the terms "preferred", "preferable" and "good" should be construed as being non-exclusive and those terms mean, respectively, "preferred but not limited to", "preferable but not limited thereto" and "good but not limited thereto."

While preferred embodiments of the present invention have been described above, it is to be understood that variations and modifications will be apparent to those skilled in the art without departing from the scope and spirit of the present invention. The scope of the present invention, therefore, is to be determined solely by the following claims.

The invention claimed is:

1. A vehicle comprising:
a vehicle body frame;
a right front wheel and a left front wheel arranged side by side in a left-right direction of the vehicle body frame;
a right shock absorbing device supporting the right front wheel at a lower portion thereof and configured to buffer displacement of the right front wheel in an up-down direction of the vehicle body frame relative to an upper portion thereof;
a left shock absorbing device supporting the left front wheel at a lower portion thereof and configured to buffer displacement of the left front wheel in the up-down direction of the vehicle body frame relative to an upper portion thereof;
a link mechanism including:
  a right side rod supporting the upper portion of the right shock absorbing device so that the right shock absorbing device is configured to turn about a right axis extending in the up-down direction of the vehicle body frame;
  a left side rod supporting the upper portion of the left shock absorbing device so that the left shock absorbing device is configured to turn about a left axis extending parallel or substantially parallel to the right axis;
  an upper cross member including a right end portion turnably supporting an upper portion of the right side rod, a left end portion turnably supporting an upper portion of the left side rod, and an intermediate portion supported by the vehicle body frame and configured to turn about an upper axis extending in the front-back direction of the vehicle body frame; and
  a lower cross member including a right end portion turnably supporting a lower portion of the right side rod, a left end portion turnably supporting a lower portion of the left side rod, and an intermediate portion supported by the vehicle body frame and configured to turn about a lower axis extending parallel or substantially parallel to the upper axis;
a steering shaft including an upper end portion located above the lower axis in the up-down direction of the vehicle body frame, the steering shaft being supported by the vehicle body frame at a position between the right side rod and the left side rod in the left-right direction of the vehicle body frame, and the steering shaft is configured to turn about an intermediate axis extending in the up-down direction of the vehicle body frame;
a handlebar provided on the upper end portion of the steering shaft;
a turn transmitting mechanism configured to transmit a turning motion of the steering shaft in accordance with an operation of the handlebar to the right shock absorbing device and to the left shock absorbing device; and
a resisting force changing mechanism configured to change a resisting force applied against turning actions of the upper cross member and the lower cross member relative to the vehicle body frame; wherein
the resisting force changing mechanism includes a first portion and a second portion which are configured to be displaced relative to each other and to change a resisting force against the relative displacement;
the first portion includes a first supporting portion supported by at least one of the right shock absorbing device and the left shock absorbing device;
the first supporting portion is supported by one of the right shock absorbing device and the left shock absorbing device at a position which is below the lower cross member in the up-down direction of the vehicle body frame, and which is closer to the one of the right shock absorbing device and the left shock absorbing device in the left-right direction of the vehicle body frame than the intermediate axis when the vehicle body frame is in an upright state; and the second portion includes a second supporting portion supported by at least one of the upper cross member, the lower cross member, the vehicle body frame, the other one of the right shock absorbing device and the left shock absorbing device, and one of the right and left side rods supporting the other one of the right shock absorbing device and the left shock absorbing device.

2. The vehicle as set forth in claim 1, wherein the second supporting portion of the resisting force changing mechanism is disposed above the first supporting portion of the resisting force changing mechanism in the up-down direction of the vehicle body frame when the vehicle body frame is in the upright state.

3. The vehicle as set forth in claim 1, wherein the second supporting portion of the resisting force changing mechanism is supported at a position closer to the intermediate axis in the left-right direction than the right axis and the left axis when the vehicle body frame is in the upright state.

4. The vehicle as set forth in claim 1, wherein at least one of the first portion and the second portion of the resisting force changing mechanism is configured to turn about an axis extending in the up-down direction of the vehicle body frame relative to the one of the right and left shock absorbing devices.

5. The vehicle as set forth in claim 1, wherein the first supporting portion of the resisting force changing mechanism is supported by the upper portion of the one of the right shock absorbing device and the left shock absorbing device.

6. The vehicle as set forth in claim 1, wherein the first portion of the resisting force changing mechanism includes a first right supporting portion supported by the lower portion of the right shock absorbing device and a first left supporting portion supported by the lower portion of the left shock absorbing device;

the first right supporting portion is supported by the lower portion of the right shock absorbing device at a position which is below the lower cross member in the up-down direction of the vehicle body frame and which is closer to the right axis in the left-right direction of the vehicle body frame than the intermediate axis when the vehicle body frame is in the upright state; and the first left supporting portion is supported by the lower portion of the left shock absorbing device at a position which is below the lower cross member in the up-down direction of the vehicle body frame and which is closer to the left axis in the left-right direction of the vehicle body frame than the intermediate axis when the vehicle body frame is in the upright state.

\* \* \* \* \*